(12) United States Patent
Oberrauch et al.

(10) Patent No.: US 11,833,917 B1
(45) Date of Patent: Dec. 5, 2023

(54) EV CHARGER WITH FAULT RIDE THROUGH CAPABILITY

(71) Applicant: ALPITRONIC SRL, Bolzano (IT)

(72) Inventors: Andreas Oberrauch, Eppan (IT); Tizian Senoner, Eppan (IT); Philipp Niedermayr, Eppan (IT); Christian Leimegger, Eppan (IT)

(73) Assignee: ALPITRONIC SRL, Bolzano (IT)

( * ) Notice: Subject to any disclaimer, the term of this patent is extended or adjusted under 35 U.S.C. 154(b) by 0 days.

(21) Appl. No.: 18/115,268

(22) Filed: Feb. 28, 2023

(51) Int. Cl.
*B60L 53/00* (2019.01)
*B60L 53/14* (2019.01)
*B60L 53/30* (2019.01)
*H02J 7/00* (2006.01)

(52) U.S. Cl.
CPC ............ *B60L 53/14* (2019.02); *B60L 53/305* (2019.02); *H02J 7/0036* (2013.01); *B60L 2210/10* (2013.01); *B60L 2210/30* (2013.01); *B60L 2240/547* (2013.01); *H02J 2310/48* (2020.01)

(58) Field of Classification Search
CPC .... B60L 53/14; B60L 53/305; B60L 2210/10; B60L 2210/30; B60L 2240/547; H02J 7/0036; H02J 2310/48
USPC .......................................................... 320/107
See application file for complete search history.

(56) References Cited

U.S. PATENT DOCUMENTS

2018/0037121 A1\* 2/2018 Narla ...................... B60L 53/00

\* cited by examiner

*Primary Examiner* — Paul Dinh

(57) ABSTRACT

The present patent application describes a charger for electric vehicles that features a fault ride through capability, allowing it to use power from the vehicle's battery as a backup power source during low voltage faults of the grid. The charger includes a backup circuit that comprises a first coupling circuit connected to the power path of the electric vehicle battery through the charger, a second coupling circuit connected to the power path of the charger's power supply, and optionally a connection or conditioning circuit to match the voltages of the coupling circuits. The backup circuit enables the control and communication units of the charger to keep operating during low voltage faults of the grid, which can vary in duration from milliseconds to several seconds. The coupling circuits may be placed at various points in the charger's circuitry, such as the input, output, or internal points of the converter or power supply.

13 Claims, 30 Drawing Sheets

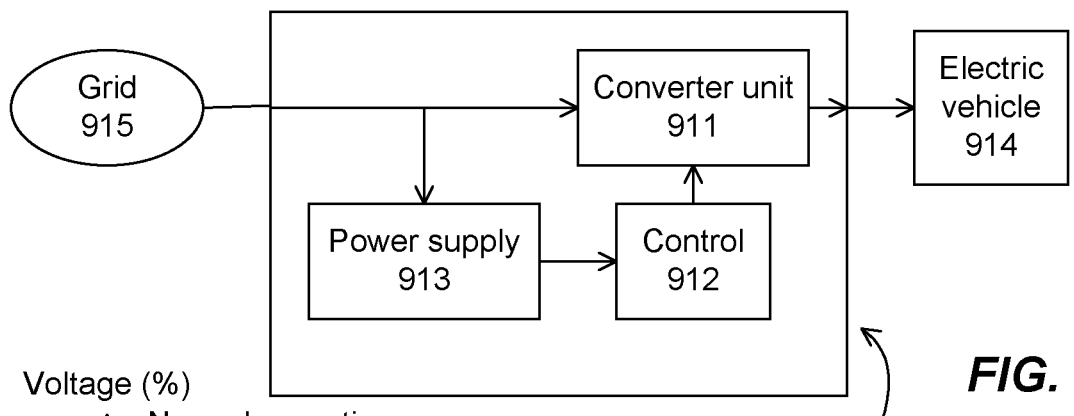
FIG. 1A
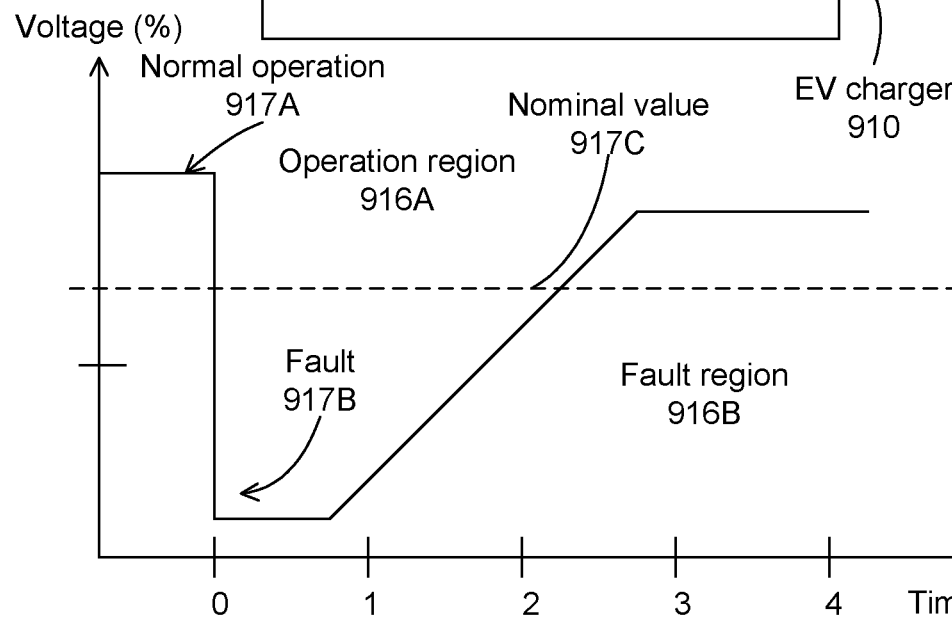
FIG. 1B
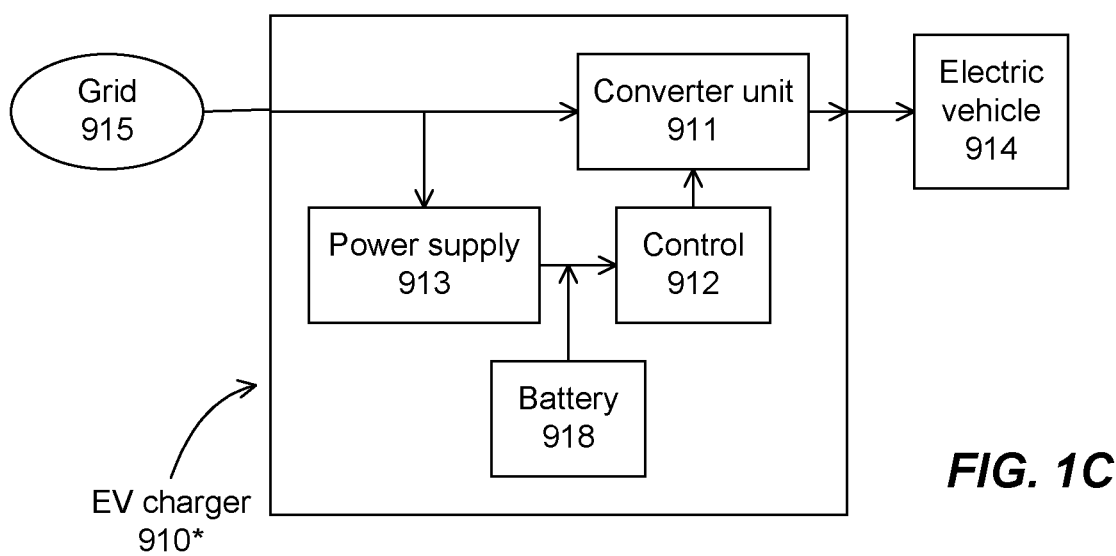
FIG. 1C
FIG. 1 (Prior Art)

300 uses power of a battery in an electric vehicle connected to a charger as a back up power during a low voltage fault of a grid providing power to the charger.

*FIG. 3A*

310 connects an electric vehicle to a charger for charging a battery of the electric vehicle.
The charger is configured to be connected to a grid for supplying power to the charger to charge the battery.
The grid is also configured to supply power to a control unit of the charger for controlling a voltage converter between the grid and the battery.
The grid is optionally configured to supply power to a communication unit of the charger for communicating between the charger and the electric vehicle.
311 supplies power to the control unit and to the communication unit from the battery during a low voltage fault of the grid.
312 resumes supplying power by the grid to the control unit and to the communication unit after the low voltage fault.

*FIG. 3B*

320 connects an electric vehicle to a charger for charging a battery of the electric vehicle.
The charger includes an AC/DC converter unit coupled to a grid, a control unit for controlling the conversion process, together with an optional communication unit for communicating with the electric vehicle, and a power supply coupled to the grid having an AC/DC component for supplying power to the control and communication units.
321 supplies power from the battery to the control and communication units during a low voltage fault of the grid. The power from the battery is coupled to one of an output, an internal point, or an input of the AC/DC converter unit. The power to the control and communication units is coupled to one of an output, an internal point, or an input of the power supply.

*FIG. 3C*

400 forms a charger for an electric vehicle, the charger configured to use power of a battery in the electric vehicle connected to the charger as a back up power during a low voltage fault of a grid providing power to the charger.

*FIG. 4A*

410 forms a charger for charging an electric vehicle with power supplied from a grid.
The charger includes a circuit configured to use power of a battery in the electric vehicle as a back up power during a fault of the grid.
The circuit includes at least one of a first coupling circuit coupled to a converter unit of the charger, a second coupling circuit coupled to a power supply of the charger, or a connection circuit coupled between the first and second coupling circuit.
The first coupling circuit is configured to accept a voltage from a battery of the electric vehicle, with the electric vehicle connected to the charger, and to generate a voltage to the connection circuit.
The second coupling circuit is configured to replace power from the grid with power from the first coupling circuit during the grid fault.

*FIG. 4B*

420 forms a charger for charging an electric vehicle with power supplied from a grid.
The charger includes an AC/DC converter unit coupled to a grid, a control unit for controlling the conversion process, together with an optional communication unit for communicating with the electric vehicle, and a power supply coupled to the grid having an AC/DC component for supplying power to the control and communication units.
The charger includes a power back up circuit configured to supply power from the battery to the control and communication units during a low voltage fault of the grid.
The power from the battery is coupled to either an output, an internal point, or an input of the AC/DC converter unit.
The power to the control and communication units is coupled to either an output, an internal point, or an input of the power supply.

*FIG. 4C*

700 connects an electric vehicle to a charger for charging a battery of the electric vehicle from a grid power.
The charger includes an AC-DC unit coupled to a bidirectional DC-DC unit, a control unit for controlling the AC-DC and DC-DC units, together with an optional communication unit for communicating between with the electric vehicle, and a power supply coupled to the grid for supplying power to the control and communication units.

701 supplies power from the connection of the AC-DC unit with the bidirectional DC-DC unit to a DC output of the power supply for supplying power to the control and communication units during a low voltage fault of the grid.

*FIG. 7A*

710 forms a charger for an electric vehicle.
The charger includes an AC-DC unit coupled to a bidirectional DC-DC unit, a control unit, together with an optional communication unit, and a power supply.
The charger includes a power back up circuit configured to be connected to the bidirectional DC-DC unit to receive a DC power from the bidirectional DC-DC unit.
The power back up circuit is configured to supply power from the connection of the AC-DC unit with the bidirectional DC-DC unit to a DC output of the power supply for supplying power to the control and communication units during a low voltage fault of the grid.

*FIG. 7B*

720 forms a charger for an electric vehicle.
The charger includes an AC-DC unit coupled to a bidirectional DC-DC unit, a control unit, an optional communication unit, and a power supply.
The charger includes a power back up circuit including a connection circuit having a unidirectional or bidirectional DC-DC component configured to condition a DC voltage from the bidirectional DC-DC unit and a second coupling circuit having a switching component coupled to outputs of the power supply and the DC-DC component and also coupled to inputs of the control and communication units. The switching component is configured to supply power from the output of the power supply or the output of the DC-DC component to the control and communication units during a normal operation or a low voltage fault of the grid, respectively.

*FIG. 7C*

900 forms a charger for an electric vehicle.

The charger includes a converter unit, with the converter unit including an AC-DC converter element coupled to a bidirectional DC-DC converter element . The charger includes a control unit for controlling the converter unit, The charger includes an optional communication unit for communicating with the electric vehicle. The charger includes a power supply for powering the control and communication units.

The charger includes a power back up circuit for powering the control and communication units during a grid voltage fault, such as a low voltage fault for more than a hundred of milliseconds.

The back up power circuit includes a first coupling circuit, which can be a coupling point at the converter unit, such as to a connection point between the AC-DC converter element and the bidirectional DC-DC element, to receive power from a battery of the electric vehicle through the bidirectional DC-DC converter element.

The back up power circuit includes a connection or conditioning circuit configured to convert a DC voltage received from the first coupling circuit (which includes a connection point) to a DC voltage suitable to power the control and communication units. The conditioning circuit can include a unidirectional or bidirectional DC-DC component.

The back up power circuit includes a second coupling circuit which can be a switching circuit, configured to select the power received by the control and communication units to be either the output of the power supply or the output of the conditioning circuit. The switching circuit can include a resistor based switching circuit, a diode based switching circuit, a combination of transistor and diode based switching circuit, a a transistor based switching circuit, or a relay based switching circuit.

*FIG. 9*

1100 connects an electric vehicle to a charger for charging a battery of the electric vehicle from a grid power.
The charger includes an AC-DC unit coupled to a DC-DC unit, a control unit for controlling the AC-DC and DC-DC units, together with an optional communication unit for communicating between with the electric vehicle, and a power supply coupled to the grid for supplying power to the control and communication units.
1101 supplies power from a connection of the electric vehicle to a DC output of the power supply for supplying power to the control and communication units during a low voltage fault of the grid.

FIG. 11A

1110 forms a charger for an electric vehicle.
The charger includes an AC-DC unit coupled to a DC-DC unit, a control unit, together with an optional communication unit, and a power supply.
The charger includes a power back up circuit configured to be connected to the electric vehicle to receive a DC power from the electric vehicle.
The power back up circuit is configured to supply power from the connection with the electric vehicle to a DC output of the power supply for supplying power to the control and communication units during a low voltage fault of the grid.

FIG. 11B

1120 forms a charger for an electric vehicle.
The charger includes an AC-DC converter unit, a control unit, an optional communication unit, and a power supply.
The charger includes a power back up circuit including a first coupling circuit having a connection with the electric vehicle, a connection circuit having a unidirectional or bidirectional DC-DC component configured to condition a DC voltage from the connection with the electric vehicle, and a second coupling circuit having a switching component coupled to outputs of the power supply and the DC-DC component and also coupled to inputs of the control and communication units.
The switching component is configured to supply power from the output of the power supply or the output of the DC-DC component to the control and communication units during a normal operation or a low voltage fault of the grid, respectively.

FIG. 11C

1130 forms a charger for an electric vehicle.

The charger includes a converter unit. The charger includes a control unit for controlling the converter unit, The charger includes an optional communication unit for communicating with the electric vehicle. The charger includes a power supply for powering the control and communication units.

The charger includes a power back up circuit for powering the control and communication units during a grid voltage fault, such as a low voltage fault for more than a hundred of milliseconds.

The back up power circuit includes a first coupling circuit, which can be a connection point with the electric vehicle, to receive power from a battery of the electric vehicle through a battery of the electric vehicle.

The back up power circuit includes a connection or conditioning circuit configured to convert a DC voltage received from the first coupling circuit (which includes a connection point) to a DC voltage suitable to power the control and communication units. The conditioning circuit can include a unidirectional or bidirectional DC-DC component.

The back up power circuit includes a second coupling circuit which can be a switching circuit, configured to select the power received by the control and communication units to be either the output of the power supply or the output of the conditioning circuit. The switching circuit can include a resistor based switching circuit, a diode based switching circuit, a combination of transistor and diode based switching circuit, a a transistor based switching circuit, or a relay based switching circuit.

*FIG. 11D*

1310 forms a charger for an electric vehicle.

The charger includes an AC-DC converter unit, a control unit, together with an optional communication unit, and a power supply.

The power supply includes a second coupling circuit configured to accept a DC voltage as a back up power for the power supply.

The charger includes a power back up circuit including an optional connection or conditioning circuit configured to condition a voltage from a first coupling circuit, which is either an internal point of the AC-DC converter unit or a connection point of the charger to the electric vehicle, to the second coupling circuit of the power supply.

*FIG. 13A*

1320 forms a charger for an electric vehicle.

The charger includes an AC-DC converter unit, a control unit, together with an optional communication unit, and a power supply.

The power supply includes an AC-DC section for converting an input AC grid voltage and a DC-DC section for converting an input DC voltage to an output DC voltage suitable to power the control and communication units.

The power supply includes a connection or conditioning circuit configured to accept an input DC voltage as a back up input power for the power supply.

The power supply includes a second coupling circuit configured to accept an output DC voltage from the connection circuit to select against an output from AC-DC section to generate the input DC voltage to the DC-DC section.

The charger includes a power back up circuit including an optional connection or conditioning circuit configured to condition a voltage from a first coupling circuit, which is either an internal point of the AC-DC converter unit or a connection point of the charger to the electric vehicle, to the connection circuit of the power supply as the input DC voltage.

*FIG. 13B*

1410 forms a power supply for a charger for an electric vehicle. The power supply includes an AC-DC section for converting an input AC grid voltage and a DC-DC section for converting an input DC voltage to an output DC voltage suitable to power control and communication units of the charger for controlling an AC-DC converter unit.

The power supply includes a coupling circuit coupled between the AC-DC section and the DC-DC section for selecting between an output of the AC-DC section and a DC voltage and to provide an input DC voltage to the DC-DC section.

The coupling circuit is configured to accept the DC voltage as a back up power for the power supply.

*FIG. 14A*

1420 forms a power supply for a charger for an electric vehicle. The power supply includes an AC-DC section for converting an input AC grid voltage and a DC-DC section for converting an input DC voltage to an output DC voltage suitable to power control and communication units of the charger for controlling an AC-DC converter unit.

The power supply includes a coupling circuit coupled between the AC-DC section and the DC-DC section for selecting between an output of the AC-DC section and a DC voltage and to provide an input DC voltage to the DC-DC section.

The power supply includes a connection or conditioning circuit configured to accept a back up DC voltage for the power supply.

The connection circuit is configured to generate the DC voltage to the coupling section.

*FIG. 14B*

1600 connects an electric vehicle to a charger for charging a battery of the electric vehicle from a grid power.
The charger includes an AC-DC unit coupled to a DC-DC unit, a control unit, an optional communication unit, and a power supply coupled to the grid for supplying power to the control and communication units.
1601 supplies power either from an internal point of the AC-DC converter unit or from a connection point of the charger to the electric vehicle to an AC input of the power supply for supplying power to the power supply during a low voltage fault of the grid.

*FIG. 16A*

1610 forms a charger for an electric vehicle.
The charger includes an AC-DC converter unit, a control unit, an optional communication unit, and a power supply.
The charger includes a power back up circuit configured to be connected either to an internal point of the AC-DC converter unit or from a connection point of the charger to the electric vehicle to receive a DC power from the electric vehicle.
The power back up circuit is configured to supply power to an AC input of the power supply for supplying power to the power supply during a low voltage fault of the grid.

*FIG. 16B*

1620 forms a charger for an electric vehicle.
The charger includes an AC-DC converter unit, a control unit, an optional communication unit, and a power supply.
The charger includes a power back up circuit including a first coupling circuit having a connection either with an internal point of the AC-DC converter unit or with an output of the AC-DC converter unit, a connection circuit having a DC-AC component configured to condition a DC voltage to an AC voltage, and a second coupling circuit having a switching component inputtedly coupled to a grid voltage, an output of the connection circuit, and outputtedly coupled to an input of the power supply.
The switching component is configured to supply AC power from the grid or from the back up circuit to the power supply during a normal operation or a low voltage fault of the grid, respectively.

*FIG. 16C*

1630 forms a charger for an electric vehicle.

The charger includes a converter unit. The charger includes a control unit for controlling the converter unit, The charger includes an optional communication unit for communicating with the electric vehicle. The charger includes a power supply for powering the control and communication units.

The charger includes a power back up circuit for powering the control and communication units during a grid voltage fault, such as a low voltage fault for more than a hundred of milliseconds.

The back up power circuit includes a first coupling circuit, which can be a connection point either with an internal point or with an output point of the converter unit, to receive power from a battery of the electric vehicle either through a bidirectional element between the internal point and the output point or through the battery.

The back up power circuit includes a connection or conditioning circuit configured to convert a DC voltage received from the first coupling circuit (which includes a connection point) to an AC voltage suitable to power the power supply.

The back up power circuit includes a second coupling circuit which can be an AC switching circuit, configured to select between a power received from the grid or a power received from the connection circuit to provide a power input to the power supply.

The switching circuit can include a resistor based switching circuit, a diad or triad based switching circuit, a transistor based switching circuit, or a relay based switching circuit.

*FIG. 16D*

1900 connects an electric vehicle to a charger for charging a battery of the electric vehicle from a grid power.
The charger includes a bidirectional AC-DC converter unit, a control unit, an optional communication unit, and a power supply coupled to the grid for supplying power to the control and communication units.

1901 supplies power from an input of the AC-DC converter unit either to an output or to an internal point of the power supply for supplying power to the control and communication units during a low voltage fault of the grid.

*FIG. 19A*

1910 forms a charger for an electric vehicle.
The charger includes a bidirectional AC-DC converter unit, a control unit, an optional communication unit, and a power supply.
The charger includes a power back up circuit configured to be connected to an input point of the AC-DC converter unit to receive an AC power from the electric vehicle through the bidirectionnal AC-DC converter unit.
The power back up circuit is configured to supply power either to an output or to an internal point of the power supply for supplying power to the control and communication units during a low voltage fault of the grid.

*FIG. 19B*

1920 forms a charger for an electric vehicle.
The charger includes a bidirectional AC-DC converter unit, a control unit, an optional communication unit, a power supply.
The charger includes a power back up circuit including a first coupling circuit having a circuit configured for matching or switching between a grid voltage with a voltage returning from the AC-DC converter unit, and a connection line to an input of the AC-DC converter unit, a connection circuit having an AC-DC component configured to condition an AC voltage to an DC voltage, and a second coupling circuit having a switching component inputtedly coupled to an output of the power supply, an output of the connection circuit, and outputtedly coupled to power inputs of the control and communication units .

*FIG. 19C*

1930 forms a charger for an electric vehicle.

The charger includes a bidirectional converter unit. The charger includes a control unit for controlling the converter unit, The charger includes an optional communication unit for communicating with the electric vehicle. The charger includes a power supply for powering the control and communication units.

The charger includes a power back up circuit for powering the control and communication units during a grid voltage fault, such as a low voltage fault for more than a hundred of milliseconds.

The back up power circuit includes a first coupling circuit, which can include a circuit configured for matching a grid voltage with a voltage returning from the converter unit, or configured for switching between connecting the grid power to the converter unit and not connecting.

The matching circuit can include a circuit configured to match amplitude, phase, and waveform of a voltage generated at the converter unit from the battery with that of the grid.

The switching circuit can include a transistor based, a relay based, or a semiconductor based switching configuration, which is configured to toggle between connecting and not connecting the grid with the converter unit, based on a grid fault signal. For example, during a normal grid operation, the switching circuit is close to connect the grid with the converter unit. During a grid fault, the switching circuit is open to disconnect the converter unit from the grid.

The first coupling circuit can include a connection point with an input of the converter unit, to receive power from a battery of the electric vehicle through the bidirectional converter unit. The connection point is disposed on a side of the converter unit with respect to the matching/regulating circuit, e.g., on a connection line between the matching circuit and the converter unit.

The back up power circuit includes a connection or conditioning circuit configured to convert an AC voltage received from the first coupling circuit (which includes a connection point) to a DC voltage suitable to power the control and communication units.

The back up power circuit includes a second coupling circuit which can be a DC switching circuit, configured to select between a power received from an output of the power supply or a power received from the connection circuit to provide a power input to the control and communication units.

*FIG. 19D*

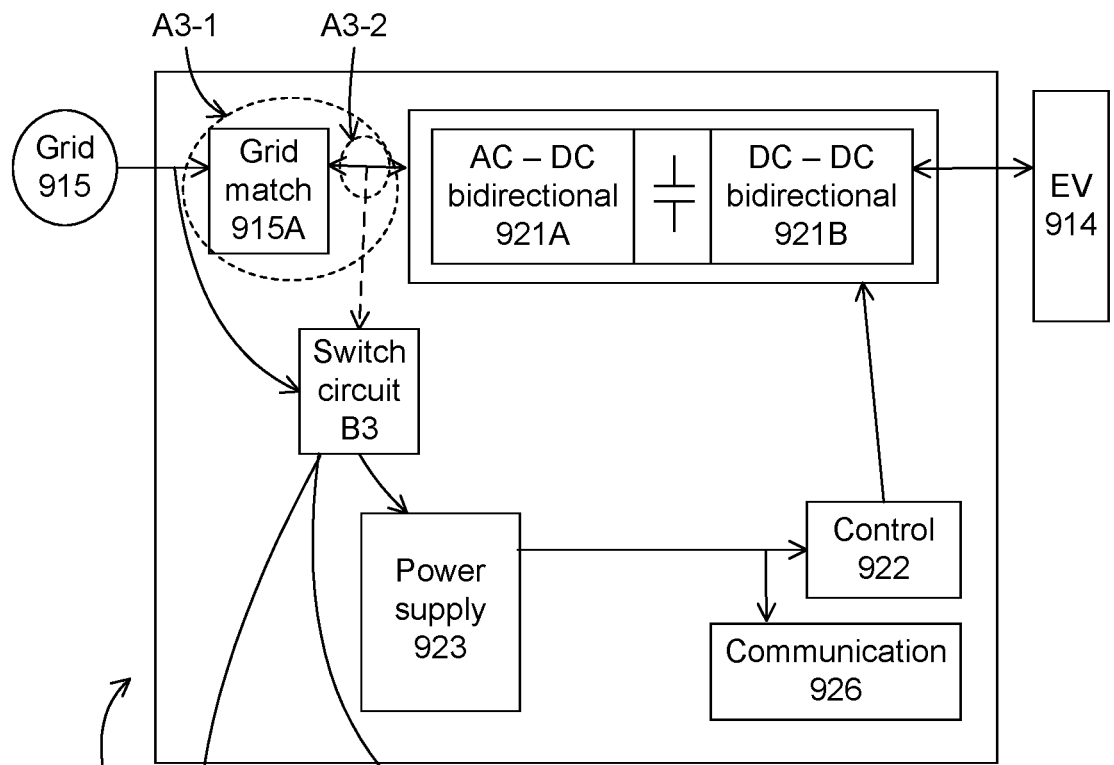
*Fig. 22A*
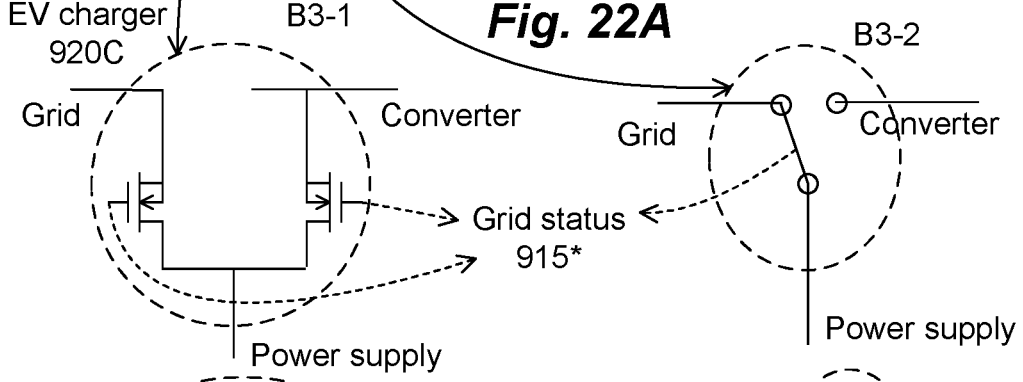
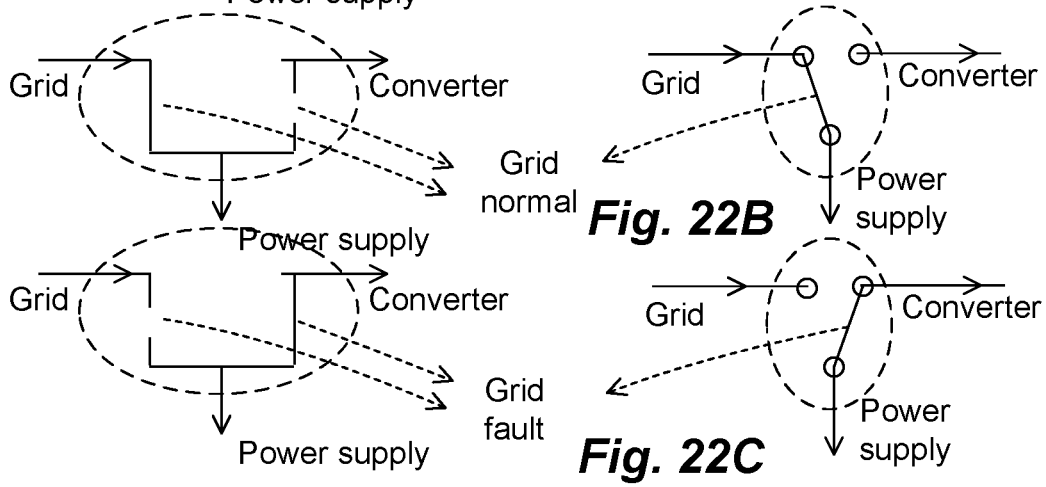
*Fig. 22B*
*Fig. 22C*

2300 connects an electric vehicle to a charger for charging a battery of the electric vehicle from a grid power.
The charger includes a bidirectional AC-DC converter unit, a control unit, an optional communication unit, and a power supply coupled to the grid for supplying power to the control and communication units.

2301 supplies power from an input of the AC-DC converter unit either to an input of the power supply for supplying power to the control and communication units during a low voltage fault of the grid.

*FIG. 23A*

2310 forms a charger for an electric vehicle.
The charger includes a bidirectional AC-DC converter unit, a control unit, an optional communication unit, and a power supply.
The charger includes a power back up circuit configured to be connected to an input point of the AC-DC converter unit to receive an AC power from the electric vehicle through the bidirectionnal AC-DC converter unit.
The power back up circuit is configured to supply power either to an input of the power supply for supplying power to the control and communication units during a low voltage fault of the grid.

*FIG. 23B*

2320 forms a charger for an electric vehicle.
The charger includes a bidirectional AC-DC converter unit, a control unit, an optional communication unit, a power supply.
The charger includes a power back up circuit including a first coupling circuit having a switching circuit configured for switching between a connection and a disconnection of a grid voltage with a voltage returning from the AC-DC converter unit. The switching circuit is also configured for switching an input of the power supply to be connected with the grid voltage or to bne connected with the voltage returning from the AC-DC converter unit.
The switching circuit is transistor based or relay based, or semiconductor based.

*FIG. 23C*

2330 forms a charger for an electric vehicle.

The charger includes a bidirectional converter unit. The charger includes a control unit for controlling the converter unit, The charger includes an optional communication unit for communicating with the electric vehicle. The charger includes a power supply for powering the control and communication units. The charger includes a power back up circuit for powering the control and communication units during a grid voltage fault, such as a low voltage fault for more than a hundred of milliseconds. The back up power circuit includes a first coupling circuit, which can include a circuit configured for matching a grid voltage with a voltage returning from the converter unit. Alternatively, the charger includes a grid matching circuit, and the first coupling circuit does not have the grid matching circuit.

The matching circuit can include a circuit configured to match amplitude, phase, and waveform of a voltage generated at the converter unit from the battery with that of the grid.

The back up power circuit includes a second coupling circuit, which can include a switching circuit for switching a power input of the power supply to either the grid (during normal operation) or from the converter unit (during grid faults). A grid status, such as grid normal or grid fault signal, is used to control the switching circuit.

FIG. 23D

EV CHARGER WITH FAULT RIDE THROUGH CAPABILITY

BACKGROUND OF THE INVENTION

This invention relates to the field of electric vehicle (EV) charging equipment and more specifically to a low voltage fault detection system for EV supply equipment (EVSE).

EVSEs are essential components for charging EVs, and they need to be reliable, safe, and stable to ensure the EV charging process is performed smoothly. However, commercial, and industrial auxiliary power supplies often stop working when the AC grid voltage drops below an operating level. Thus, during a low voltage fault of the grid, in which the grid can drop to 10-20% of the nominal voltage value for a fraction of a second and staying below the nominal voltage value for a few seconds or more, the control circuit of the converter unit in the EVSE stops working, leading to a loss of gate control signals for the switching transistors in the switching converter unit. In addition, the voltage drop can also result in a loss of communication with the EV.

FIGS. 1A-1C illustrate a prior art EVSE (charger) for handling grid faults with a backup battery configuration. FIG. 1A shows a prior art charger 910, which is coupled to a grid 915, and which is configured to be coupled to an EV 914. The charger 910 includes a converter unit 911, which can be an AC-DC converter unit configured to convert the AC grid power to a DC voltage suitable for charging the EV. The conversion process is crucial as it directly impacts the charging speed and overall battery life of the electric vehicle.

The charger 910 includes a control unit 912, which is configured to regulate the conversion process of the converter unit. The control unit ensures that the correct voltage and current are supplied to the electric vehicle battery, for example, by providing appropriate gate signals to the switching elements in the converter unit. The control unit can be programmed to limit the charging rate, ensuring that the battery is not overcharged, which can result in reduced battery life and safety hazards. The control unit can be configured to monitor the charging process, detecting any anomalies or faults that may arise.

The charger 910 includes a power supply 913, which is configured to supply power to the control unit. For example, the power supply is coupled to the grid to receive power from the grid to power the control unit. The power supply can provide a stable power source to the control unit to ensure the operation of the control unit. Without a stable power supply, the control unit may experience interruptions, affecting the charging process and potentially causing damage to the battery or the charging system.

FIG. 1B shows a grid voltage status. Above a nominal value 917C, the grid voltage is in an operation region 916A, e.g., most equipment connected to the grid is designed to operate in this regime. Below the nominal value 917C, the grid voltage is in a fault region 916B, e.g., the grid connected equipment stops working in this regime.

Under normal operation 917A, the grid voltage is at an operating level. During a low voltage fault 917B, the grid voltage drops, for example, to below the nominal level. A low voltage fault is a condition in which the voltage of an AC grid drops suddenly, for example, to 10% or less of its nominal voltage value for a period of less than 1 second. The amplitude of this drop in voltage is dependent on the specific national grid codes that apply to the grid in question. The grid voltage gradually rises back to the operating level, for a total time of a few seconds. When this low voltage fault occurs, it can result in a number of negative impacts. For example, commercial and industrial auxiliary power supplies are often designed to stop functioning at these low input voltages. Additionally, electric vehicle charging stations (EVSE) may also cease to operate, leading to inconvenience and potential safety issues for EV drivers. Furthermore, a low voltage fault can also result in a loss of communication with the backend system and internally, potentially causing disruptions to energy management and control systems.

FIG. 1C shows a prior art charger using an internal battery to provide a backup power during voltage fault. Alternatively, other energy buffer, such as supercapacitors, can be used. A charger 910* includes a converter unit 911, a control unit 912, and a power supply 913. A battery 918 can be included to provide a backup power to the power supply, in order to power the control unit during a low voltage fault. The backup battery can add a level of complexity to the charger, for example, by having a periodic maintenance schedule to ensure that the backup battery is still operational.

Thus, there is a need for an improved charger with a fault ride through capability, in order to maintain its control and communication during grid faults.

SUMMARY OF THE EMBODIMENTS

In some embodiments, the present invention discloses an Electric Vehicle Supply Equipment (EVSE) for an electric vehicle (EV) with a fault ride-through capability. The charger is configured to use power from the EV's battery as a backup power for control and communication units of the charger during a low voltage fault of a grid. During normal operations, the charger is connected to the grid to provide power to a converter unit of the charger, which converts the grid power to a form suitable for charging the EV's battery. The control unit of the charger draws power from the grid to provide control signals to the switching elements in the converter unit, and the communication unit of the charger also draws power from the grid to communicate with the EV.

During a grid fault, such as a low voltage grid fault in which the grid voltage drops below an operating level for a short time, the low grid voltage can cause the control and communication units to stop operating, leading to a loss of control and communication signals. The present charger with fault ride-through capability can use the battery power as a backup power for the control and communication units, allowing them to keep operating during a low voltage fault of the grid.

The fault ride-through capability includes a backup circuit configured to use power from the EV's battery during a grid fault. The backup circuit can include a first coupling circuit coupled to a converter unit of the charger, a second coupling circuit coupled to a power supply of the charger, or a connection circuit coupled between the first and second coupling circuits.

The first coupling circuit is configured to accept voltage from the EV's battery and generate voltage to the connection circuit. It can be placed at an internal point, an output point, or an input point of the converter unit.

The second coupling circuit is configured to replace the grid power with power from the first coupling circuit during the grid fault. It can be placed at an output point, an internal point, or an input point of the power supply. The second coupling circuit can include a switching circuit for switching between the grid power and the backup power based on the grid status.

The connection circuit can include a conditioning circuit, which is configured to convert the output voltage from the first coupling circuit to a voltage suitable for input to the second coupling circuit. It can include a DC-DC, DC-AC, AC-DC, or AC-AC converter component. Any combination of the first coupling circuit, the connection circuit, and the second coupling circuit can be optional.

Overall, the present invention provides a charger for an EV that can continue operating during a grid fault, allowing for uninterrupted charging and communication between the charger and the EV.

BRIEF DESCRIPTION OF THE DRAWINGS

FIGS. 1A-1C illustrate a prior art EVSE (charger) for handling grid faults with a backup battery configuration.

FIGS. 3A-3C illustrate flow charts for operating a charger with a fault ride through capability according to some embodiments.

FIGS. 4A-4C illustrate flow charts for forming chargers having a fault ride through capability according to some embodiments.

FIGS. 7A-7C illustrate flow charts for forming a charger having a configuration 1A according to some embodiments.

FIG. 9 illustrates a flow chart for a charger having configuration 1A according to some embodiments.

FIGS. 11A-11D illustrate flow charts for forming a charger having a configuration 1B according to some embodiments.

FIGS. 13A-13B illustrate flow charts for forming a charger having a power supply with a backup power input according to some embodiments.

FIGS. 14A-14B illustrate flow charts for forming a power supply with a backup power input according to some embodiments.

FIGS. 16A-16D illustrate flow charts for forming a charger having a configuration 2A or 2B according to some embodiments.

FIGS. 19A-19D illustrate flow charts for forming a charger having a configuration 1B according to some embodiments.

FIGS. 22A-22C illustrate a charger configuration with a grid matching circuit according to some embodiments.

FIGS. 23A-23D illustrate flow charts for forming a charger having a configuration 1B according to some embodiments.

DETAILED DESCRIPTION OF THE EMBODIMENTS

Figure 2A:
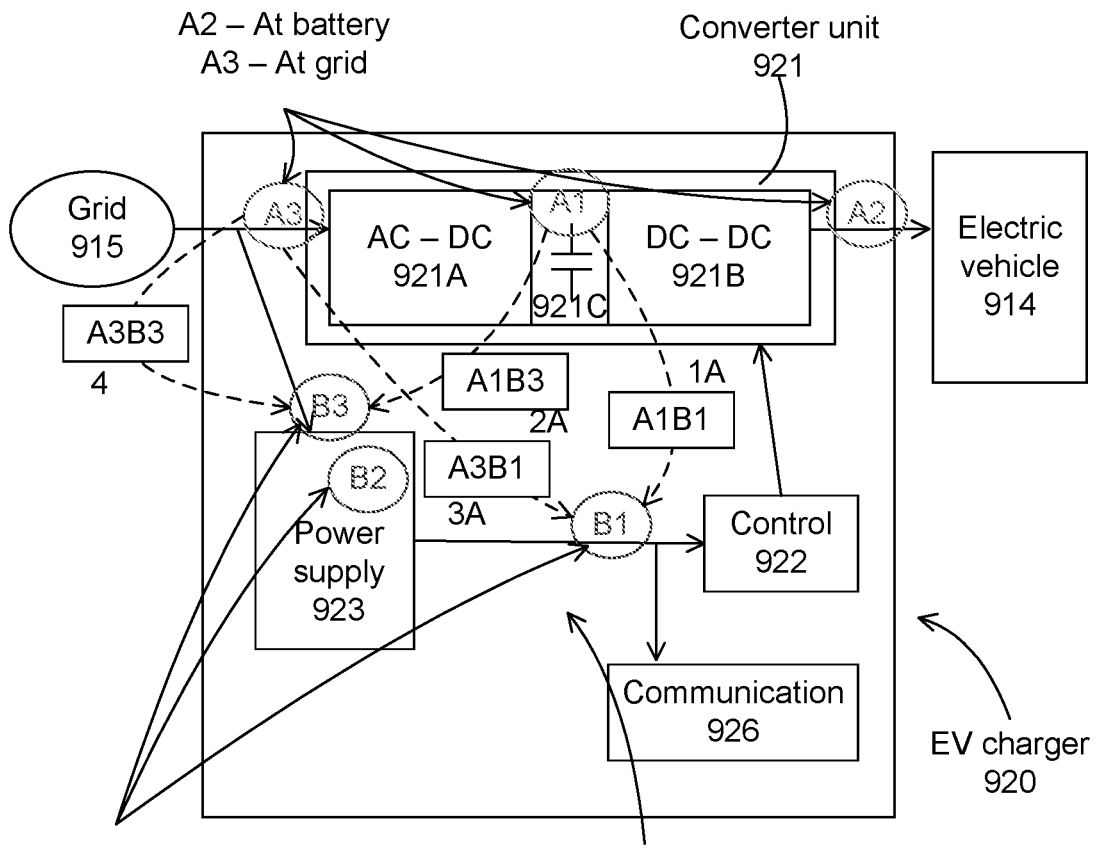
FIGS. 2A-2B illustrate configurations for chargers having a fault ride through capability according to some embodiments.

In some embodiments, the present invention discloses an electric vehicle (EV) charger, or EVSE, with a fault ride-through capability. The charger is designed to use the EV's battery as a backup power source for its control and communication units during a low-voltage fault on the AC grid, which can occur for a short time, usually between 0.4 ms to a few seconds.

The fault ride-through capability can prevent the loss of control and communication signals, such as a rebooting process resulting in the loss of the charging history, during the low voltage faults, thus improving the charger's reliability. The use of the EV's battery as a backup power source also reduces downtime and ensures the EV charging process is performed optimally. Moreover, the charger can maintain communication with the EV during the grid faults, reducing the risk of data loss and improving overall system performance. Compared to prior art battery backup systems, the fault ride-through capability with the EV's battery as the backup power source is highly advantageous due to the lack of an internal battery.

During normal operations, the charger is connected to the grid to power the converter unit, which converts the grid power into a suitable power to charge the EV's battery. The control unit of the charger draws power from the grid to provide control signals to the switching elements, such as MOSFETs, in the converter unit. The grid also powers the communication unit of the charger, allowing it to communicate with the EV and provide charging information.

During a grid fault, the control and communication units may stop operating, resulting in data loss. The charger with the fault ride-through capability can use the EV's battery power as a backup power source for the control and communication units, allowing them to keep operating during the low voltage fault of the grid.

In some embodiments, the present charger with a fault ride through capability includes a circuit, e.g., a backup circuit, configured to use power of a battery in the EV as a backup power for at least the control and communication units of the charger during a grid fault. The backup circuit can include an input circuit configured to accept a backup power from the battery, an output circuit configured to provide the backup power to the control and communication units, or a transfer circuit configured to transfer power from the input circuit to the output circuit. One or some of the circuits can be optional, such as a backup circuit with an input circuit without the output or transfer circuits, or a backup circuit with an input circuit and an output circuit without the transfer circuit.

The input circuit can be a first coupling circuit coupled to a power path from the battery of the EV, such as coupled to the terminals of the charger to be connected to the battery, coupled to an internal point or an input point of the converter unit with suitable bidirectional elements in the charger to ensure a power flow to the coupling point. The input circuit or first coupling circuit is configured to accept voltage from the battery and generate a voltage for the connection circuit.

The first coupling circuit can include just a coupler to a point that is connected to the battery, such as at terminals of the charger that are configured to be connected to the battery. The first coupling circuit can include additional circuits, such as a diode circuit to prevent back flow of a DC current. For example, the first coupling circuit can be coupled to the input of the converter unit, if the converter unit is a bidirectional converter unit, e.g., power can flow in a charging direction from the grid to the battery, and power can flow to the grid from the battery.

The output circuit can be a second coupling circuit coupled to a power path from the grid to the power ports of the control and communication units, such as coupled to the input, an internal point, or an output point of the power supply. The output circuit or the second coupling circuit is configured to replace the grid power with power from the first coupling circuit during the grid fault. The second coupling circuit can include a switching circuit that switches between grid power and backup power based on the grid's status. For example, the second coupling circuit can be coupled to the output of the power supply, to replace the power flow from the power supply during a grid fault.

The transfer circuit can be a connection circuit coupled between the input and output circuits. The transfer circuit is configured to condition the power from the output of the input circuit to be suitable as an input for the output circuit. The transfer circuit or the connection circuit can include a conditioning circuit, configured to convert an output voltage from the first coupling circuit to a voltage suitable to be inputted to the second coupling circuit. For example, if the input circuit is coupled to the battery, and the output circuit is coupled to the input of the power supply, then the transfer circuit can include a DC to AC converter to convert the DC voltage from the battery to the AC voltage to be supplied to the power supply.

One or more circuits of the backup circuit, e.g., the first coupling circuit, the connection circuit, or the second coupling circuit, can be optional, e.g., the backup circuit can include any combination of the first coupling circuit, the connection circuit, and the second coupling circuit.

Figure 2B:
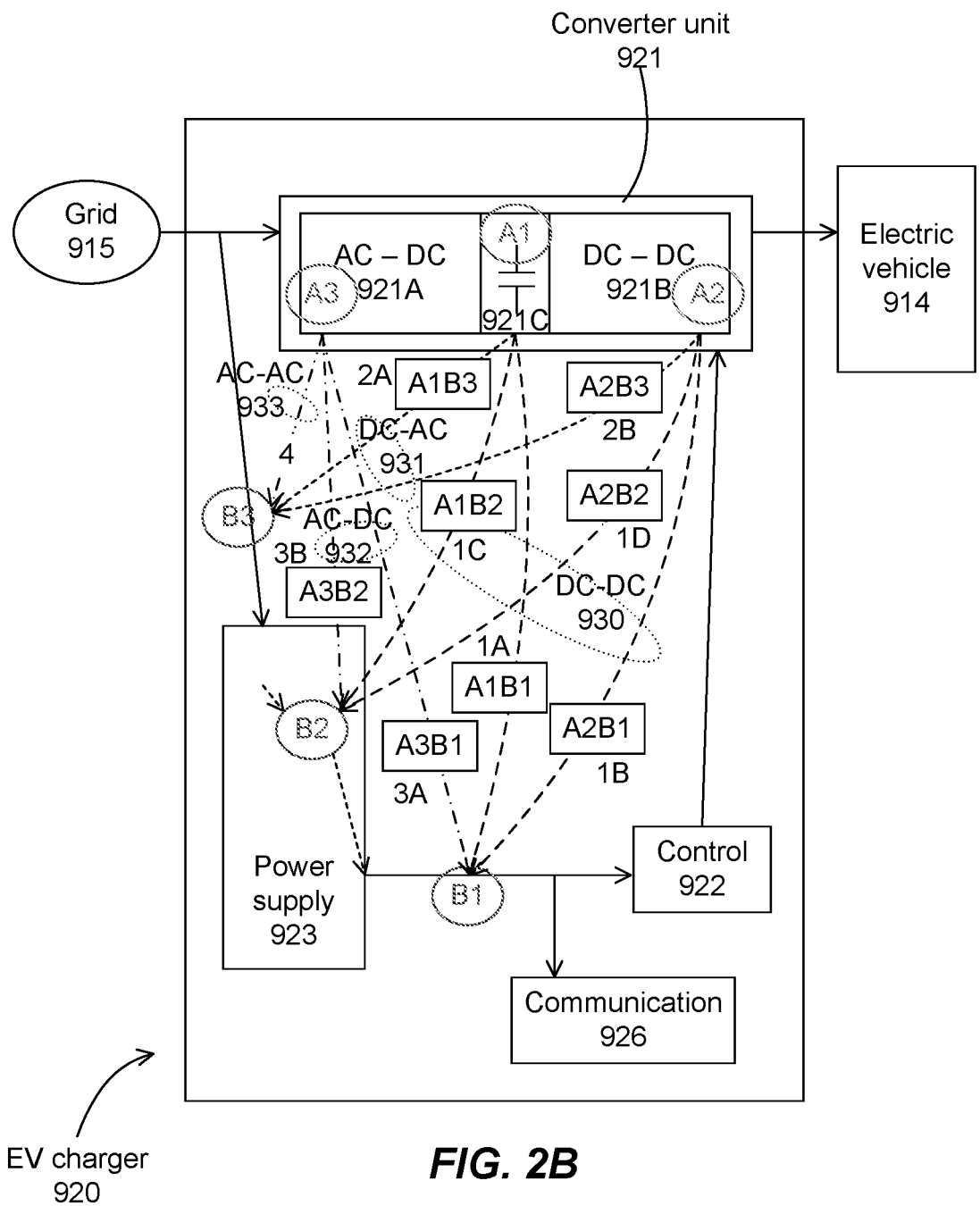

FIGS. 2A-2B illustrate configurations for chargers having a fault ride through capability according to some embodiments. A charger 920 can include a converter unit 921 configured to be coupled to a grid 915 and to a battery of an EV 914. The charger can include other circuits, such as filter circuits, or power factor correction (PFC) circuits. The converter unit 921 is configured to convert the grid power, for example, 340 to 550 VAC, 1 to 3 phases, to a voltage suitable for charging the EV, for example, 150-1000 VDC. The converter unit 921 can include an AC-DC converter element 921A, which is configured to rectify an input AC voltage to an intermediate DC voltage. The intermediate DC voltage can be 600-1000 VDC. A DC link capacitor 921C can be coupled to the intermediate DC voltage to reduce ripples. The converter unit 921 can include a DC-DC converter element 921B, which is configured to convert the intermediate DC voltage to an output DC voltage. The output DC voltage can be in a range of 150-1000 VDC to accommodate different battery voltages of different EVs.

The charger 920 can include a control unit 922 for controlling the converter unit 921, such as to provide switching signals with appropriate amplitudes, duty cycles, and frequencies to optimize the operation of the converter unit. The charger 920 can include a communication unit 926 for communicating with the EV. The charger 920 can include a power supply 923 for powering the control and communication units.

The charger 920 is also constructed with a backup power circuit to allow power from the battery of the EV to supply power to the control and communication units as a backup power during the low voltage fault.

The backup power circuit can include a first coupling circuit A1, A2, or A3, connected to a connection circuit A1B1, A1B2, . . . , A3B3, connected to a second coupling circuit B1, B2, or B3.

The first coupling circuit is selected to accept power from the battery to send to the connection circuit. There can be different first coupling circuits, such as A1, A2, and A3.

The first coupling circuit A1 can be disposed at an internal point of the converter unit, such as at a connection point between an AC-DC converter element 921A and a DC-DC converter element 921B. The DC-DC converter element 921B is a bidirectional converter element to allow power from the battery to flow in the opposite direction to reach the connection point A1. The AC-DC converter element can be unidirectional or bidirectional.

The first coupling circuit A2 can be disposed at an output point of the AC-DC converter unit 921, e.g., at the output of the DC-DC converter element 921B. The AC-DC converter element 921A and the DC-DC converter element 921B can be unidirectional or bidirectional, since power to the backup power circuit is drawn directly from the battery, without passing through the converter unit 921.

The first coupling circuit A3 can be disposed at an input point of the AC-DC converter unit 921, e.g., at the input of the AC-DC converter element 921A. The AC-DC converter element 921A and the DC-DC converter element 921B are both bidirectional, since power to the backup power circuit will flow in the opposite direction of the charging direction to reach the input point, e.g., passing through the DC-DC converter element and then through the AC-DC converter element.

The second coupling circuit is selected to deliver power from the backup power circuit to the final destination of the control and communication units. There can be different second coupling circuits, such as B1, B2, and B3.

The second coupling circuit B1 can be disposed at the power input of the control and communication units, which is the output of the power supply 923. Power from the backup power circuit can replace the power from the power supply to power the control and communication units.

The AC voltage that the power supply receives from the grid could be 1 phase, 2 phases, or 3 phases. The second coupling circuit B2 can be disposed at an internal point of the power supply. The power supply is connected to the grid to receive an AC voltage. The power supply is configured to deliver a DC voltage to power the control and communication units. So, the power supply includes voltage conversion sections, such as an AC-DC converter section, or an AC-DC converter section coupled to a DC-DC converter section. An internal point of the power supply can be the connection point between the AC-DC converter section and the DC-DC converter section.

A new design of power supply, or a redesign of an existing power supply can be performed to modify the existing power supply to accommodate the second coupling circuit B2.

The second coupling circuit B3 can be disposed at the input of the power supply, which is the same as the connection to the grid. Power from the backup power circuit can replace the power from the grid power to power the power supply, which in turn, powering the control and communication units.

From the different first and second coupling circuits, there are different connection circuits in the backup power circuit. The connection circuits can be grouped based on the input and output voltages, which can be DC-DC connectivity, DC-AC connectivity, AC-DC connectivity, and AC-AC connectivity.

In Configuration 1, the input and output voltages are all DC voltages, so the connection circuit presents a DC-to-DC connectivity. In this configuration, the first coupling circuit generates a DC voltage, for example, A1 and A2. The first coupling circuit can be just a coupling point, such as a connection point for an output line from the first coupling circuit. The first coupling circuit can include a diode or a diode-based circuit to restrict the DC current flow from the battery to the control and communication units.

The second coupling circuit, which can be B1 and B2, accepts a DC voltage from the connection circuit to replace a DC voltage from the power supply during grid faults. The second coupling circuit can be a DC switching circuit for selecting a power output from the power supply or from the backup power circuit.

With A1 and A2 being the first coupling circuits, and B1 and B2 being the second coupling circuits, there can be four different connection circuits, 1A, 1B, 1C, and 1D, all of which involve a DC-DC conditioning circuit, such as a DC-DC converter component, to match DC voltages at the first and second coupling circuits.

Configuration 1A includes circuit A1 coupled to circuit A1 B1 coupled to circuit B1. Circuit A1 is a coupling point at the bidirectional DC-DC converter element, such as at the DC link capacitor. Circuit A1B1 is a conditioning circuit to generate a low DC voltage (about 24 VDC or 48 VDC) to power the control and communication units, which is the same as the DC output generated from the power supply. Circuit B1 is a DC switching circuit to use as backup power, replacing the power supply during grid faults, such that the power line supplied to the control and communication units is switched between the power supply output (during normal grid operation) and the backup power from the connection circuit A1B1 (during grid faults).

In operation, power from the battery goes back to the converter unit 921 (through the bidirectional DC-DC converter element 921B, which provides a high DC voltage about 600-1000 VDC), feeds from circuit A1 to the conditioning circuit A1B1 to generate a low DC voltage (about 24 or 48 VDC), and then to the DC switching circuit B1 to provide backup power, replacing the power supply during grid faults. The DC switching circuit selects between the power supply output and the conditioning circuit output to send to the control and communication units.

Configuration 1B includes circuit A2 coupled to circuit A2B1 coupled to circuit B1. Circuit A2 is a coupling point at the output of the converter unit 921. Circuit A2B1 is a conditioning circuit to generate a low DC voltage (about 24 or 48 VDC). Circuit B1 is a DC switching circuit to use as backup power, replacing the power supply.

Connection circuit A2B1 is similar to A1B1, except that backup power comes directly from the battery without passing through the DC-DC converter element 921B. As such, the DC-DC converter element 921B can be unidirectional or bidirectional.

In operation, power from the battery, which is from circuit A2 (a high DC voltage between 150-1000 VDC due to different EV batteries), feeds directly to the conditioning circuit A2B1 to generate a low DC voltage (about 24 or 48 VDC), and then to the DC switching circuit B1 to be used as a backup power source replacing the power supply. The DC switching circuit selects between the power supply output and the conditioning circuit output to send to the control and communication units.

Configuration 1C includes circuit A1 coupled to circuit A1B2 coupled to circuit B2. Circuit A1 is a coupling point at the bidirectional DC-DC converter element, such as at the DC link capacitor. Circuit A1B2 is a conditioning circuit to generate a DC voltage (which can be a high DC voltage between 600 and 1000 VDC). Circuit B2 is a DC switching circuit within the power supply used as a backup power source, replacing the power supply.

Connection circuit A1B2 is similar to A1B1, except that backup power is supplied to the internal point of the power supply instead of to the output of the power supply.

In operation, power from the battery goes back to the converter unit 921 (through the bidirectional DC-DC converter element 921B, which provides a high DC voltage of about 600-1000 VDC), feeds from circuit A1 to the conditioning circuit A1B1 to generate a DC voltage to an internal point of the power supply. For example, the power supply can include a DC switching circuit to use the high DC voltage as a backup power source, replacing the DC power coming from the AC-DC converter section of the power supply. The DC switching circuit selects between the AC-DC converter section output and the high DC voltage from the converter unit to send to the DC-DC converter section. However, this is only possible if the AC-DC converter section generates a DC voltage comparable to the high DC voltage. Otherwise, a conditioning circuit is used to match the high DC voltage to the generated DC voltage from the AC-DC converter section.

Configuration 1D includes circuit A2 coupled to circuit A2B2 coupled to circuit B2. Circuit A2 is a coupling point at the output of the converter unit. Circuit A2B2 is a conditioning circuit to generate a DC voltage (which can be a high DC voltage between 600 and 1000 VDC). Circuit B2 is a DC switching circuit within the power supply used as a backup power source, replacing the power supply.

Connection circuit A2B2 is similar to A1B2, except that backup power comes directly from the battery without passing through the DC-DC converter element. In this case, a conditioning circuit is needed to convert the DC voltage of the battery (which can be 150-1000 VDC) to the generated DC voltage from the AC-DC converter section (which can be 600-1000 VDC, similar to the converter unit).

In configuration 2, the input voltage is a DC voltage, and the output voltage is an AC voltage, thus presenting a DC to AC connectivity. In this configuration, the first coupling circuit generates a DC voltage, e.g., A1 and A2. The first coupling circuit can be just a coupling point, e.g., a connection point for an output line from the first coupling circuit. The first coupling circuit can include a diode or a diode-based circuit to restrict the DC current flow from the battery to the control and communication units.

The second coupling circuit, which can be B3, accepts an AC voltage from the connection circuit to replace an AC voltage from the grid to the power supply during the grid faults. The second coupling circuit can be an AC switching circuit for selecting AC power from the grid or from the backup power circuit.

With A1 and A2 being the first coupling circuits, and B3 being the second coupling circuits, there can be 2 different connection circuits, 2A and 2B, all of which involve a DC-AC conditioning circuit such as a DC-AC converter component to match DC voltages at the first coupling circuit output and to match an AC voltage at the second coupling circuit output, and an AC switching circuit for selecting power input to the power supply to be from the grid or from the backup power circuit Configuration 2A includes circuit A1 coupled to circuit A1B3 coupled to circuit B3. Circuit A1 is a coupling point at the bidirectional DC-DC converter element, such as at the DC link capacitor. Circuit A1B3 is a conditioning circuit to generate an AC voltage (comparable with grid. 340-550 VAC, 1, 2, or 3 phases). Circuit B3 is an AC switching circuit to use as a backup power replacing the grid.

Connection circuit A1B3 is similar to A1B1, except that backup power is supplied to the input of the power supply (after being converted to an AC voltage) instead of to the output of the power supply.

In operation, power from the battery goes back to the converter unit 921 (through the bidirectional DC-DC converter element 921B which provides a high DC voltage of about 600-1000 VDC), then feeds from circuit A1 to the conditioning circuit A1B3 to generate a grid-comparable AC voltage (340-550 VAC, 1, 2, or 3 phases), and then to an AC switching circuit B3 to use as a back-up power replacing the grid power to the power supply. The DC-AC conditioning circuit A1B3 converts the high DC voltage about 600-1000 VDC to the grid-comparable AC voltage (340-550 VAC, 1, 2, or 3 phases). The AC switching circuit B3 selects between grid power and the DC-AC conditioning circuit output to send to the power supply.

Configuration 2B includes circuit A2 coupled to circuit A2B3 coupled to circuit B3. Circuit A2 is a coupling point at the output of the converter unit 921. Circuit A2B3 is a conditioning circuit to generate an AC voltage (comparable with grid, 340-550 VAC, 1, 2, or 3 phases). Circuit B3 is an AC switching circuit to use as a back-up power replacing the grid.

Connection circuit A2B3 is similar to A1B3, except that back-up power comes directly from the battery without passing through the DC-DC converter element. As such, the DC-DC converter element 921B can be unidirectional or bidirectional. The DC-AC conditioning circuit A2B3 converts the battery voltage (150-1000 VDC) to the grid-comparable AC voltage (340-550 VAC, 1, 2, or 3 phases).

In configuration 3, the input voltage is an AC voltage, and the output voltage is a DC voltage. Thus, the connection circuit presents an AC to DC connectivity. In this configuration, the first coupling circuit generates an AC voltage, e.g., A3. The first coupling circuit can be an AC switching circuit to prevent power from the battery from feeding to the grid during grid faults. The first coupling circuit can include a switching circuit.

The second coupling circuit, which can be B1 and B2, accepts a DC voltage from the connection circuit to replace a DC voltage from the power supply during grid faults. The second coupling circuit can be a DC switching circuit for selecting a power output from the power supply or from the back-up power circuit.

With A3 being the first coupling circuit, and B1 and B2 being the second coupling circuits, there can be 2 different connection circuits, 3A and 3B, both of which involve an AC-DC conditioning circuit such as an AC-DC converter component to match the AC voltage at the first coupling circuit and to match a DC voltage at the second coupling circuit, and a DC switching circuit for selecting the power output to the control unit from the power supply or the back-up power circuit.

Configuration 3A includes circuit A3 coupled to circuit A3B1 coupled to circuit B 1. Circuit A3 is an AC switching circuit from a point between the grid and the input to the converter unit. Circuit A3B1 is a conditioning circuit to generate a low DC voltage (about 24 VDC or 48 VDC) to power the control and communication units, which is the same as the DC output generated from the power supply. Circuit B1 is a DC switching circuit to use as a backup power, replacing the power supply, e.g., the power line supplied to the control and communication units is switched between the power supply output (during normal grid operation) and the backup power from the connection circuit A3B1 (during grid faults).

Connection circuit A3B1 is similar to A1B1, except that backup power is an AC voltage instead a DC voltage, so an AC-DC converter component is used instead of a DC-DC converter component.

In operation, power from the battery goes back the converter unit 921 (through the bidirectional DC-DC converter element 921B and the bidirectional AC-DC converter element 921A, which provides a grid-comparable AC voltage of 340-550 VAC, 1, 2, or 3 phases), feed from circuit A3 to the conditioning circuit A3B1 to generate a low DC voltage (about 24 or 48 VDC), and then to the DC switching circuit B1 to provide a backup power replacing the power supply during grid faults. The DC switching circuit selects between power supply output and the conditioning circuit output to send to the control and communication units.

Configuration 3B includes circuit A3 coupled to circuit A3B2 coupled to circuit B2. Circuit A3 is an AC switching circuit from a point between the grid and the input to the converter unit. Circuit A3B2 is a conditioning circuit to generate a DC voltage (could be a high DC voltage between 600 and 1000 VDC). Circuit B2 is a DC switching circuit within the power supply to use as a backup power replacing the power supply.

Connection circuit A3B2 is similar to A3B1, except that backup power comes to the internal point of the power supply instead of to the output of the power supply. As such, the conditioning circuit can generate a high DC voltage about 600-1000 VDC instead of a low DC voltage of 24 VDC.

In configuration 4, the input and output voltages are both AC. The first coupling circuit generates an AC voltage, e.g., A3, which can be an AC switching circuit to prevent power from the battery from feeding into the grid during grid faults. The first coupling circuit can include a switching circuit.

The second coupling circuit, which can be B3, accepts an AC voltage from the connection circuit to replace an AC voltage from the grid to the power supply during the grid faults. The second coupling circuit can be an AC switching circuit to prevent a back flow to the grid.

The second coupling circuit, which can be B3, accepts an AC voltage from the connection circuit to replace an AC voltage from the grid to the power supply during grid faults. The second coupling circuit can be an AC switching circuit to prevent backflow to the grid.

Configuration 4 includes circuit A3 coupled to circuit A3B3, which can be a connection line. Power from the battery goes back to the converter unit (through the bidirectional DC-DC converter element and through the bidirectional AC-DC converter element, which comes to a grid-comparable AC voltage of 340-550 VAC, 1, 2, or 3 phases). This power can be used to supply back to the grid from the battery, through a phase-matching circuit to prevent contamination of the grid power. Without the phase matching circuit, the power returning from the battery would need to be disconnected from the grid and only supply to the power supply.

An AC switching circuit can be used to allow a selection between the grid AC voltage and the grid-comparable AC voltage coming from the converter unit. The selection is then fed to the power supply.

During normal operation of the grid, the grid is connected to the input of the converter unit, and also to the power supply.

During grid fault, the grid is disconnected from the input of the converter unit. The grid is also disconnected from the power supply. The input of the converter unit (now becomes the output of the power converted from the battery through the DC-DC and then through the AC-DC) is connected to the power supply to provide the backup power.

FIGS. 3A-3C illustrate flow charts for operating a charger with a fault ride through capability according to some embodiments. In FIG. 3A, operation 300 uses power of a battery in an electric vehicle connected to a charger as a backup power during a low voltage fault of a grid providing power to the charger.

A low voltage grid fault is a common issue that occurs when the grid voltage drops suddenly to below a certain threshold, usually 10% of the nominal voltage value, and lasts for a few minutes. During a low voltage grid fault, the control and communication units of the EV charger stop working, which can result in the need for a reboot when the grid power comes back. This reboot process can be detrimental to the charging process, as it can cause the charging process to stop or be delayed.

The present charger provides a solution to the issue of low voltage grid faults by using the battery of the EV that is coupled to the charger as a back-up power source for the control and communication units during the low voltage grid fault. The battery of the EV can provide the necessary power to keep the control and communication units running, thus ensuring that the charging process continues uninterrupted.

In some embodiments, the low voltage grid fault is detected automatically, and the back-up power source is switched on to replace the grid power.

In FIG. 3B, operation 310 connects an electric vehicle to a charger for charging a battery of the electric vehicle. The charger is configured to be connected to a grid for supplying power to the charger to charge the battery. The grid is also configured to supply power to a control unit of the charger for controlling a voltage converter between the grid and the battery. The grid is optionally configured to supply power to a communication unit of the charger for communicating between the charger and the electric vehicle.

Operation 311 supplies power to the control unit and to the communication unit from the battery during a low voltage fault of the grid. Operation 312 resumes supplying power by the grid to the control unit and to the communication unit after the low voltage fault.

The charger has an AC-DC converter unit that is connected to the grid and to the battery to deliver power from the grid to the battery, and a power supply that is connected to the grid to deliver power to the control unit and communication unit of the charger.

The control unit is responsible for controlling the power conversion process from the grid to the battery and the communication unit is responsible for communicating with the EV. During a low voltage fault in the grid, the battery provides backup power to the control and communication units, thus ensuring that the control process for the power transfer and the communication process are not disrupted.

The control and communication units are equipped with a fault recognition system that can detect and respond to the low voltage fault in the grid. The system will recognize the low voltage fault and switch the power source from the grid to the battery to ensure that the control and communication units continue to receive power.

When the grid power returns to normal, the power supply will switch back to receiving power from the grid, and the AC-DC converter unit will resume charging the battery with power from the grid. The backup power from the EV battery ensures that there is no disruption of the operation of the control and communication units, which are crucial for ensuring that the power transfer from the grid to the battery is optimal.

In FIG. 3C, operation 320 connects an electric vehicle to a charger for charging a battery of the electric vehicle. The charger includes an AC-DC converter unit coupled to a grid, a control unit for controlling the conversion process, together with an optional communication unit for communicating with the electric vehicle, and a power supply coupled to the grid having an AC-DC component for supplying power to the control and communication units.

Operation 321 supplies power from the battery to the control and communication units during a low voltage fault of the grid. The power from the battery is coupled to one of an output, an internal point, or an input of the AC-DC converter unit. The power to the control and communication units is coupled to one of an output, an internal point, or an input of the power supply.

A method is provided using the battery of an electric vehicle as a backup power source for a charger during a low voltage grid fault. The method involves connecting a charger to the battery of the electric vehicle. The charger includes an AC-DC converter unit, a control unit, an optional communication unit, and a power supply.

The AC-DC converter unit is coupled to the grid and the battery, and it converts the AC power received from the grid into DC power that is delivered to the battery for charging. The control unit is responsible for controlling the power conversion process, such as matching the voltage of the output of the converter unit with the voltage of the battery and controlling the charging current. The optional communication unit communicates with the electric vehicle, such as to obtain information about the battery.

The power supply is coupled to the grid and supplies power to the control and communication units. In the event of a low voltage grid fault, the battery of the electric vehicle is used as a backup power source for the control and communication units. The backup power is delivered from the first contact point, which can be the output, an internal point, or the input of the AC-DC converter unit, to the second contact point, which can be the output, an internal point, or the input of the power supply.

By providing backup power from the battery, the method ensures that the control and communication units are always supplied with power, either from the grid or from the backup power, to avoid any disruption of the power transfer process from the grid to the battery through the converter unit. The use of the battery as a backup power source prevents the need for a reboot and ensures that the charging process is optimal.

FIGS. 4A-4C illustrate flow charts for forming chargers having a fault ride through capability according to some embodiments. In FIG. 4A, operation 400 forms a charger for an electric vehicle, the charger configured to use power of a battery in the electric vehicle connected to the charger as a backup power during a low voltage fault of a grid providing power to the charger.

A charger can be configured for charging a battery of an electric vehicle from a grid power. The charger includes a backup power circuit coupled to the battery to power control and communication units of the charger during the low voltage grid fault.

In FIG. 4B, operation 410 forms a charger for charging an electric vehicle with power supplied from a grid. The charger includes a circuit configured to use power of a battery in the electric vehicle as a backup power during a fault of the grid. The circuit includes at least one of a first coupling circuit coupled to a converter unit of the charger, a second coupling circuit coupled to a power supply of the charger, or a connection circuit coupled between the first and second coupling circuit.

The first coupling circuit is configured to accept a voltage from a battery of the electric vehicle, with the electric vehicle connected to the charger, and to generate a voltage to the connection circuit. The second coupling circuit is configured to replace power from the grid with power from the first coupling circuit during the grid fault.

A charger includes a power backup circuit configured to be connected to the battery to receive power from the battery. The power backup circuit is configured to supply power to a control unit of the charger during a low voltage fault of the grid, with the control unit configured for controlling a converter unit of the charger for matching voltages of the grid and the battery.

The power backup circuit is optionally configured to supply power to a communication unit of the charger during the low voltage fault, with the communication unit configured for a communication between the charger and the electric vehicle.

The power backup circuit includes at least one of a first coupling circuit coupled to a converter unit of the charger, a second coupling circuit coupled to a power supply of the charger, or a connection circuit coupled between the first and second coupling circuit. The power backup circuit can include all three circuits if coupling point (for 3 lines to be coupled together) and a connection line (just a wire coupling 2 points) are considered circuits.

The first coupling circuit is configured to accept a power from a battery of the electric vehicle, with the electric vehicle connected to the charger. For example, the first coupling circuit can be coupled to a converter unit of the charger, such as to couple to an output of the converter unit, to an input of the converter unit, or to an internal point of the converter unit.

The first coupling circuit is configured to generate a voltage to send the connection circuit. The generated voltage can be a DC voltage or an AC voltage.

The second coupling circuit is configured to replace power from the grid with power from the first coupling circuit during the grid fault. For example, the second coupling circuit can be coupled to a power supply of the charger, with the power supply is configured to powering a control unit configured to control the converter unit. The second coupling circuit can be coupled to an output of the power supply, to an input of the power supply, or to an internal point of the power supply.

The connection circuit is configured to match voltages between the first and second coupling circuit, which can include a DC-DC conditioning, a DC-AC conditioning, an AC-DC conditioning, or simply a connection line if the voltages are already matched. For example, the connection circuit can include a DC-DC converter component, a DC-AC converter component, an AC-DC converter component, or a connection wire.

Under a normal operating condition, e.g., when the voltage of the grid is at a nominal value, the converter unit is coupled to the grid to receive power from the grid and to convert the power to optimum voltage and current values to deliver to the battery to charge the battery.

Under the normal operating condition, a power supply in the charger is also coupled to the grid to deliver power to a control unit of the charger which is configured to control the power conversion process from the grid to the battery to obtain high power transfer efficiency or long battery life, and to a communication unit of the charger which is configured to communicate with the electric vehicle.

During a low voltage fault of the grid, the backup power circuit receives power from the battery to supply power to the control and communication units to prevent disruption of the control process for the power transfer and the communication process. The power transfer process can be significantly reduced due to the grid fault, but there is no disruption of the control process, such as no loss of power transfer efficiency or no shortening of battery life.

The control and communication units can be configured to recognize a grid fault, and how to handle the converter unit during the grid fault, for example, by maintaining characteristics of the converter unit, such as duty cycle and frequency during the fault.

When the grid power returns to normal, the grid then resumes supplying power to the control and communication units through the power supply.

With the backup power from the battery of the electric vehicle, there is no disruption of the operation of the control and communication units, e.g., the control and communication units always receive power, either from the grid or from the backup power, to ensure that the power transfer from the grid to the battery through the converter unit is optimal.

In FIG. 4C, operation 420 forms a charger for charging an electric vehicle with power supplied from a grid. The charger includes an AC/DC converter unit coupled to a grid, a control unit for controlling the conversion process, together with an optional communication unit for communicating with the electric vehicle, and a power supply coupled to the grid having an AC/DC component for supplying power to the control and communication units.

The charger includes a power backup circuit configured to supply power from the battery to the control and communication units during a low voltage fault of the grid. The power from the battery is coupled to an output, an internal point, or an input of the AC/DC converter unit. The power to the control and communication units is coupled to an output, an internal point, or an input of the power supply.

A charger includes an AC-DC converter unit (such as an AC-DC connected to a DC-DC through a DC link capacitor), which is coupled to a grid to receive power from the grid, and which is configured to be coupled to the battery of the electric vehicle.

The charger includes a control unit for controlling the power conversion process (such as matching the voltage of the output of the converter unit with the voltage of the battery, controlling the charging current to maximize the performance of the battery, controlling the rate of power transfer for maximizing efficiency).

The charger includes an optional communication unit for communicating with the electric vehicle (such as to obtain power remaining level of the battery, charging history of the battery, billing information).

The charger includes a power supply coupled to the grid for supplying power to the control and communication units. The power supply can include an AC-DC component to convert an AC grid voltage to a DC voltage for powering the electronics of the control and communication units.

The charger includes a backup power circuit configured to obtain power from the battery to deliver to the control and communication units during a low voltage fault of the grid. The backup power circuit is connected between a first contact point and a second contact point.

The first contact point can be either (a) an output, (b) an internal point, or (c) an input of the AC-DC converter unit. (a) The backup power can be delivered from the output of the AC-DC converter unit, which is a DC output from the converter unit. (b) The backup power can be delivered from an internal point of the AC-DC converter unit. For example, if the converter unit includes an AC-DC element coupled to a DC-DC element, then an internal point can be at the output of the AC-DC element, which is also the input of the DC-DC element. In this topology, a DC link capacitor can be used to reduce ripples due to the rapid switching of the converter unit. The DC link capacitor can be used to stabilize the DC output voltage and reduce fluctuation. (c) The backup power can be delivered from the input of the AC-DC converter unit, which is an AC output of the grid.

The second contact point can be either (a) an output, (b) an internal point, or (c) an input of the power supply. (a) The backup power can be delivered to the output of the power supply, which is a DC output converted from the AC power from the grid by the power supply. (b) The backup power can be delivered to an internal point of the power supply. For example, if the power supply is a switch mode power supply, which includes an AC-DC element coupled to a DC-DC element, then an internal point can be at the output of the AC-DC element, which is also the input of the DC-DC element. (c) The backup power can be delivered to the input of the power supply, which is an AC output of the grid.

Figure 5A:
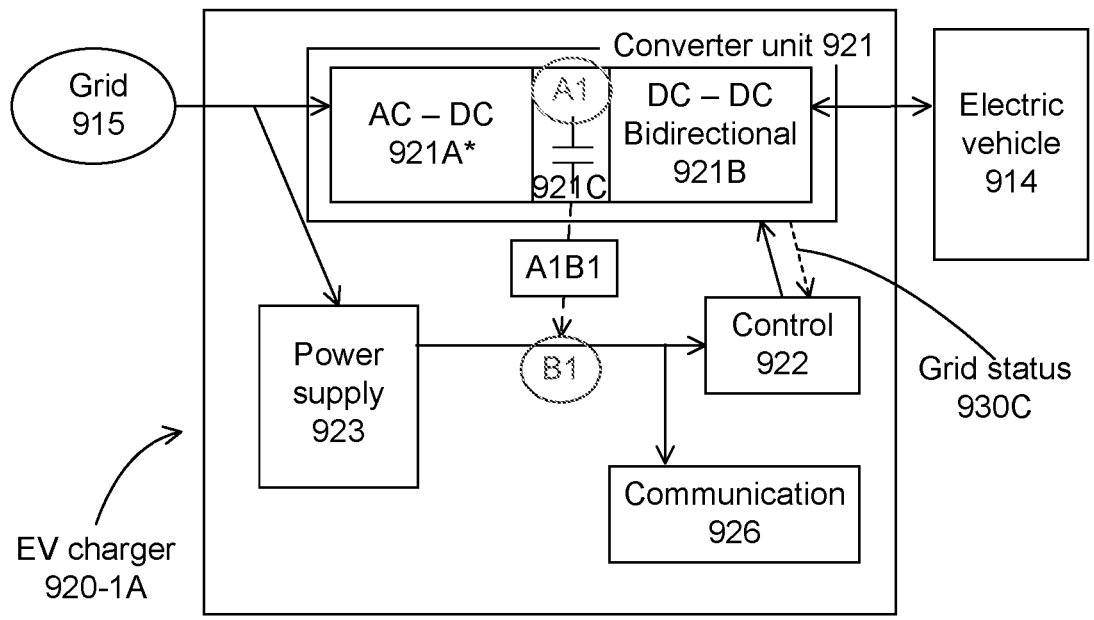
FIGS. 5A-5B illustrate a first DC-DC connectivity configuration (1A) for a charger according to some embodiments.
Figure 5B:
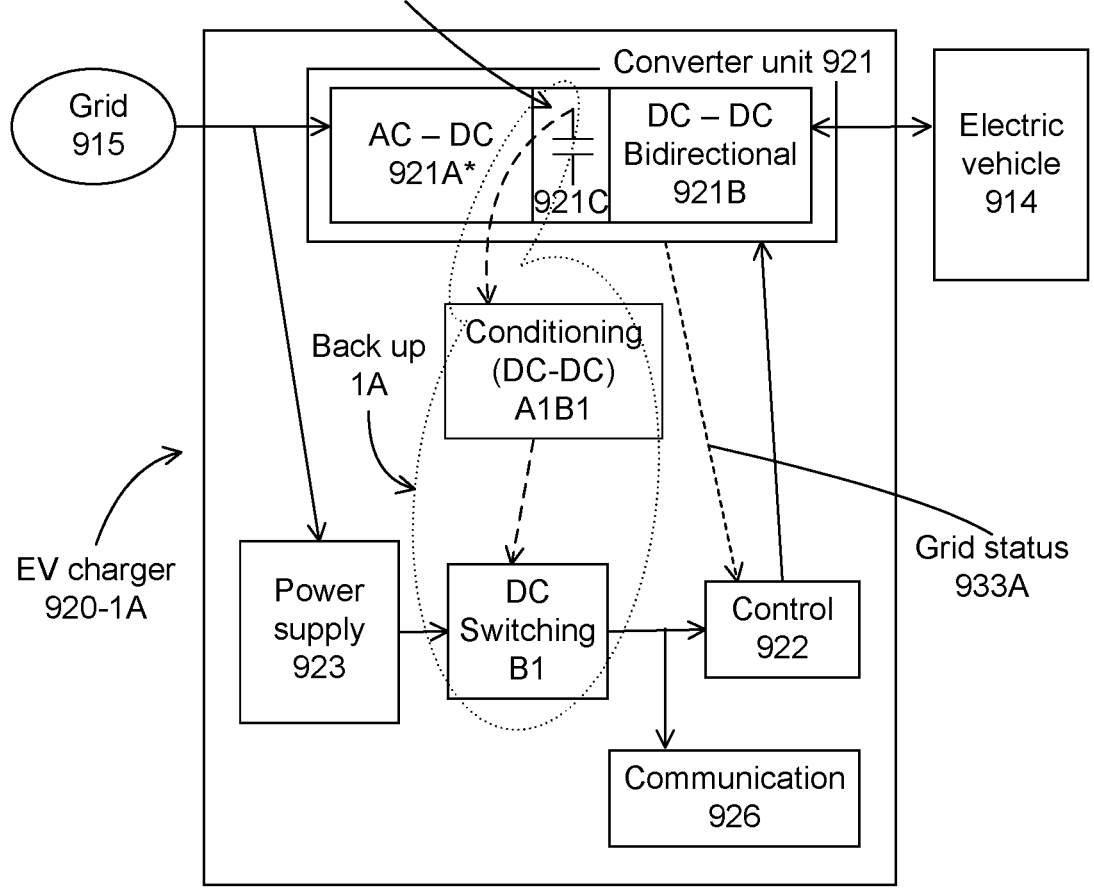

FIGS. 5A-5B illustrate a first DC-DC connectivity configuration (1A) for a charger according to some embodiments. In this configuration, the backup circuit includes a first DC coupling circuit A1, a second DC coupling circuit B1, and a DC-DC connection circuit A1B1, e.g., A1-A1B1-B1. In general, this configuration requires a bidirectional DC-DC converter element 921B in the converter unit 921, in order for the circuit A1 to accept a DC voltage from the DC link capacitor 921C. The connection circuit A1B1 is a conditioning circuit to match the DC voltage at the circuit A1 (which can be 600-1000 VDC) with the DC voltage at the circuit B1 (which can be 24-48 VDC). The circuit B1 can be a switching circuit to toggle between the grid power and the backup power.

FIG. 5A shows a schematic drawing of a charger. The charger 920-1A includes a backup power circuit including a first coupling circuit A1, which is coupled to a connection circuit A1B1, which is coupled to a second coupling circuit B1. The coupling circuit A1 includes a coupling connection at an internal point of the converter unit 921, such as at the DC link capacitor 921C. By having a bidirectional DC-DC converter element 921B in the converter unit, the backup power circuit can draw power from the battery. For example, power from the battery can go through the bidirectional DC-DC converter element 921B to the DC link capacitor, and then travels from the coupling connection at the DC link capacitor to the connection circuit A1B1. The AC-DC converter element 921A can be unidirectional or bidirectional.

The backup power circuit includes a second coupling circuit B1, which can include a switching circuit for selecting between power from the power supply output or power from the backup power circuit, coming from the connection circuit A1B1.

The backup power circuit includes the connection circuit A1B1 for matching voltages at the output of the first coupling circuit A1 and at the input of the second coupling circuit B1.

The backup power circuit is also coupled to the control 922 and communication 926 units of the charger for powering the control and communication units during a low voltage grid fault. During normal operation of the grid, a power supply 923 is configured to supply power to the control and communication units.

By providing power to the control and communication units during the low voltage grid fault, the charger can maintain an optimal battery charging despite the disruption of the grid power.

The control unit 922 can be designed to handle low voltage fault conditions, e.g., having sensors to recognize the low voltage fault, and programmed for an operation of the converter unit during the low voltage grid fault.

FIG. 5B shows a block diagram of a charger. The charger 920-1A includes a converter unit 921 for converting an AC power from a grid to a DC power to be delivered to a battery of an electric vehicle. The AC-DC converter unit 921 includes an AC-DC converter element 921A rectifying the grid AC voltage to generate a DC voltage, a DC-link capacitor filtering and smoothing out the DC voltage to provide a more stable DC voltage and to reduce fluctuation, and a DC-DC converter element 921B performs a DC-DC conversion using a high-frequency switching to deliver a DC voltage matching the battery voltage.

The DC-DC converter element 921B is a bidirectional DC-DC converter, which can allow the DC power to be transferred in both directions, e.g., the DC power can transfer from the DC link to the DC-DC converter element 921B to the battery (with the power to the DC link comes from the grid to the AC-DC converter element 921A) and the DC power can transfer from the battery to the DC-DC converter element 921B to the DC link 921C. In the second direction of battery—DC-DC converter element—DC link capacitor, the power stops at the DC link capacitor if the AC-DC converter element 921A is unidirectional. If the AC-DC converter element 921A is bidirectional, the power also goes to the grid through the AC-DC converter element.

The charger also includes a backup power circuit 1A, which is configured to provide power to control and communication units of the charger for powering the control unit for controlling the converter unit and for powering the communication unit for communication during the low voltage grid fault.

The backup power circuit 1A includes a first coupling circuit A1, which is coupled to an internal point of the converter unit, such as to the DC link capacitor 921C, to receive a backup power from the battery, which passes through the bidirectional DC-DC converter element 921B.

The backup power circuit 1A includes a connection circuit A1B1, which can be a conditioning circuit configured to match voltages at the input of the connection circuit (e.g., at the output of the first coupling circuit, e.g., at the DC link capacitor) to the output of the connection circuit (e.g., at the input of the second coupling circuit, e.g., to the switching circuit B1 of the backup power circuit)

The connection circuit A1B1 can include a DC-DC converter component A1B1, which converts the DC voltage at the DC link capacitor to the DC voltage used for powering the control and communication units. For example, the DC voltage at the DC link capacitor can be 600 VDC. The DC voltage used for powering the control and communication units can be 24 VDC. The DC-DC converter component 931A can be configured to convert the 600 VDC input to the 24 VDC output. The DC-DC converter component A1B1 can be unidirectional or bidirectional.

The backup power circuit 1A includes a second coupling circuit B1, which can be a switching circuit B1 for switching between the power supply output that is used to power the control and communication units and the backup power from the connection circuit A1B1 during a grid fault.

The control and communication units already configured to receive power from the power supply 923. The backup power line from the connection circuit of the backup power circuit can be connected directly to the power output of the power supply, e.g., the second coupling circuit can be just a coupling point for 2 input lines to an output line. Alternatively, the second coupling circuit can be a switching circuit, e.g., then backup power line from the connection circuit can be connected to the power input to the control and communication units through a switching circuit, which allows a selection of power to be inputted to the control and communication units.

If the DC-DC converter component A1B1 is unidirectional, then the power from the power supply will not be used to charge the battery, e.g., stop at the DC-DC converter component A1B1.

For direction connection, the DC voltages at the power supply 923 output and at the DC-DC converter component A1B1 output need to be very close, to prevent high current due to voltage mismatch. Small resistors can be used at the direct connection to prevent high current cases. Alternatively, diodes can be used, to replace the resistors or to add to the resistors to prevent current back flow. For switching circuits, relay or MOSFET configurations can be used, based on grid condition inputs.

The backup power circuit 1A includes an optional grid status line 933A, and additional circuits for the control 922, to allow the control 922 to handle the grid fault situations.

Figure 6A:
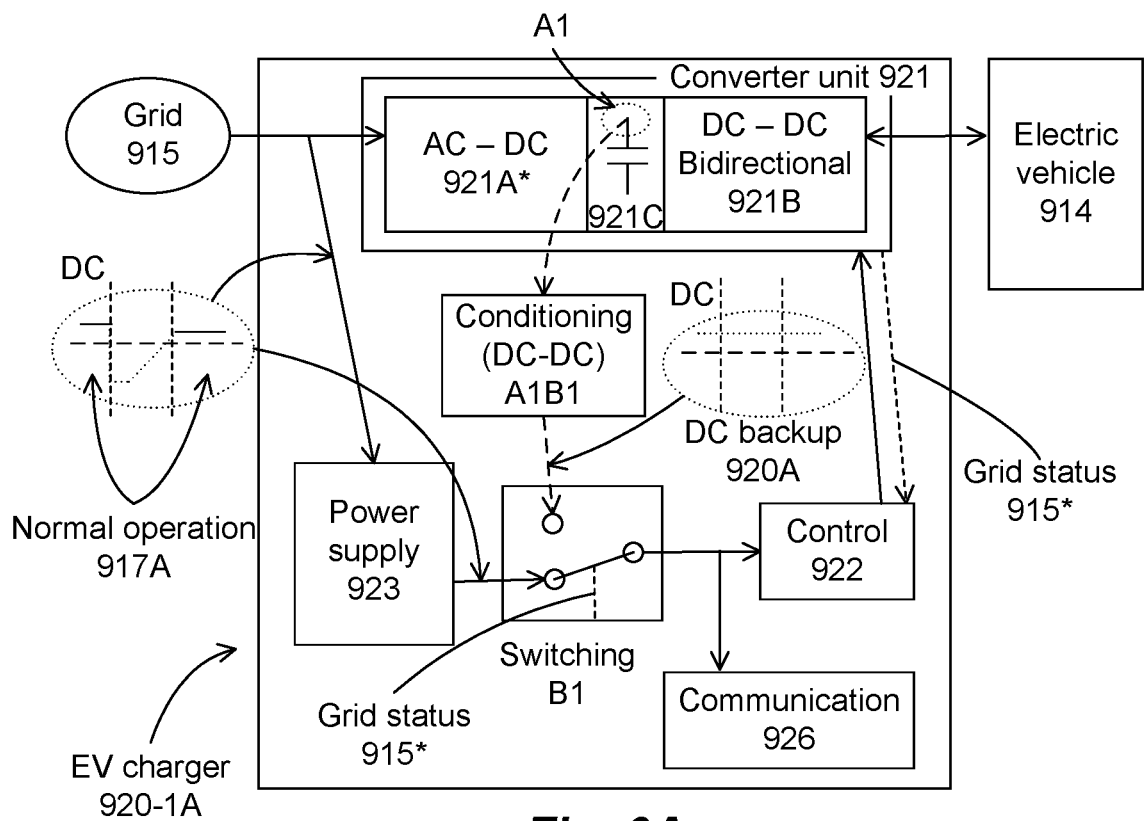
FIGS. 6A-6B illustrate an operation of a charger having configuration 1A according to some embodiments.
Figure 6B:
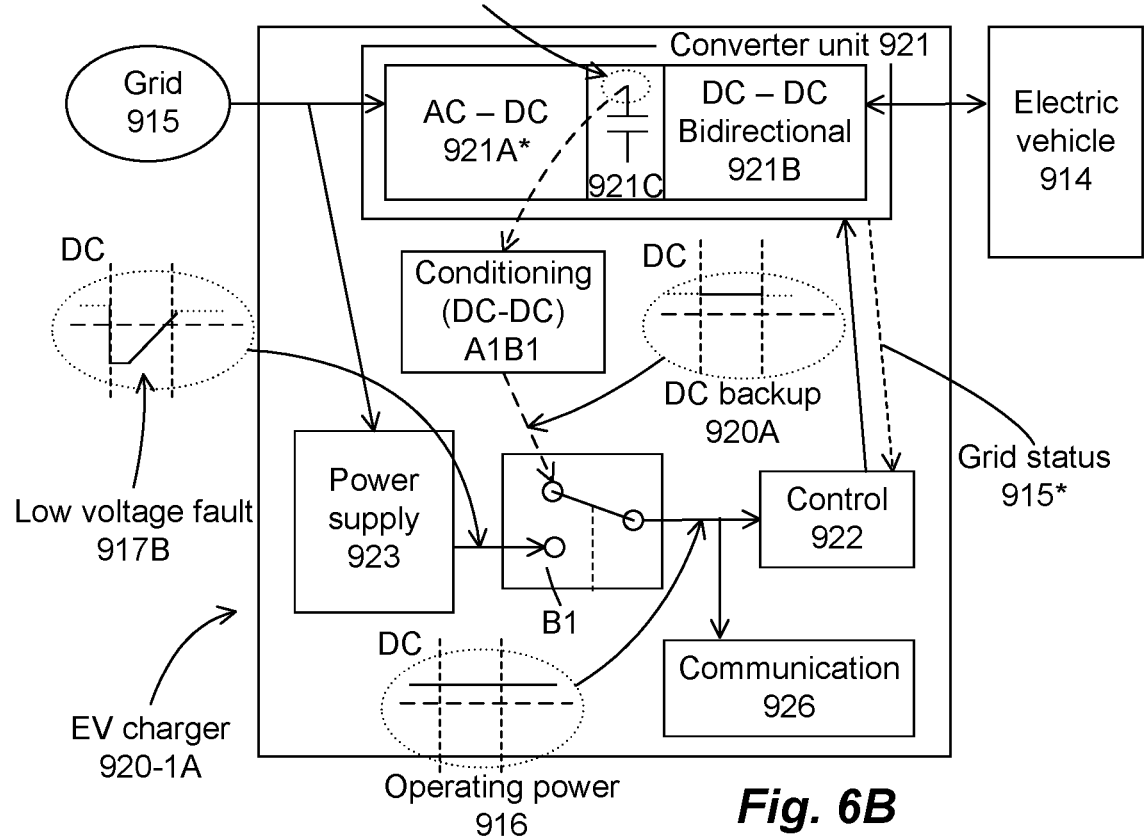

FIGS. 6A-6B illustrate an operation of a charger having configuration 1A according to some embodiments. During normal grid voltage, grid supplies power to the power supply to power the control and communication units. During low voltage grid faults, backup power from the battery is provided to the control and communication units.

FIG. 6A shows an operation of the charger during normal grid voltage. Under a normal operation 917A, at which the voltage at the grid is higher than an operation limit, AC power from the grid 915 is delivered to the converter unit 921, e.g., rectifying from the AC voltage to a DC voltage by the AC-DC converter element 921A, then, at the DC-DC converter element 921B, the DC voltage is converted to another DC voltage value suitable to charge a battery of the electric vehicle 914. A DC link capacitor is disposed at the output of the AC-DC converter element to reduce ripples.

The AC power can pass through a filter and a power factor correction circuit before being rectified by the AC-DC converter element.

The DC-DC converter element 921B is a bidirectional converter, meaning the power can pass through in either direction, e.g., from the output of the AC-DC converter element through the DC-DC converter element to the battery, or from the battery through the DC-DC converter element to the output of the AC-DC converter element.

A power supply 923 is included to provide power to a control unit, which is configured to control the filter circuit, the AC-DC element, and the DC-DC element.

Again, under the normal operation 917A, the power supply provides power to the control and communication units, with the switching circuit 932A switches to the power supply.

In this configuration, the switching circuit 932A is represented by a relay, controlled by the grid status signal 915*. For example, when the grid voltage is within the operating region, such as above the operating limit, the grid status signal is sent to the switching circuit 932A to allow the output of the power supply to connect to the inputs of the control and communication units.

In the backup power circuit, power is provided from the first coupling circuit A1, to the connection or conditioning circuit A1B1, which can be a DC-DC converter component to the second coupling circuit B1. A DC voltage is presented at the output of the DC-DC converter component, but cannot get through the switching circuit B1, since the grid status signal makes the switching circuit to ignore the backup power under normal grid operation.

FIG. 6B shows an operation of the charger during a low voltage grid fault. A low voltage grid fault 917B can occur at the grid, at which the voltage at the grid drops to a value lower than an operation limit, such as to less than 70% of a nominal voltage value, such as to about 10-20% of the nominal value, for more than a time limit such as more than 20 msec, such as about 600 msec. After the sharp drop, the grid voltage can slowly rise to the nominal value. By the time the grid voltage is above the operation limit, the low voltage fault can be a few seconds long, such as 3-5 seconds.

Under the low voltage fault 917B, the power supply is not capable of providing power to the control and communication units since the input AC power to the power supply drops to below an operating voltage limit for the power supply. In addition, the grid voltage drops can be longer than a hold up time of the power supply, which can cause the power supply to stop generating the DC voltage needed to power the control and communication units. For example, a duration of a low voltage grid fault can be much greater than 20 msec, e.g., in order of a few minutes such as 3 minutes, while the holdup time for a power supply is typically about 20 msec. The holdup time indicates the length of time a power supply is able to maintain a consistent output voltage at a regular output level, after it is shut down or in a power shortage.

The switching circuit B1 switches to the backup power, for example, due to the grid status signal indicating a voltage fault. When the grid voltage is under the operating limit, the grid status signal is sent to the switching circuit B1 to allow the output of the backup power circuit to connect to the inputs of the control and communication units.

The output of the power supply is disconnected, e.g., not capable of powering the control and communication units, due to the switching action of the switching circuit B1.

Since the input voltage from the grid 915 is low, there is no power delivered to the converter unit 921, e.g., the output voltage of the AC-DC converter element 921A drops significantly. The DC-DC converter element 921B does not function as intended, e.g., the output DC voltage from the DC-DC converter element 921B is below the DC voltage level needed for optimally charging the battery.

The control unit 922 can receive the grid status signal 915*, to know that the grid is under the low voltage grid fault. The control unit can prepare the converter unit 921 for the low voltage input, such as to stop the power transfer during the low voltage fault while keeping the status of the charging process before the occurrence of the low voltage fault. As such, after the grid returns to its normal operating condition, e.g., the grid voltage is above the operating limit, the control unit can resume the power transfer from the grid to the battery while maintaining an optimal power transfer scheme for maximizing power transfer efficiency, battery lifetime, and battery performance.

FIGS. 7A-7C illustrate flow charts for forming a charger having a configuration 1A according to some embodiments. In FIG. 7A, operation 700 connects an electric vehicle to a charger for charging a battery of the electric vehicle from a grid power. The charger includes an AC-DC unit coupled to a bidirectional DC-DC unit, a control unit for controlling the AC-DC and DC-DC units, together with an optional communication unit for communicating between with the electric vehicle, and a power supply coupled to the grid for supplying power to the control and communication units.

Operation 701 supplies power from the connection of the AC-DC unit with the bidirectional DC-DC unit to a DC output of the power supply for supplying power to the control and communication units during a low voltage fault of the grid.

In FIG. 7B, operation 710 forms a charger for an electric vehicle. The charger includes an AC-DC unit coupled to a bidirectional DC-DC unit, a control unit, together with an optional communication unit, and a power supply. The charger includes a power backup circuit configured to be connected to the bidirectional DC-DC unit to receive a DC power from the bidirectional DC-DC unit.

The power backup circuit is configured to supply power from the connection of the AC-DC unit with the bidirectional DC-DC unit to a DC output of the power supply for supplying power to the control and communication units during a low voltage fault of the grid.

These flow charts show methods to operate and to form a charger with a backup power circuit to operate during a grid fault. A first step is to connect the charger with an electric vehicle. The charger should already be connected to a grid to receive power from the grid.

The charger includes a converter unit for converting power from the gird, which is AC and can be 3 phase, 340-550 VAC for better efficiency, to a power that can be received by the battery of the electric vehicle, which can be 150 VDC to 1000 VDC depending on the electric vehicle, with high transfer efficiency, with better battery life, and with fast battery charge.

The converter unit can be a switch mode power source, which includes an AC-DC converter element to rectifying the AC input voltage. The AC-DC converter element is coupled to a bidirectional DC-DC converter element, at a connection point, using a switch mode conversion process. Filters and power factor correction elements can be included.

The switch mode power conversion can use power transistors for switching, such as SiC MOSFETs. Switching signals for the transistors can be generated by a control unit, which receives power from a power supply coupled to the grid, and which generates the switching signals with characteristics, such as duty cycles and frequency, for optimum power transfer.

The charger can include an optional communication unit for communicating with the electric vehicle, such as to receive information about the characteristics of the battery, the battery performance, the past charging history, together with other information such as billing information. The communication with the electric vehicle can include sending information to the vehicle about the charging process, such as the amount of charge, the current status of the battery after charged, and the billing data.

Under normal operation of the grid, e.g., when the voltage of the grid is above an operation limit or when the grid voltage is a nominal voltage value, the grid provides power to the converter unit to perform the power transfer. The grid also provides power to the power supply to provide power to the control unit to generate the switching signals, for example. The power supply also provides power to the communication unit to communicating with the electric vehicle about the power transfer process, which optionally includes the status of the grid.

The grid can experience low voltage faults, in which the grid voltage is below the operating limit. For example, the grid voltage can drop to a fraction of the nominal voltage, which can be as low as 10-20% of the nominal voltage value, and which can last for a few seconds before returning back to the nominal voltage value.

Under a low voltage fault, power from the battery at the connection point of the AC-DC converter element and the bidirectional DC-DC converter element, e.g., power from the battery travels through the bidirectional DC-DC converter element to the connection point, is used to power the control and communication units. For example, the power from the connection point can be coupled to an output of the power supply, and which can replace the power output of the power supply to provide power to the control and communication units during the low voltage fault.

In FIG. 7C, operation 720 forms a charger for an electric vehicle. The charger includes an AC-DC unit coupled to a bidirectional DC-DC unit, a control unit, an optional communication unit, and a power supply. The charger includes a power backup circuit including a connection circuit having a unidirectional or bidirectional DC-DC component configured to condition a DC voltage from the bidirectional DC-DC unit and a second coupling circuit having a switching component coupled to outputs of the power supply and the DC-DC component and also coupled to inputs of the control and communication units.

The switching component is configured to supply power from the output of the power supply or the output of the DC-DC component to the control and communication units during a normal operation or a low voltage fault of the grid, respectively.

This flow chart shows a method to form a charger with a backup power circuit to operate during a grid fault. The charger is configured to be connected to an electric vehicle. The charger is also configured to be connected to a grid to receive power from the grid to charge a battery of the electric vehicle.

The charger includes a converter unit, which includes an AC-DC converter element coupled to a bidirectional DC-DC converter element at a connection point. Filters and power factor correction elements can be included.

The charger includes a power supply coupled to the grid to receive grid power to provide power to a control unit configured to control the converter unit, such as to provide signals to control the gates of power transistors functioning as switches in the converter unit.

The charger can include an optional communication unit, which also receives power from the power supply.

The charger includes a backup power circuit, which includes a first coupling circuit having a coupling point to an internal point of the converter unit, to receive power from the battery through the bidirectional DC-DC converter element. The backup power circuit is configured to provide power to the control and communication units during grid fault event, such as during a low voltage fault of the grid, in which the grid voltage drops below an operating limit for more than a second.

The backup power circuit includes a connection or conditioning circuit which is configured to condition the voltage received from the converter unit to a voltage suitable to power the control and communication units, such as to a voltage comparable with the voltage provided by the power supply.

The conditioning circuit can include a DC-DC converter component, which is configured to convert a DC voltage received at the connection point (which is between 600 and 1000 VDC, depending on the design of the converter unit) to a DC voltage similar to the output voltage of the power supply (which can be 24 VDC or 48 VDC, depending on the design of the control and communication units).

The backup power circuit can include a second coupling circuit, which can be a switching circuit, which is configured to the control and communication units to use either one of the power supply output or the conditioning circuit output to power the control and communication units. Thus, the switching circuit has two inputs coupled to the power supply output and the conditioning circuit output. The switching circuit has one output coupled to the control and communication units.

The switching circuit is optional, since with proper designs, the two outputs of the power supply and the conditioning circuit can be directly connected to each other. The switching circuit can provide a more design flexibility, allow variations in grid power, in battery power, and in circuit components.

Figure 8:
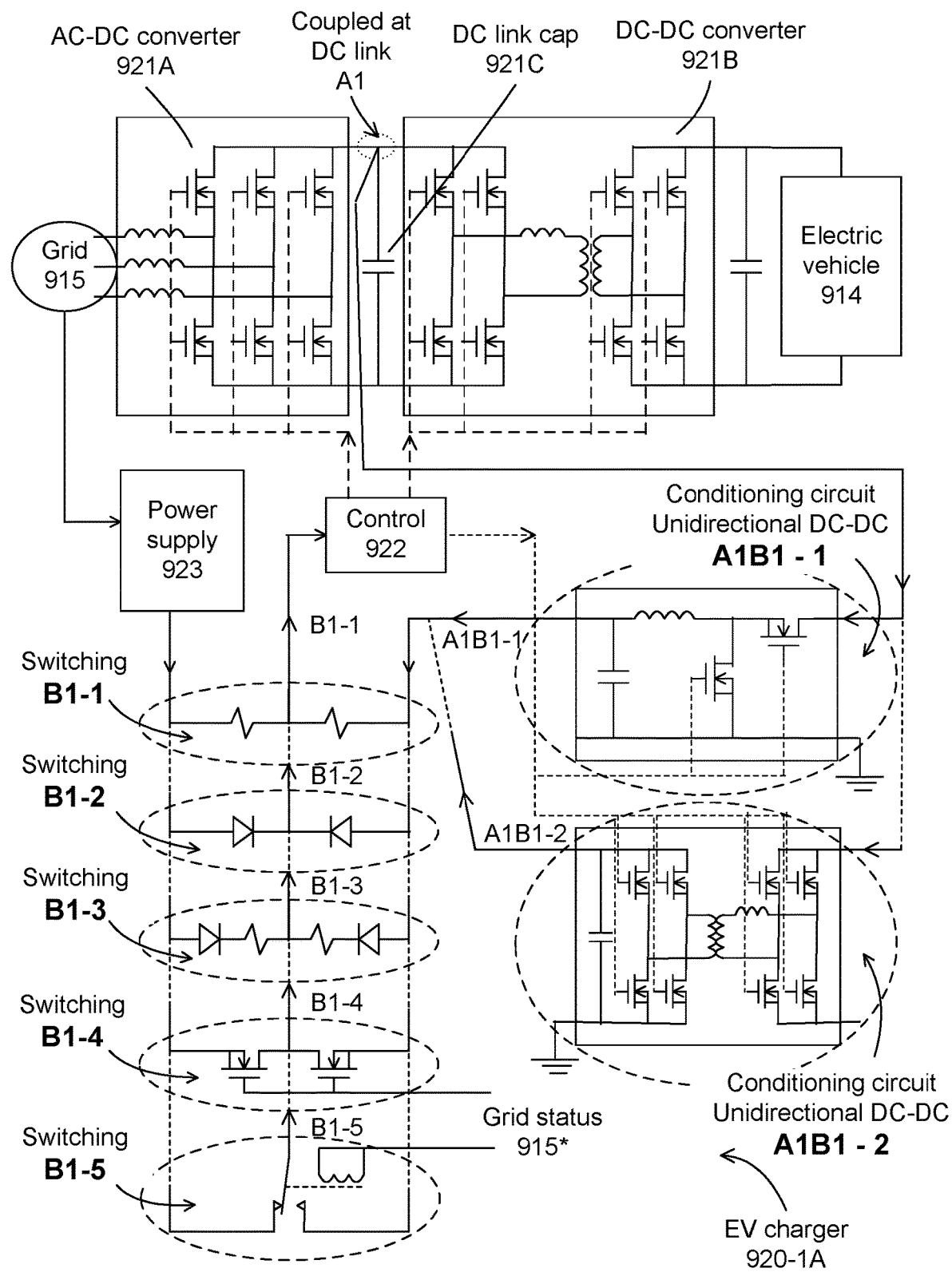
FIG. 8 illustrates a circuit diagram for a charger having configuration 1A according to some embodiments.

FIG. 8 illustrates a circuit diagram for a charger having configuration 1A according to some embodiments. Elements in this configuration can be used in other configurations, such as the switching circuits or the conditioning circuits.

In configuration 1A, a first coupling circuit of a backup circuit can be a coupling point. A connection or conditioning circuit of the backup circuit can be unidirectional DC-DC or bidirectional DC-DC converter components. A second coupling circuit of the backup circuit can be a switching circuit, which can be resistor based, diode based, combination of resistor and diode based, transistor based, or relay-based circuits.

A charger 920-1A for charging a battery of an electric vehicle from power of a grid, has a backup power circuit coupled between (an internal point of a DC link capacitor 921C of a converter unit 921 having a combination of an AC-DC converter element 921A and a DC-DC converter element 921B configured to transfer power from a grid 915 to the battery 914) to (an output of a power supply 923 configured to provide power to a control unit 922 for the converter unit 921).

The charger includes an AC-DC converter unit 921 (such as an AC-DC converter element 921A connected to a bidirectional DC-DC converter element 921B through a DC link capacitor 921C), which is configured to be coupled to a grid to receive power from the grid, and to be coupled to the battery of the electric vehicle.

The charger includes a control unit 922 for controlling the power conversion process, for example, by control the gates of the transistors in the AC-DC and DC-DC, for optimal duty cycles and switching frequency to match the voltage of the output of the converter unit with the voltage of the battery, to control the charging current to maximize the performance of the battery, to control the rate of power transfer for maximizing efficiency.

The charger includes an optional communication unit, not shown. The charger includes a power supply coupled to the grid for supplying power to the control unit. The power supply can include an AC-DC component (not shown) to convert an AC grid voltage to a DC voltage for powering the electronics of the control unit.

The charger includes a backup power circuit configured to obtain power from the battery to deliver to the control unit during a low voltage fault of the grid.

As shown, the backup power circuit is connected between the DC link capacitor point and an output of the power supply. Other configurations can be used and can be shown in other configurations.

The converter unit can be a bridgeless AC-DC configuration with a 3-phase totem pole configuration that switches each phase directly. A DC link capacitor is disposed at the output of the AC-DC configuration for reducing ripples. The DC-DC portion is a bidirectional configuration with a high frequency transformer configured for power isolation.

The DC link capacitor can be used to reduce ripples due to the rapid switching of the converter unit. The DC link capacitor can be used to stabilize the DC output voltage and reduce fluctuation.

The converter unit can achieve high power conversion efficiency by using SiC MOSFETs for the power switch. The trade-off between efficiency and electromagnetic interference can be optimized by adjusting the gate drive circuit's switching speed.

For example, the input voltage can be 3-phase AC between 340 and 550 VAC, with output DC voltages adjustable based on the electric vehicles, such as between 150 VDC to 1000 VDC. The delivering power can be 100 kW.

The control is configured to deliver pulses to control the gates of the SiC MOSFETs, including controlling the duty cycles and the frequency of the pulses.

A power supply connected to the grid, such as a 3-phase power supply to receive the grid 3 phase AC voltage, is configured to provide power, such as 24 VDC or 48 VDC, to the control. A backup power circuit including a conditioning circuit and an optional switching circuit, is configured to draw power from an internal point of the converter, such as at the DC link capacitor, to be configured as a backup power source for the power supply.

Power from the backup power circuit is drawn from a first coupling circuit A1, which can be just a coupling point at the DC link capacitor. The power provided is a DC voltage with a voltage of 600-1000 VDC, depending on the design of the converter unit. This DC voltage is higher than the power supply voltage for the control unit, so a connection circuit A1B1, which can be a voltage conditioning circuit, such as a voltage reduction circuit, is used to reduce the DC voltage to appropriate level, such as to 24 or 48 VDC.

A DC-DC converter component can be used, which can be a unidirectional DC-DC converter A1B1-1 or a bidirectional DC-DC converter A1B1-2.

As shown, a connection from the DC link can be provided to either the unidirectional DC-DC converter A1B1-1 or the bidirectional DC-DC converter A1B1-2.

An advantage of unidirectional DC-DC is simpler, together with no back flow of power from the power supply back to the battery of the electric vehicle.

The output of the conditioning circuit can be provided to the control unit, after the DC voltage is converted from the DC link voltage to the appropriate voltage of the power supply, such as 24 VDC.

A second coupling circuit, such as a switching circuit, can be used to select between the output of the power supply and the output of the conditioning circuit. When the grid voltage is under normal operating condition, the power from the power supply is used. When the grid experiences a low voltage fault, the power from the backup power circuit, e.g., from the conditioning circuit, is used.

The switching circuit B1-1 can be a resistor based, e.g., including one or more resistors coupled to the outputs of the power supply and the backup power circuit. If the output voltages are the same, then a direction connection can be used. Since the two voltages can be different, one or more resistors can be used to prevent the connection of two different voltages, which can lead to high current damages. For example, a resistor can be connected to each output, and the output of the resistors is provided to the control unit for powering the control unit.

The switching circuit B1-2 can be a diode based, e.g., including one or more diodes coupled to the outputs of the power supply and the backup power circuit. The diodes can prevent back flow of the current. For example, if the voltage backup power circuit is slightly lower than that of the power supply, the diode is reverse bias from the backup power circuit to the power supply, and thus, only the power from the power supply can be delivered to the control unit. As shown, a diode can be connected to each output, and the output of the diodes is provided to the control unit for powering the control unit.

The switching circuit B1-3 can be a resistor/diode based, e.g., including one or more resistors and one or more diodes coupled to the outputs of the power supply and the backup power circuit.

The switching circuit B1-4 can be a transistor based, e.g., including one or more transistors coupled to the outputs of the power supply and the backup power circuit. The transistor can function as switches to turn on or flow current flows. Signals from the status of the grid can be used to turn on or off the transistors. As shown, a transistor can be connected to each output, and the output of the transistors is provided to the control unit for powering the control unit.

The switching circuit B1-5 can be a relay based, e.g., including a relay switching between the outputs of the power supply and the backup power circuit. Signals from the status of the grid can be used to switch the relay.

FIG. 9 illustrates a flow chart for a charger having configuration 1A according to some embodiments. The charger can have different conditioning and switching circuits.

Operation 900 forms a charger for an electric vehicle. The charger includes a converter unit, with the converter unit including an AC-DC converter element coupled to a bidirectional DC-DC converter element. The charger includes a control unit for controlling the converter unit, The charger includes an optional communication unit for communicating with the electric vehicle. The charger includes a power supply for powering the control and communication units.

The charger includes a power backup circuit for powering the control and communication units during a grid voltage fault, such as a low voltage fault for more than a hundred of milliseconds.

The backup power circuit includes a first coupling circuit, which can be a coupling point at the converter unit, such as to a connection point between the AC-DC converter element and the bidirectional DC-DC element, to receive power from a battery of the electric vehicle through the bidirectional DC-DC converter element.

The backup power circuit includes a connection or conditioning circuit configured to convert a DC voltage received from the first coupling circuit (which includes a connection point) to a DC voltage suitable to power the control and communication units. The conditioning circuit can include a unidirectional or bidirectional DC-DC component.

The backup power circuit includes a second coupling circuit which can be a switching circuit, configured to select the power received by the control and communication units to be either the output of the power supply or the output of the conditioning circuit. The switching circuit can include a resistor-based switching circuit, a diode-based switching circuit, a combination of transistor and diode-based switching circuit, a transistor-based switching circuit, or a relay-based switching circuit.

This flow chart shows a method to form a charger with a backup power circuit to operate during a grid fault.

The charger is configured to be connected to an electric vehicle. The charger is also configured to be connected to a grid to receive power from the grid to charge a battery of the electric vehicle.

The charger includes a converter unit, which includes an AC-DC converter element coupled to a bidirectional DC-DC converter element at a connection point. Filters and power factor correction elements can be included.

The charger includes a control unit configured to control the converter unit, such as to generate control signals for gates of switching transistors in the AC-DC and DC-DC converter elements.

The charger includes a power supply coupled to the grid to receive grid power to provide power to the control unit.

The charger can include an optional communication unit, which also receives power from the power supply.

The charger includes a power backup circuit for powering the control and communication units during a grid voltage fault, such as a low voltage fault for more than a hundred of milliseconds.

The backup power circuit is connected to an internal point of the converter unit, such as to the connection point, to receive power from the battery through the bidirectional DC-DC converter element.

The backup power circuit includes a first coupling circuit, which can be just a coupling point at an internal point of the converter unit, such as at the DC link capacitor, which is the connection point between the output of the AC-DC converter element to the input of the bidirectional DC-DC converter element.

The backup power circuit includes a connection or conditioning circuit coupled to the first coupling circuit, which is the connection point, to receive power from a battery of the electric vehicle through the bidirectional DC-DC converter element and to convert a DC voltage received from the connection point to a DC voltage suitable to power the control and communication units.

The conditioning circuit can include a unidirectional DC-DC converter A1B1-1 or a bidirectional DC-DC converter A1B1-2.

An advantage of unidirectional DC-DC is simpler, together with no back flow of power from the power supply back to the battery of the electric vehicle.

The output of the conditioning circuit can be provided to the control and communication units, after the DC voltage is converted from the DC link voltage to the appropriate voltage of the power supply, such as 24 VDC.

The backup power circuit includes a second coupling circuit, such as a switching circuit configured to select the power received by the control and communication units to be either the output of the power supply or the output of the conditioning circuit. The switching circuit can include a resistor-based switching circuit, a diode-based switching circuit, a combination of transistor and diode-based switching circuit, a transistor-based switching circuit, or a relay-based switching circuit.

The switching circuit B1-1 can be a resistor based, e.g., including one or more resistors coupled to the outputs of the power supply and the backup power circuit. If the output voltages are the same, then a direction connection can be used. Since the two voltages can be different, one or more resistors can be used to prevent the connection of two different voltages, which can lead to high current damages. For example, a resistor can be connected to each output, and the output of the resistors is provided to the control unit for powering the control unit.

The switching circuit B1-2 can be a diode based, e.g., including one or more diodes coupled to the outputs of the power supply and the backup power circuit. The diodes can prevent back flow of the current. For example, if the voltage backup power circuit is slightly lower than that of the power supply, the diode is reverse bias from the backup power circuit to the power supply, and thus, only the power from the power supply can be delivered to the control unit. As shown, a diode can be connected to each output, and the output of the diodes is provided to the control unit for powering the control unit.

The switching circuit B1-3 can be a resistor/diode based, e.g., including one or more resistors and one or more diodes coupled to the outputs of the power supply and the backup power circuit.

The switching circuit B1-4 can be a transistor based, e.g., including one or more transistors coupled to the outputs of the power supply and the backup power circuit. The transistor can function as switches to turn on or flow current flows. Signals from the status of the grid can be used to turn on or off the transistors. As shown, a transistor can be connected to each output, and the output of the transistors is provided to the control unit for powering the control unit.

The switching circuit B1-5 can be a relay based, e.g., including a relay switching between the outputs of the power supply and the backup power circuit. Signals from the status of the grid can be used to switch the relay.

Figure 10A:
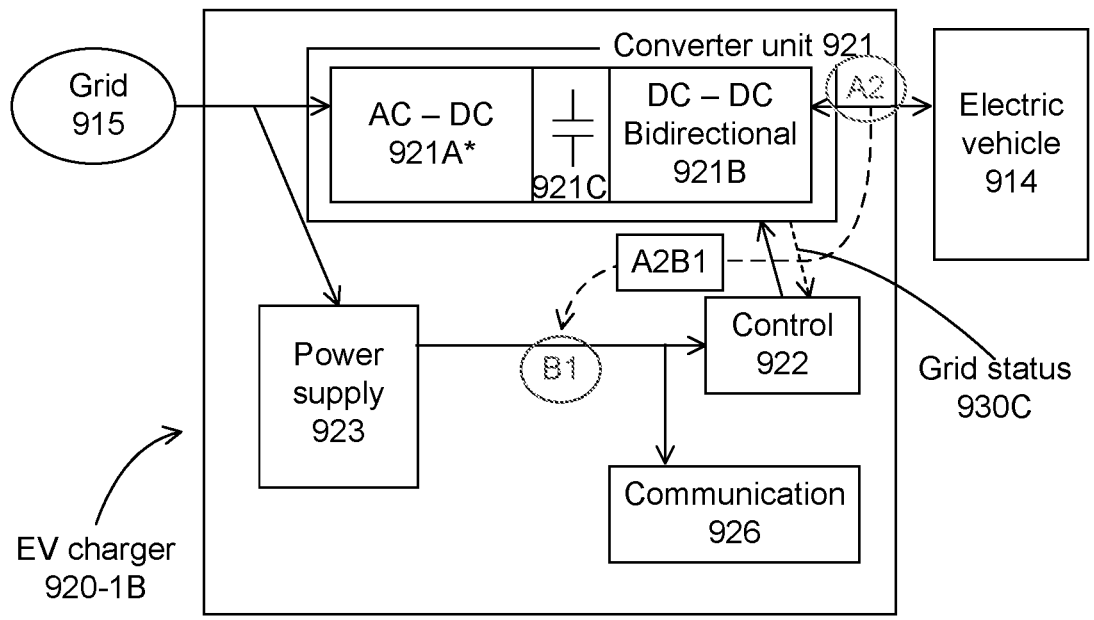
FIGS. 10A-10B illustrate another DC-DC connectivity configuration (1B) for a charger according to some embodiments.
Figure 10B:
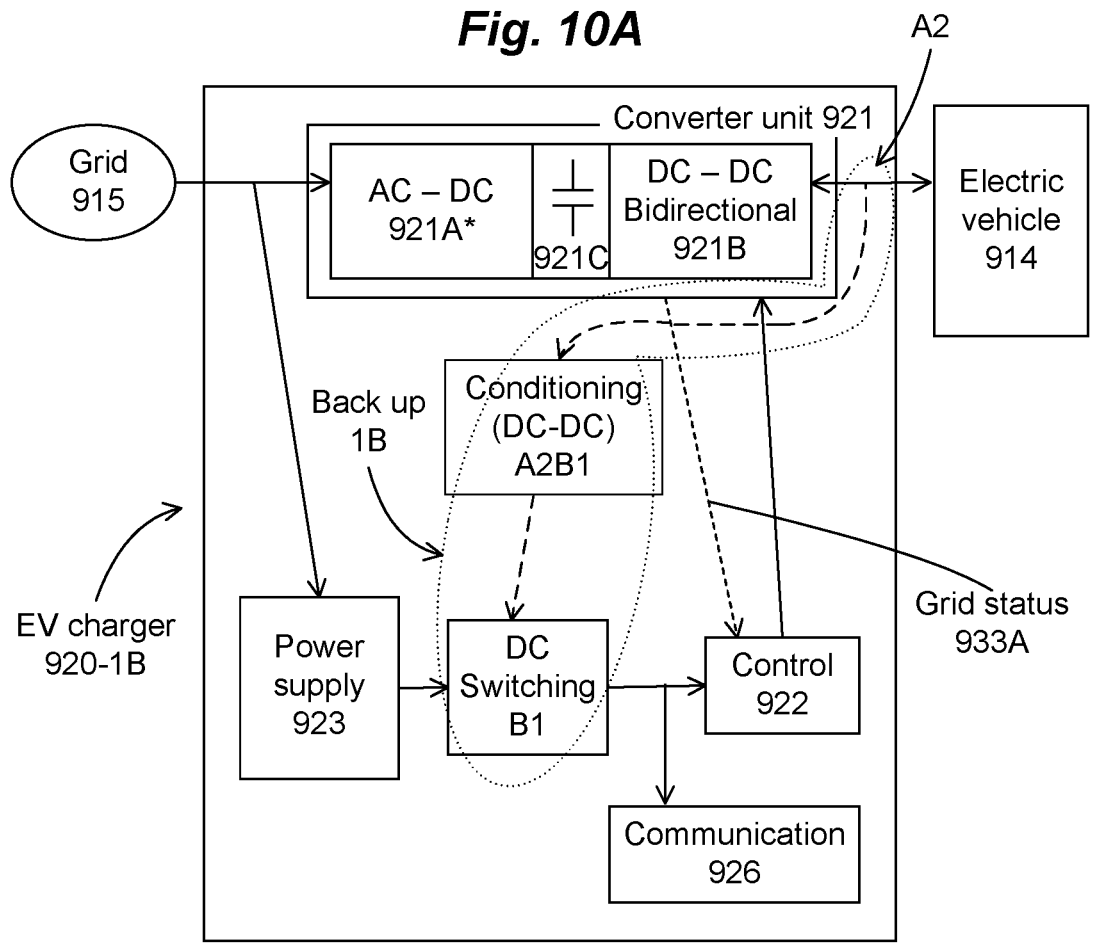

FIGS. 10A-10B illustrate another DC-DC connectivity configuration (1B) for a charger according to some embodiments. In this configuration, the backup circuit includes a first DC coupling circuit A2, a second DC coupling circuit B1, and a DC-DC connection circuit A2B1, e.g., A2-A2B1-B1.

Configuration 1B is similar to configuration 1A, with a difference being the first coupling circuit is at the output of the converter unit, instead of in an internal point. As such, the DC-DC converter element 921B in the converter unit 921 does not need to be bidirectional, e.g., the DC-DC converter element 921B can be unidirectional or bidirectional, since the power to the backup circuit is obtained directly from the battery, without passing through the DC-DC converter element 921B.

Another difference of configuration 1B with configuration 1A is that the DC-DC connection circuit A2B1 or A1B1 is different since the input of the DC-DC connection circuit A2B1 or A1B1 is coupled to the battery of the electric vehicle (1B), instead of to the DC link capacitor (1A).

For example, the DC-DC connection circuit A2B1 of configuration 1B can accept a DC voltage between 150 to 1000 VDC, which is the voltage of the battery of different electric vehicles. Thus, the DC-DC connection circuit A2B1 is designed to accept a range of DC voltages and to generate a low DC voltage.

In contrast, the DC-DC connection circuit A1B1 of configuration 1A needs to accept one DC voltage of 600-1000 VDC, and to generate the same low DC voltage. The input DC voltage of the DC-DC connection circuit A1B1 depends on the DC-DC converter element 921B of the converter unit 921. For example, if the DC-DC converter element has a DC voltage at the DC link capacitor to be 600 VDC, then the DC-DC converter component of configuration 1A will be designed to accept a DC voltage of 600 VDC. If the DC-DC converter element has multiple DC voltages at the DC link capacitor, such as 600 and 1000 VDC, then the DC-DC converter component of configuration 1A will be designed to accept two DC voltages of 600 and 1000 VDC.

A charger 920-1B includes a backup power circuit 1B including a first coupling circuit A2, which is coupled to a connection circuit A2B1, which is coupled to a second coupling circuit B1. The coupling circuit A2 includes a coupling connection at an output point of the converter unit, such as at the output of the DC-DC converter element 921B. The DC-DC converter element can be a unidirectional or bidirectional. This, power from the battery can go through the coupling circuit A2, which includes a separate branch to the connection circuit A2B1. The power then goes to the second coupling circuit B1, which is similar to that of the configuration 1A.

Advantages of the configuration 1B include the flexibility of the DC-DC converter element of the converter unit. It can be unidirectional or bidirectional.

Disadvantages of the configuration 1B include the complexity of the connection circuit A2B1, which will need to be designed to accommodate different battery voltages of different electric vehicles.

FIGS. 11A-11D illustrate flow charts for forming a charger having a configuration 1B according to some embodiments. In FIG. 11A, operation 1100 connects an electric vehicle to a charger for charging a battery of the electric vehicle from a grid power. The charger includes an AC-DC unit coupled to a DC-DC unit, a control unit for controlling the AC-DC and DC-DC units, together with an optional communication unit for communicating between with the electric vehicle, and a power supply coupled to the grid for supplying power to the control and communication units.

Operation 1101 supplies power from a connection of the electric vehicle to a DC output of the power supply for supplying power to the control and communication units during a low voltage fault of the grid.

In FIG. 11B, operation 1110 forms a charger for an electric vehicle. The charger includes an AC-DC unit coupled to a DC-DC unit, a control unit, together with an optional communication unit, and a power supply. The charger includes a power backup circuit configured to be connected to the electric vehicle to receive a DC power from the electric vehicle.

The power backup circuit is configured to supply power from the connection with the electric vehicle to a DC output of the power supply for supplying power to the control and communication units during a low voltage fault of the grid.

The flow charts show methods to operate and to form a charger with a backup power circuit to operate during a grid fault. The methods are similar to that of configuration 1A, except for a first coupling circuit having a connection with the electric vehicle, such as at the output of an AC-DC converter unit, except for the AC-DC converter unit having no constraint of bidirectional, and except for a DC-DC converter component suitable for an input of a battery of the electric vehicle.

A first step is to connect the charger with an electric vehicle. The charger should already be connected to a grid to receive power from the grid.

The converter unit can be a switch mode power source, which includes a circuit to convert an AC voltage from then grid to a DC voltage suitable for supplying to a battery of the electric vehicle.

Under a low voltage fault, power from the battery at the connection point of the AC-DC converter unit with the electric vehicle, e.g., power from the battery, is used to power the control and communication units.

In FIG. 11C, operation 1120 forms a charger for an electric vehicle. The charger includes an AC-DC converter unit, a control unit, an optional communication unit, and a power supply. The charger includes a power backup circuit including a first coupling circuit having a connection with the electric vehicle, a connection circuit having a unidirectional or bidirectional DC-DC component configured to condition a DC voltage from the connection with the electric vehicle, and a second coupling circuit having a switching component coupled to outputs of the power supply and the DC-DC component and also coupled to inputs of the control and communication units.

The switching component is configured to supply power from the output of the power supply or the output of the DC-DC component to the control and communication units during a normal operation or a low voltage fault of the grid, respectively.

This flow chart shows a method to form a charger with a backup power circuit to operate during a grid fault. The charger is configured to be connected to an electric vehicle. The charger is also configured to be connected to a grid to receive power from the grid to charge a battery of the electric vehicle. The charger includes a converter unit for converting an AC voltage from the grid to a DC voltage suitable to be provided to the battery.

The charger includes a backup power circuit, which includes a first coupling circuit having a coupling point to an output point of the converter unit, to receive power from the battery. The backup power circuit is configured to provide power to the control and communication units during grid fault event.

The backup power circuit includes a connection or conditioning circuit which is configured to condition the voltage received from the converter unit to a voltage suitable to power the control and communication units, such as to a voltage comparable with the voltage provided by the power supply.

The conditioning circuit can include a DC-DC converter component, which is configured to convert a DC voltage received at the coupling point (which is between 150 and 1000 VDC, depending on the battery of the electric vehicle) to a DC voltage similar to the output voltage of the power supply.

The DC-DC converter component is similar to that of configuration 1A, except that it should be configured to accept various voltages from different batteries of different electric vehicles.

The backup power circuit can include a second coupling circuit, which is similar to that of configuration 1A.

In FIG. 11D, operation 1130 forms a charger for an electric vehicle. The charger includes a converter unit. The charger includes a control unit for controlling the converter unit, The charger includes an optional communication unit for communicating with the electric vehicle. The charger includes a power supply for powering the control and communication units. The charger includes a power backup circuit for powering the control and communication units during a grid voltage fault, such as a low voltage fault for more than a hundred of milliseconds.

The backup power circuit includes a first coupling circuit, which can be a connection point with the electric vehicle, to receive power from a battery of the electric vehicle through a battery of the electric vehicle.

The backup power circuit includes a connection or conditioning circuit configured to convert a DC voltage received from the first coupling circuit (which includes a connection point) to a DC voltage suitable to power the control and communication units. The conditioning circuit can include a unidirectional or bidirectional DC-DC component.

The backup power circuit includes a second coupling circuit which can be a switching circuit, configured to select the power received by the control and communication units to be either the output of the power supply or the output of the conditioning circuit. The switching circuit can include a resistor-based switching circuit, a diode-based switching circuit, a combination of transistor and diode-based switching circuit, a transistor-based switching circuit, or a relay-based switching circuit.

In this flow chart, a charger for charging a battery of an electric vehicle from power of a grid, has a backup power circuit coupled between (an output point of an AC-DC converter unit configured to transfer power from a grid to the battery) to (an output of a power supply configured to provide power to a control unit for the converter unit).

A difference with configuration 1A is the coupling point with the output of the converter unit, instead of an internal point.

Power from the backup power circuit is drawn from a first coupling circuit A2, which can be just a coupling point at an output of the AC-DC converter unit. The power provided is a DC voltage with a voltage of 150-1000 VDC, depending on the electric vehicle to be charged by the charger.

A DC-DC converter component can be used as a connection circuit. The DC-DC converter component is similar to that of configuration 1A, except for a modification to convert voltages of battery ranges of 150-1000 VDC, instead of just one a few voltages at the DC link.

A second coupling circuit is included, which is similar to that of configuration 1A.

Figure 12A:
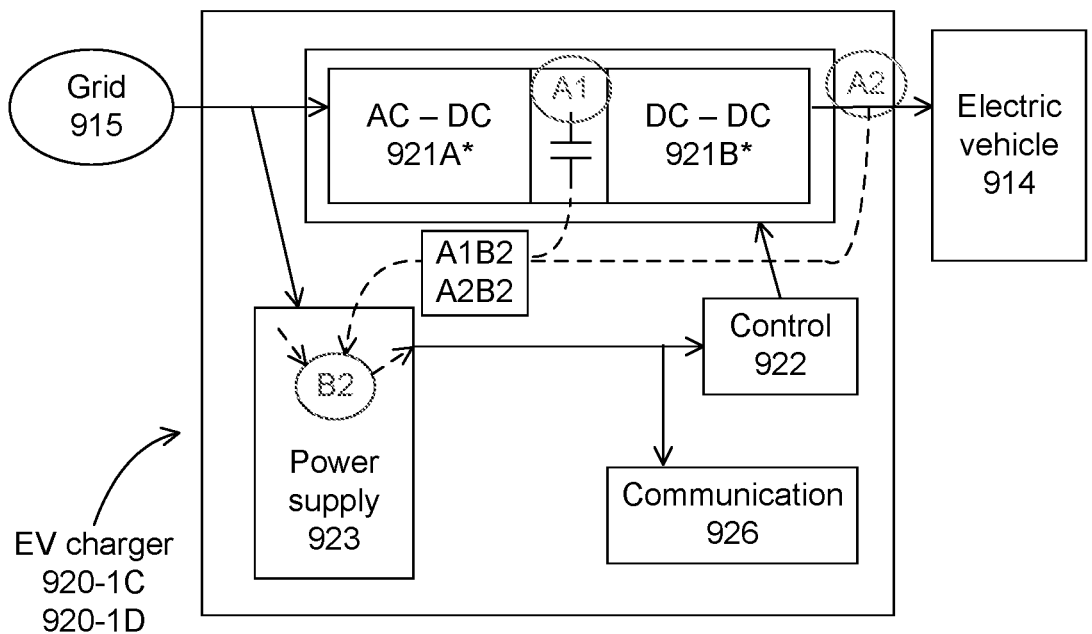
FIGS. 12A-12C illustrate other DC-DC connectivity configurations (1C and 1D) for a charger according to some embodiments.
Figure 12B:
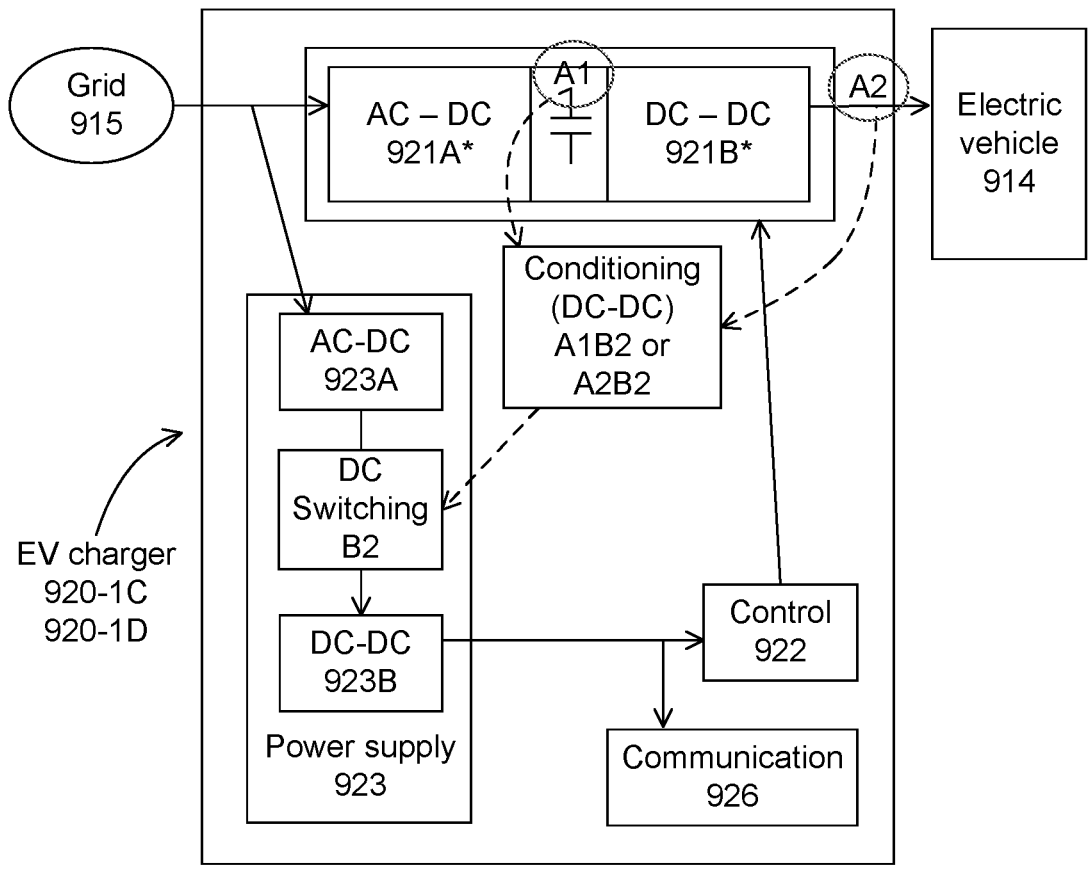
Figure 12C:
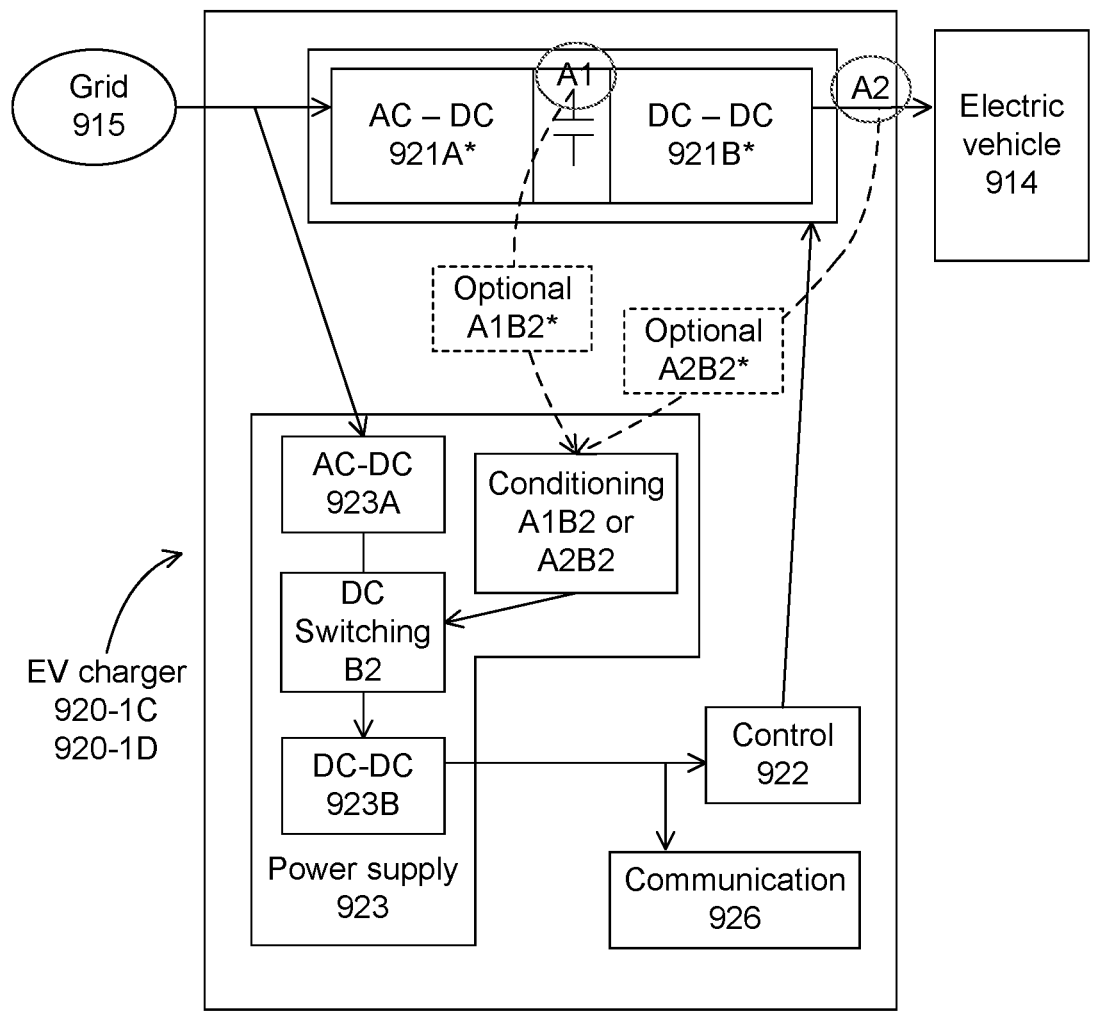

FIGS. 12A-12C illustrate other DC-DC connectivity configurations (1C and 1D) for a charger according to some embodiments. In configuration 1C, the backup circuit includes a first DC coupling circuit A1, a second DC coupling circuit B2, and a DC-DC connection circuit A1B2, e.g., A1-A1B2-B2. In configuration 1D, the backup circuit includes a first DC coupling circuit A2, a second DC coupling circuit B2, and a DC-DC connection circuit A2B2, e.g., A2-A2B2-B2.

Configurations 1C and 1D are similar to configurations 1A and 1B, respectively, with a difference being the second coupling circuit at an internal point of a power supply, instead of an output of the power supply. As a result, in configurations 1C and 1D, the power supply is modified to include the second coupling circuit. The power supply can be further modified to include a connection circuit, instead of or in addition to, having the connection circuit outside of the power supply.

FIG. 12A shows a schematic drawing of a charger. The charger 920-1C or 920-1D includes a backup power circuit including a first coupling circuit A1 or A2, which is coupled to a connection circuit A1B2 or A2B2, which is coupled to a second coupling circuit B2, respectively.

The backup power circuit includes a second coupling circuit B2, which is disposed inside the power supply for accepting the power from the connection circuit A1B2 or A2B2 as a backup power supply.

FIG. 12B shows a block diagram of a charger configuration. The charger 920-1C or 920-1D includes a converter unit 921, including an AC-DC converter element 921A, a DC-link capacitor, and a DC-DC converter element 921B.

The charger also includes a backup power circuit, which includes a first coupling circuit A1 or A2. The backup power circuit includes a connection circuit A1B2 or A2B2, which can be a conditioning circuit configured to match voltages at A1 or A2 to B2 in the power supply.

The backup power circuit includes a second coupling circuit B2, which can be a component of the power supply 923. For example, the power supply can include an AC-DC converter section 923A, coupled to a switching circuit B2, coupled to a DC-DC converter section 923B. The switching circuit B2 is configured for switching between the output of the AC-DC converter section 923A and the backup power from the connection circuit A1B2 or A2B2 during a grid fault.

The connection circuit A1B2 or A2B2 can include a DC-DC converter component, which converts the DC voltage at the DC link capacitor (for A1B2) or at the output of the DC-DC converter element 921B (for A2B2) to the DC voltage rectified from the AC-DC converter section 923A.

FIG. 12C shows another block diagram of a charger configuration. The charger 920-1C or 920-1D includes a converter unit 921, including an AC-DC converter element 921A, a DC-link capacitor, and a DC-DC converter element 921B.

The charger also includes a backup power circuit, which includes a first coupling circuit A1 or A2. The backup power circuit includes a second coupling circuit B2, which can be a component of the power supply 923. For example, the power supply can include an AC-DC converter section 923A, coupled to a switching circuit B2, coupled to a DC-DC converter section 923B. The power supply can further include a connection circuit A1 B2 or A2B2, which can be a conditioning circuit designed to change the input backup power to the power supply.

The backup power circuit can include an optional connection circuit A1B2* or A2B2*, which can be a conditioning circuit configured to match voltages at A1 or A2 to the connection circuit A1B2 or A2B2 in the power supply.

FIGS. 13A-13B illustrate flow charts for forming a charger having a power supply with a backup power input according to some embodiments. In FIG. 13A, operation 1310 forms a charger for an electric vehicle. The charger includes an AC-DC converter unit, a control unit, together with an optional communication unit, and a power supply. The power supply includes a second coupling circuit configured to accept a DC voltage as a backup power for the power supply.

The charger includes a power backup circuit including an optional connection or conditioning circuit configured to condition a voltage from a first coupling circuit, which is either an internal point of the AC-DC converter unit or a connection point of the charger to the electric vehicle, to the second coupling circuit of the power supply.

In FIG. 13B, operation 1320 forms a charger for an electric vehicle. The charger includes an AC-DC converter unit, a control unit, together with an optional communication unit, and a power supply. The power supply includes an AC-DC section for converting an input AC grid voltage and a DC-DC section for converting an input DC voltage to an output DC voltage suitable to power the control and communication units.

The power supply includes a connection or conditioning circuit configured to accept an input DC voltage as a backup input power for the power supply.

The power supply includes a second coupling circuit configured to accept an output DC voltage from the connection circuit to select against an output from AC-DC section to generate the input DC voltage to the DC-DC section.

The charger includes a power backup circuit including an optional connection or conditioning circuit configured to condition a voltage from a first coupling circuit, which is either an internal point of the AC-DC converter unit or a connection point of the charger to the electric vehicle, to the connection circuit of the power supply as the input DC voltage.

FIGS. 14A-14B illustrate flow charts for forming a power supply with a backup power input according to some embodiments. In FIG. 14A, operation 1410 forms a power supply for a charger for an electric vehicle.

The power supply includes an AC-DC section for converting an input AC grid voltage and a DC-DC section for converting an input DC voltage to an output DC voltage suitable to power control and communication units of the charger for controlling an AC-DC converter unit.

The power supply includes a coupling circuit coupled between the AC-DC section and the DC-DC section for selecting between an output of the AC-DC section and a DC voltage and to provide an input DC voltage to the DC-DC section. The coupling circuit is configured to accept the DC voltage as a backup power for the power supply.

In FIG. 14B, operation 1420 forms a power supply for a charger for an electric vehicle.

The power supply includes an AC-DC section for converting an input AC grid voltage and a DC-DC section for converting an input DC voltage to an output DC voltage suitable to power control and communication units of the charger for controlling an AC-DC converter unit.

The power supply includes a coupling circuit coupled between the AC-DC section and the DC-DC section for selecting between an output of the AC-DC section and a DC voltage and to provide an input DC voltage to the DC-DC section.

The power supply includes a connection or conditioning circuit configured to accept a backup DC voltage for the power supply. The connection circuit is configured to generate the DC voltage to the coupling section.

Figure 15A:
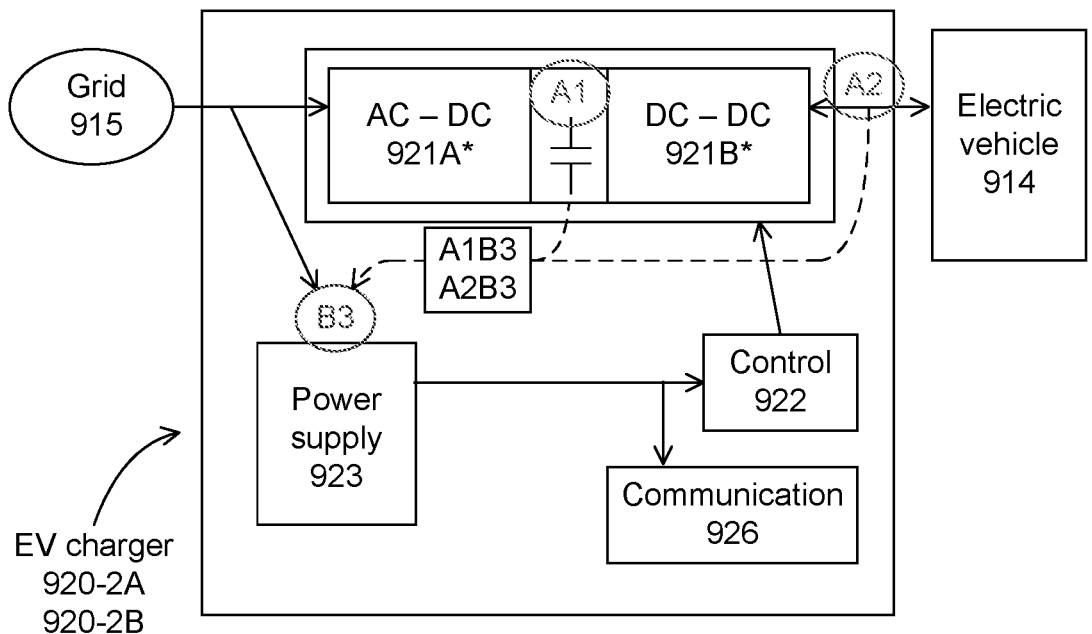
FIGS. 15A-15B illustrate DC-AC connectivity configurations (2A and 2B) for a charger according to some embodiments.
Figure 15B:
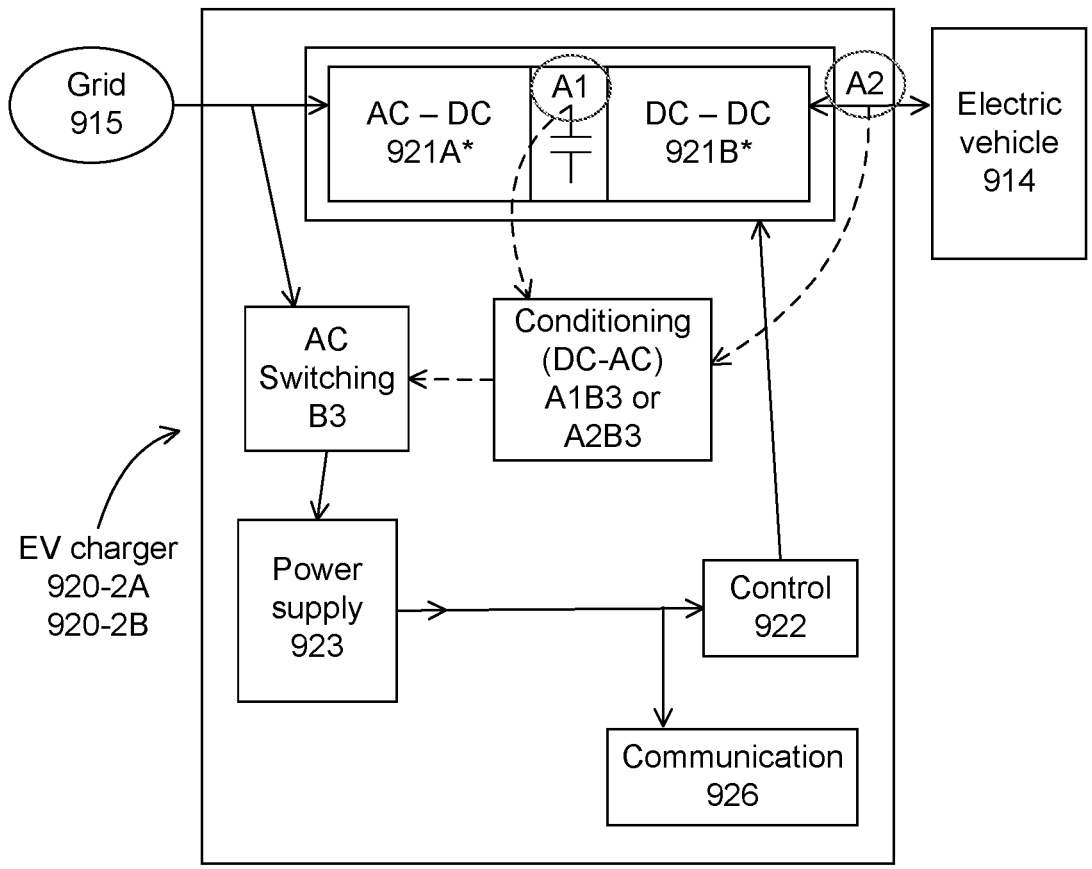

FIGS. 15A-15B illustrate DC-AC connectivity configurations (2A and 2B) for a charger according to some embodiments. In configuration 2A, the backup circuit includes a first DC coupling circuit A1, a second AC coupling circuit B3, and a DC-AC connection circuit A1B3, e.g., A1-A1B3-B3. In configuration 2B, the backup circuit includes a first DC coupling circuit A2, a second AC coupling circuit B3, and a DC-AC connection circuit A2B3, e.g., A2-A2B3-B3.

Configurations 2A and 2B are similar to configurations 1A and 1B, respectively, with a difference being the second coupling circuit at an input of a power supply, instead of an output of the power supply.

As a result, in configurations 2A and 2B, the DC-DC connection circuit A1B3 and A2B3 are different since they are DC-AC converters instead of DC-DC converters. For example, the DC-AC connection circuit A1B3 of configuration 2A can generate an AC voltage of 340-550 VAC, which is the voltage of the grid. In contrast, the DC-DC connection circuit A1B1 of configuration 1A is configured to generate a low DC voltage, for example 24-48 VDC, which is the DC power needed by the control and communication units.

Another difference of configurations 2A and 2B with configurations 1A and 1B is that the second coupling circuit B3 includes an AC matching circuit in configurations 2A and 2B, instead of a DC matching circuit in configurations 1A and 1B. For example, AC switching circuit can be relay based, transistor based, and resistor based, triad or diad based, but not diode based.

FIG. 15A shows a schematic drawing of a charger. The charger 920-2A or 920-2B includes a backup power circuit including a first coupling circuit A1 or A2, which is coupled to a connection circuit A1B3 or A2B3, which is coupled to a second coupling circuit B3, respectively.

The backup power circuit includes a second coupling circuit B3, which is disposed at an input of the power supply for accepting the power from the connection circuit A1B3 or A2B3 as a backup power supply.

FIG. 15B shows a block diagram of a charger configuration. The charger 920-2A or 920-2B includes a converter unit 921, including an AC-DC converter element 921A, a DC-link capacitor, and a DC-DC converter element 921B.

The charger also includes a backup power circuit, which includes a first coupling circuit A1 or A2. The backup power circuit includes a connection circuit A1B3 or A2B3, which can be a conditioning circuit configured to match voltages at A1 or A2 to B3 at the input of the power supply.

The backup power circuit includes a second coupling circuit B3, which can be a switching circuit B3 for switching between the AC power of the grid and the AC backup power from the connection circuit A1B3.

The connection circuit A1B2 or A2B2 can include a DC-AC converter component, which converts the DC voltage at the DC link capacitor (for A1B3) or at the output of the DC-DC converter element 921B (for A2B3) to the AC voltage comparable with that of the grid to be supplied to the input of the power supply.

FIGS. 16A-16D illustrate flow charts for forming a charger having a configuration 2A or 2B according to some embodiments. In FIG. 16A, operation 1600 connects an electric vehicle to a charger for charging a battery of the electric vehicle from a grid power. The charger includes an AC-DC unit coupled to a DC-DC unit, a control unit, an optional communication unit, and a power supply coupled to the grid for supplying power to the control and communication units.

Operation 1601 supplies power either from an internal point of the AC-DC converter unit or from a connection point of the charger to the electric vehicle to an AC input of the power supply for supplying power to the power supply during a low voltage fault of the grid.

In FIG. 16B, operation 1610 forms a charger for an electric vehicle. The charger includes an AC-DC converter unit, a control unit, an optional communication unit, and a power supply.

The charger includes a power backup circuit configured to be connected either to an internal point of the AC-DC converter unit or from a connection point of the charger to the electric vehicle to receive a DC power from the electric vehicle. The power backup circuit is configured to supply power to an AC input of the power supply for supplying power to the power supply during a low voltage fault of the grid.

In FIG. 16C, operation 1620 forms a charger for an electric vehicle. The charger includes an AC-DC converter unit, a control unit, an optional communication unit, and a power supply.

The charger includes a power backup circuit including a first coupling circuit having a connection either with an internal point of the AC-DC converter unit or with an output of the AC-DC converter unit, a connection circuit having a DC-AC component configured to condition a DC voltage to an AC voltage, and a second coupling circuit having a switching component inputted coupled to a grid voltage, an output of the connection circuit, and outputted coupled to an input of the power supply. The switching component is configured to supply AC power from the grid or from the backup circuit to the power supply during a normal operation or a low voltage fault of the grid, respectively.

In FIG. 16D, operation 1630 forms a charger for an electric vehicle. The charger includes a converter unit. The charger includes a control unit for controlling the converter unit. The charger includes an optional communication unit for communicating with the electric vehicle. The charger includes a power supply for powering the control and communication units.

The charger includes a power backup circuit for powering the control and communication units during a grid voltage fault, such as a low voltage fault for more than a hundred of milliseconds.

The backup power circuit includes a first coupling circuit, which can be a connection point either with an internal point or with an output point of the converter unit, to receive power from a battery of the electric vehicle either through a bidirectional element between the internal point and the output point or through the battery.

The backup power circuit includes a connection or conditioning circuit configured to convert a DC voltage received from the first coupling circuit (which includes a connection point) to an AC voltage suitable to power the power supply.

The backup power circuit includes a second coupling circuit which can be an AC switching circuit, configured to select between a power received from the grid or a power received from the connection circuit to provide a power input to the power supply. The switching circuit can include a resistor-based switching circuit, a diad or triad-based switching circuit, a transistor-based switching circuit, or a relay-based switching circuit.

FIGS. 17A-17D illustrate AC-DC connectivity configurations (3A and 3B) for a charger according to some embodiments. In configuration 3A, the backup circuit includes a first AC coupling circuit A3, a second DC coupling circuit B1, and an AC-DC connection circuit A3B1, e.g., A3-A3B1-B1. In configuration 3B, the backup circuit includes a first AC coupling circuit A3, a second DC coupling circuit B2, and an AC-DC connection circuit A3B2, e.g., A3-A3B2-B2.

Configurations 3A and 3B are similar to configurations 1A and 1C, respectively, with a difference being the first coupling circuit at an input of the AC-DC converter unit, instead of a DC link capacitor.

As a result, the converter unit 921 is bidirectional, e.g., both the AC-DC converter element 921A and the DC-DC converter element 921B are bidirectional, as compared to only the DC-DC converter element 921B being bidirectional in the configurations of 1A, 1C.

Further, in configurations 3A and 3B, the AC-DC connection circuit A3B1 and A3B2 are different since they are AC-DC converters instead of DC-DC converters. For example, the AC-DC connection circuit A3B1 of configuration 3A can accept an AC voltage of 340-550 VAC, which is the voltage of the grid. In contrast, the DC-DC connection circuit A1B1 of configuration 1A is configured to accept a DC voltage from the DC link capacitor 921C, which can be 600-1000 VDC. The circuit B1 or B2 can be a switching circuit to toggle between the grid power and the backup power.

Another difference of configurations 3A and 3B with configurations 1A and 1C is that the first coupling circuit A3 includes an AC configuring circuit in configurations 3A and 3B, instead of a first coupling circuit A1 having a connection point to the DC link capacitor DC (and optionally a diode circuit) in configurations 1A and 1C.

The AC configuring circuit of the first coupling circuit A3 can include a circuit 915A, which can be a circuit configured to condition the return voltage from the bidirectional converter unit to match with the voltage of the grid, including amplitude, phase, and waveform.

The first coupling circuit can include a connection point with an input of the converter unit, to draw power from then converter unit (due to the bidirectional nature of the converter unit). The connection point is on a side of the converter unit of the circuit 915A, e.g., the connection point is between the circuit 915A and the converter unit.

Power to the power supply is drawn from the grid, so the input to the power supply is connected to the grid. This connection is made at a point on the grid side of the circuit 915A, e.g., the connection point is between the grid and the circuit 915A.

Since the AC-DC and DC-DC converter elements of the converter unit 921 are both bidirectional, the charger is capable of returning power to the grid from the battery of the electric vehicle. The amplitude, phase, and waveform conditioning circuit 915A is used to ensure that the returned power matches amplitude, phase, and sine waveform with that of the grid, in order not to contaminate the grid power.

The backup power drawn from the first coupling circuit can be at a connection point between the circuit 915A and the converter unit.

Figure 17A:
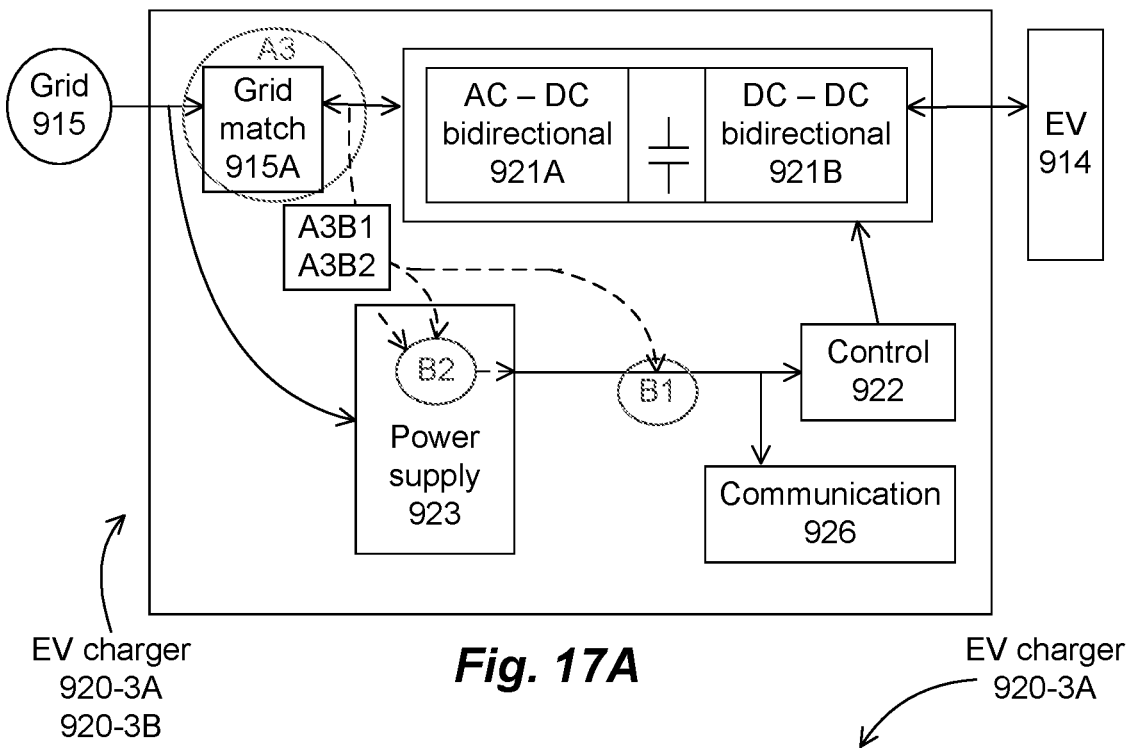
FIGS. 17A-17D illustrate AC-DC connectivity configurations (3A and 3B) for a charger according to some embodiments.

FIG. 17A shows a schematic drawing of a charger. The charger 920-3A or 920-3B includes a backup power circuit including a first coupling circuit A3, which is coupled to a connection circuit A3B1 or A3B2, which is coupled to a second coupling circuit B1 or B2, respectively. The first coupling circuit A3 includes a grid match circuit 915A.

Figure 17B:
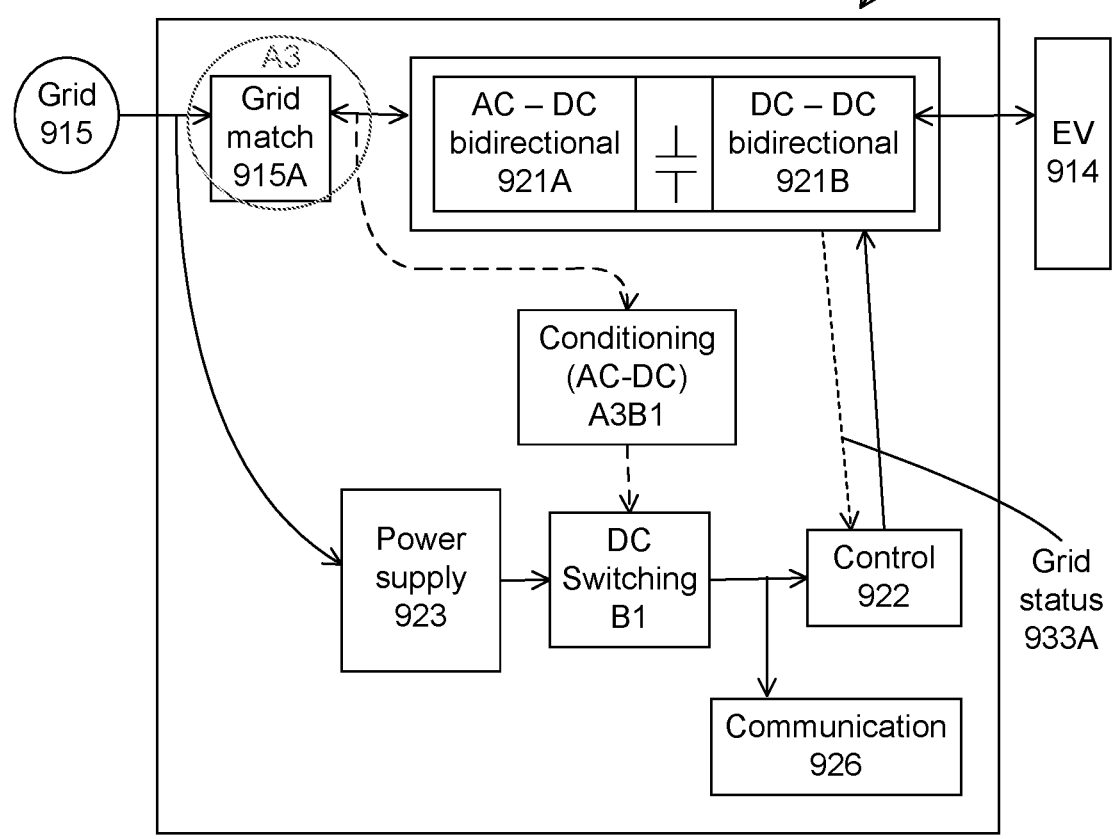

FIG. 17B shows a block diagram of a charger 920-3A configuration. The charger 920-3A includes a converter unit 921, and a backup power circuit, which includes a first coupling circuit A3, which is coupled to a connection circuit A3B1, which is coupled to a second coupling circuit B 1. The first coupling circuit A3 includes a grid match circuit 915A.

The connection circuit A3B1 can include an AC-DC converter component A3B1, which converts the AC voltage at the input of the converter unit 921 to the DC voltage used for powering the control and communication units. For example, the AC voltage at the input of the converter unit 921 can be comparable to that of the grid, which can be 340-550 VAC. The DC voltage used for powering the control and communication units can be 24 VDC. The AC-DC converter component 931A can be configured to convert the 340-550 VAC input to the 24 VDC output.

The backup power circuit 1A includes a second coupling circuit B1, which can be a switching circuit B1 for switching from the power supply output that is used to power the control and communication units to the backup power from the connection circuit A3B1 during a grid fault.

Figure 17C:
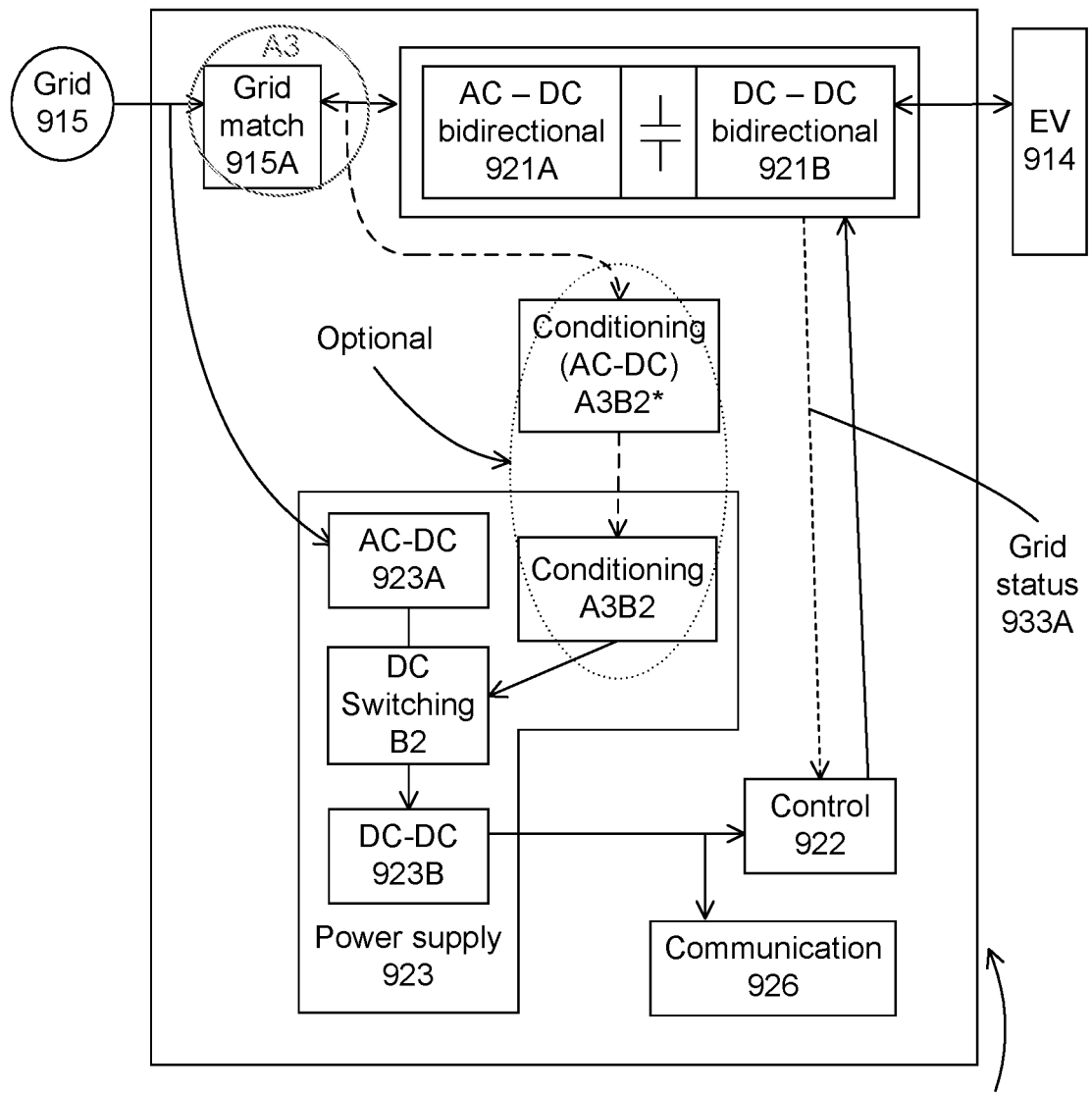

FIG. 17C shows a block diagram of a charger 920-3B configuration. The charger 920-3B includes a converter unit 921, including a bidirectional AC-DC converter element 921A, a DC-link capacitor, and a bidirectional DC-DC converter element 921B.

The charger also includes a backup power circuit, which includes a first coupling circuit A3. The backup power circuit includes a second coupling circuit B2, which can be a component of the power supply 923. For example, the power supply can include an AC-DC converter section 923A, coupled to a switching circuit B2, coupled to a DC-DC converter section 923B. The power supply can further include a connection circuit A3B2, which can be a conditioning circuit designed to change the input backup power to the power supply.

The backup power circuit can include an optional connection circuit A3B2*, which can be a conditioning circuit configured to match voltages at A1 or A2 to the connection circuit A3B2 in the power supply.

Figure 17D:
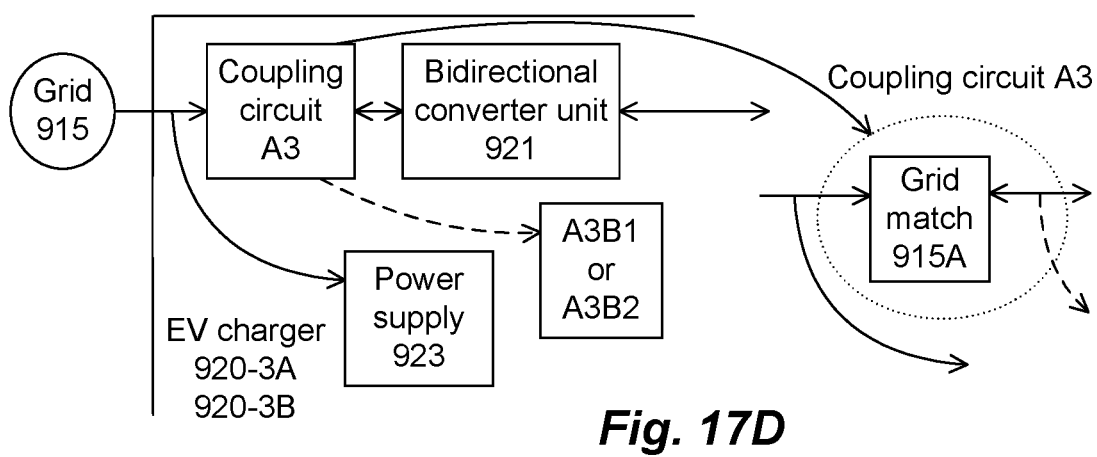

FIG. 17D shows a block diagram of a charger 920-3A or 920-3B, which includes a backup power circuit including a first coupling circuit A3, which is coupled to a connection circuit A3B1 or A3B2. The first coupling circuit A3 includes a grid match circuit 915A. The charger includes a power supply 923 coupled to the grid to receive power from the grid.

The grid match circuit 915A is designed to match the returning voltage from the converter unit to the voltage of the grid, such as amplitude, phase, and waveform.

During normal operation of the grid, the grid match circuit is operational, meaning the grid is connected to the converter unit, for the grid to deliver power to the converter unit, and the battery can return power to the grid.

During grid faults, the grid match circuit is non-operational, since the grid voltage drops to a very low level, and amplitude matching might not be desirable. Thus, the grid is isolated from the converter unit. Power at the input of the converter unit, delivered from the battery, due to bidirectional nature of the converter unit, is used to power the backup circuit.

Figure 18A:
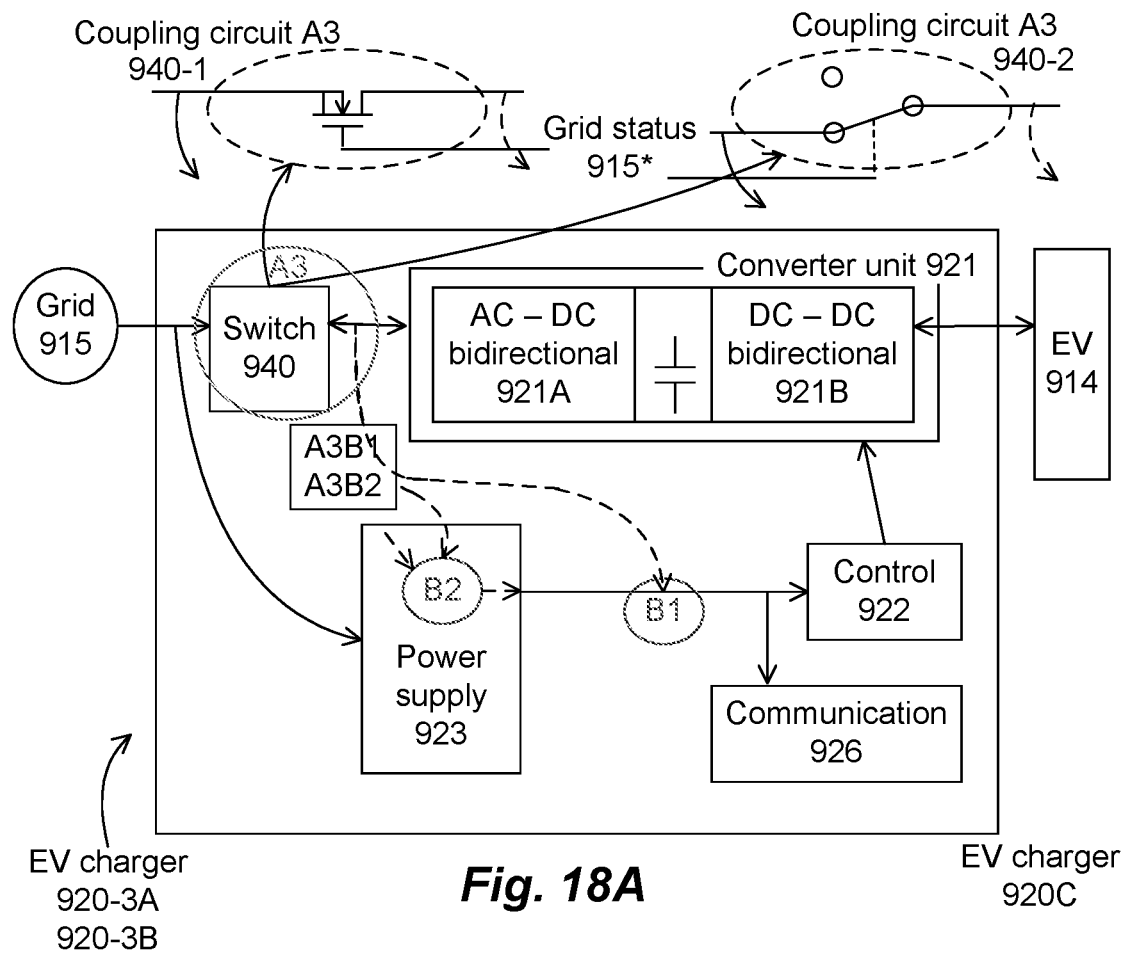
FIGS. 18A-18C illustrate another configuration for a charger 3A and 3B according to some embodiments.
Figure 18B:
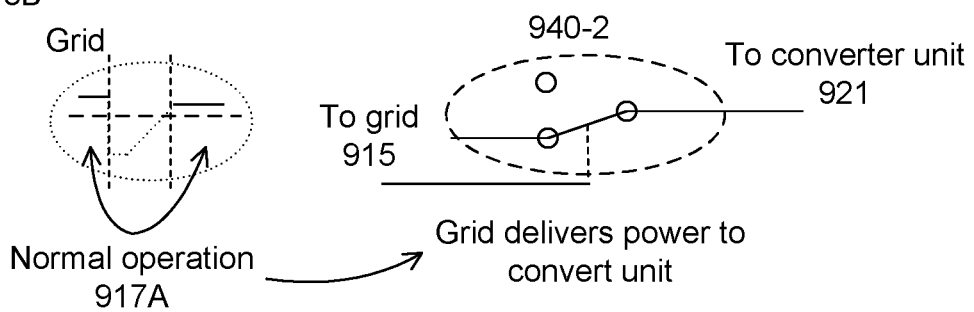
Figure 18C:
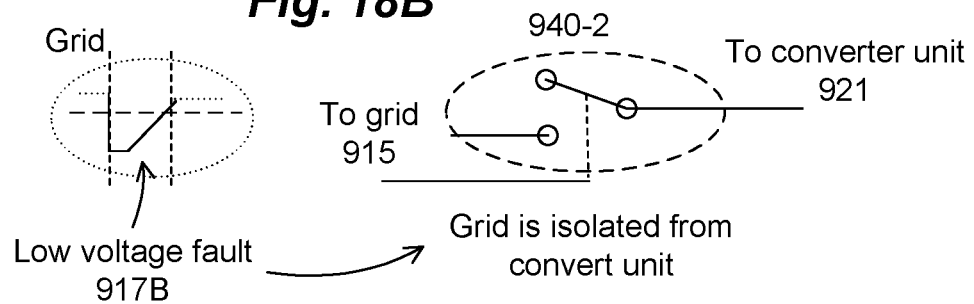

FIGS. 18A-18C illustrate another configuration for a charger 3A and 3B according to some embodiments. In the configuration the first AC coupling circuit A3 includes a switching circuit 940, instead of a grid match circuit. The charger is thus prevented from returning power from the battery to the grid.

In some cases, returning power to the grid from the battery of the electric vehicle is not considered. The first coupling circuit can include a switching circuit 940 to isolate the grid from the charger during grid faults. The switching circuit 940 can be transistor based (940-1) or relay based (940-2). Other configurations can be used, such as semiconductor based (such as diad, triad, or other switching circuits).

The switching circuit is connected to the grid at one end. The switching circuit is connected to the converter unit 921 grid at an opposite end. The switching circuit is configured to receive a grid status 915* to switch the switching circuit.

During normal operation of the grid, the switch is close, meaning the grid is connected to the converter unit, for the grid to deliver power to the converter unit.

During grid faults, the switch is open, meaning the grid is isolated from the converter unit. Power at the input of the converter unit, delivered from the battery, due to bidirectional nature of the converter unit, is used to power the backup circuit.

FIGS. 19A-19D illustrate flow charts for forming a charger having a configuration 1B according to some embodiments. In FIG. 19A, operation 1900 connects an electric vehicle to a charger for charging a battery of the electric vehicle from a grid power. The charger includes a bidirectional AC-DC converter unit, a control unit, an optional communication unit, and a power supply coupled to the grid for supplying power to the control and communication units.

Operation 1901 supplies power from an input of the AC-DC converter unit either to an output or to an internal point of the power supply for supplying power to the control and communication units during a low voltage fault of the grid.

In FIG. 19B, operation 1910 forms a charger for an electric vehicle. The charger includes a bidirectional AC-DC converter unit, a control unit, an optional communication unit, and a power supply.

The charger includes a power backup circuit configured to be connected to an input point of the AC-DC converter unit to receive an AC power from the electric vehicle through the bidirectional AC-DC converter unit. The power backup circuit is configured to supply power either to an output or to an internal point of the power supply for supplying power to the control and communication units during a low voltage fault of the grid.

In FIG. 19C, operation 1920 forms a charger for an electric vehicle. The charger includes a bidirectional AC-DC converter unit, a control unit, an optional communication unit, a power supply.

The charger includes a power backup circuit including a first coupling circuit having a circuit configured for matching or switching between a grid voltage with a voltage returning from the AC-DC converter unit, and a connection line to an input of the AC-DC converter unit, a connection circuit having an AC-DC component configured to condition an AC voltage to an DC voltage, and a second coupling circuit having a switching component inputted coupled to an output of the power supply, an output of the connection circuit, and outputted coupled to power inputs of the control and communication units .

In FIG. 19D, operation 1930 forms a charger for an electric vehicle. The charger includes a bidirectional converter unit. The charger includes a control unit for controlling the converter unit, The charger includes an optional communication unit for communicating with the electric vehicle. The charger includes a power supply for powering the control and communication units.

The charger includes a power backup circuit for powering the control and communication units during a grid voltage fault, such as a low voltage fault for more than a hundred of milliseconds.

The backup power circuit includes a first coupling circuit, which can include a circuit configured for matching a grid voltage with a voltage returning from the converter unit or configured for switching between connecting the grid power to the converter unit and not connecting.

The matching circuit can include a circuit configured to match amplitude, phase, and waveform of a voltage generated at the converter unit from the battery with that of the grid.

The switching circuit can include a transistor based, a relay based, or a semiconductor-based switching configuration, which is configured to toggle between connecting and not connecting the grid with the converter unit, based on a grid fault signal. For example, during a normal grid operation, the switching circuit is close to connect the grid with the converter unit. During a grid fault, the switching circuit is open to disconnect the converter unit from the grid.

The first coupling circuit can include a connection point with an input of the converter unit, to receive power from a battery of the electric vehicle through the bidirectional converter unit. The connection point is disposed on a side of the converter unit with respect to the matching/regulating circuit, e.g., on a connection line between the matching circuit and the converter unit.

The backup power circuit includes a connection or conditioning circuit configured to convert an AC voltage received from the first coupling circuit (which includes a connection point) to a DC voltage suitable to power the control and communication units.

The backup power circuit includes a second coupling circuit which can be a DC switching circuit, configured to select between a power received from an output of the power supply or a power received from the connection circuit to provide a power input to the control and communication units.

Figure 20A:
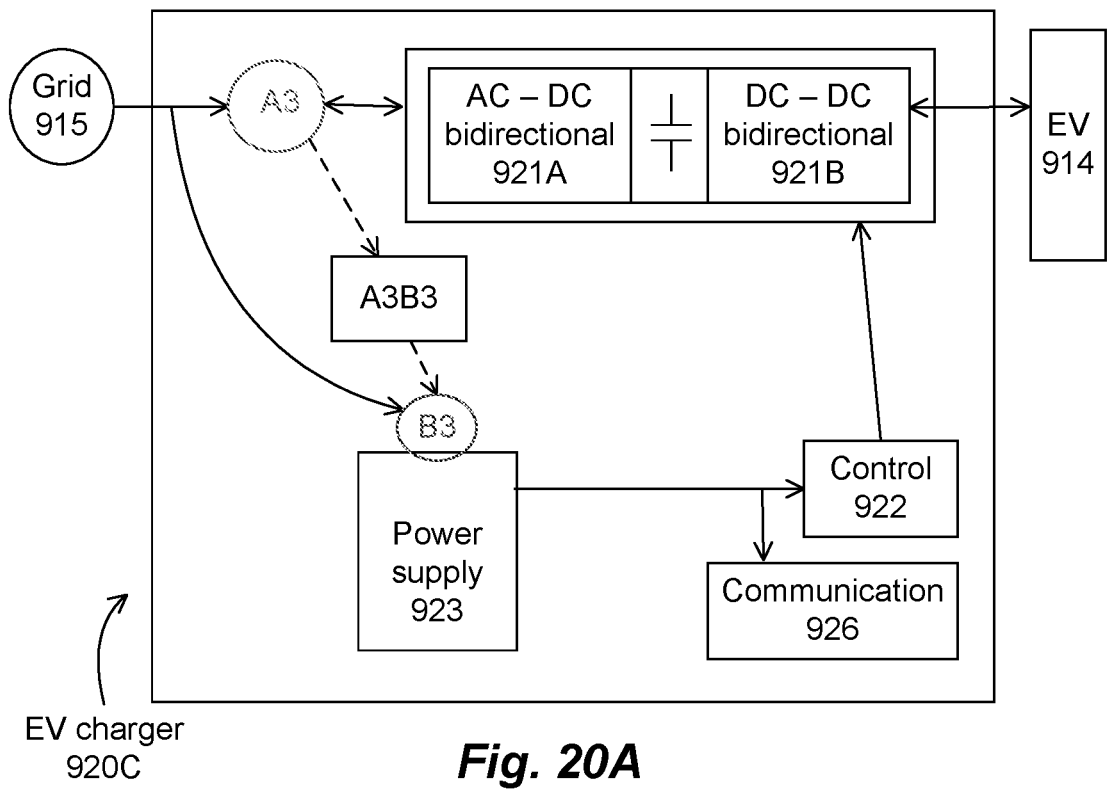
FIGS. 20A-20B illustrate an AC-AC connectivity configuration (4) for a charger according to some embodiments.
Figure 20B:
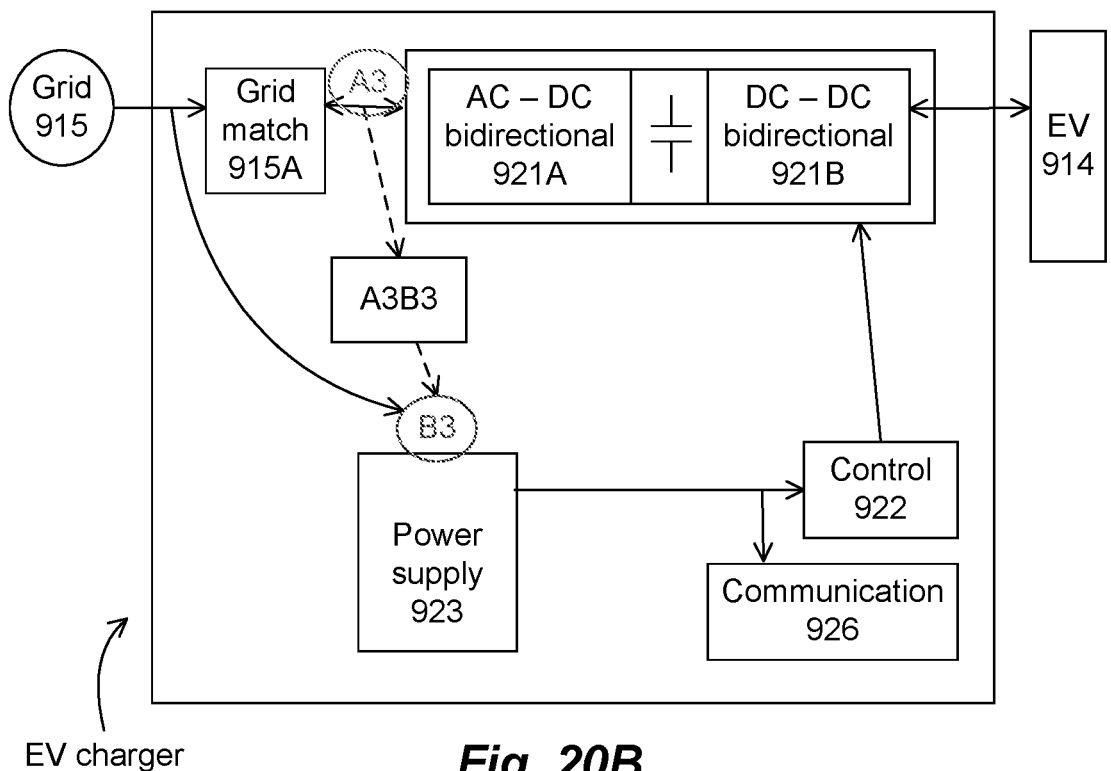

FIGS. 20A-20B illustrate an AC-AC connectivity configuration (4) for a charger according to some embodiments. In configuration 4, the backup circuit includes a first AC coupling circuit A3, a second AC coupling circuit B3, and an AC-AC connection circuit A3B3, e.g., A3-A3B3-B3.

Configuration 4 is similar to configurations 3A and 3B, with a difference being the second coupling circuit at an input of a power supply, instead of an output B1 (in 3A) or an internal point B2 (in 3B) of the power supply.

Similar to configurations 3A and 3B, the AC-DC converter unit is bidirectional to allow power from the battery of the electric vehicle to go back to reach the input of the AC-DC converter unit at A3.

FIG. 20A shows a charger configuration without a grid matching circuit. The charger includes a backup circuit including a first AC coupling circuit A3, a second AC coupling circuit B3, and an AC-AC connection circuit A3B3, e.g., A3-A3B3-B3. Some circuits can be optional, depending on the charger design. For example, the connection circuit A3B3 can be optional, since the power returning from the converter unit 921 and the input power to the power supply can all be grid comparable voltage, e.g., 340-550 VDC.

The first coupling circuit includes a switching circuit A3 to isolate the charger from the grid during a grid fault. For example, the switching circuit A3 is configured for selecting between grid power and power from the battery (through the converter unit).

The first coupling circuit is configured to prevent contaminating the grid, e.g., not returning power to the grid unless the returned power has same characteristics, such as same amplitude, same phase, and same waveform. For example, the first coupling circuit can be disconnected from the grid when the grid voltage drops, such as in a low voltage grid fault.

In operation, during normal grid operation, the power flow is from the grid to the AC-DC converter unit to the battery. During grid faults, grid power is reduced, and power flow is from the battery back through the AC-DC converter unit to the grid. As such, the first coupling circuit can include a switching circuit to disconnect the AC-DC converter unit from the grid during the grid fault.

FIG. 20B shows a charger configuration with a grid matching circuit. The first coupling circuit can include a circuit 915A to condition the returned power from the converter unit to match with that of the grid. The circuit 915A is disposed between the grid and the converter unit.

The first coupling circuit can also include a switching circuit for selecting between power from the grid and power from the battery (through the converter unit) from two sides of the circuit 915A. The first coupling circuit includes an output configured to be coupled to an input of the power supply, to provide AC power, during normal and faults.

Alternatively, the charger includes the circuit 915A. The first coupling circuit then includes a switching circuit having a first input coupled to the input of the converter unit. The switching circuit has a second input coupled to the grid. The first and second inputs are from two sides of the circuit 915A. The switching circuit is configured for selecting between the first inputs or from the second input.

The first coupling circuit includes just a connection to a point between the grid matching circuit 915A and the AC-DC converter unit. The connection can be supplied to the power supply through a second coupling circuit, which is configured to select between the grid power input and the backup power provided from the connection of the first coupling circuit. The connection circuit A3B3 between the two coupling circuits can be optional, since the backup power is already AC.

The backup power does not pass through the circuit 915A, but since there is no merger of two powers, the backup power can be used without being conditioned in the power supply.

Figure 21A:
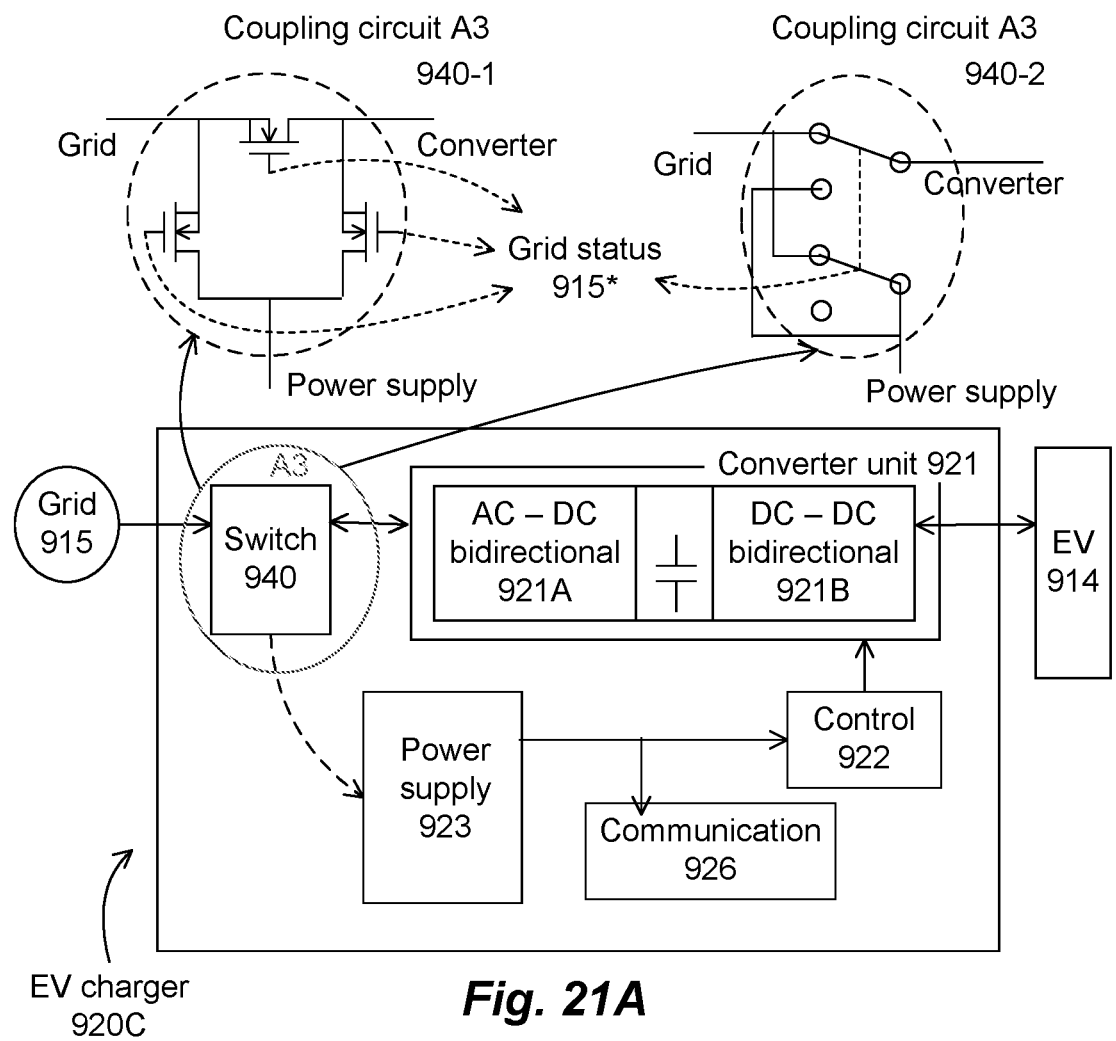
FIGS. 21A-21C illustrate a charger configuration without a grid matching circuit according to some embodiments.
Figure 21B:
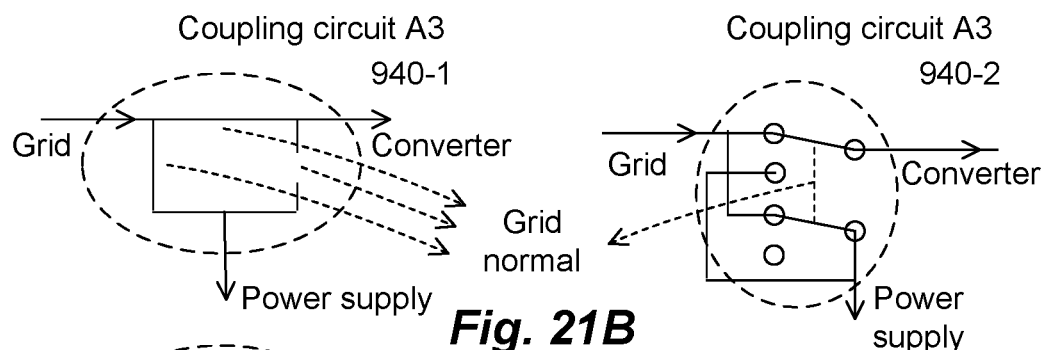
Figure 21C:
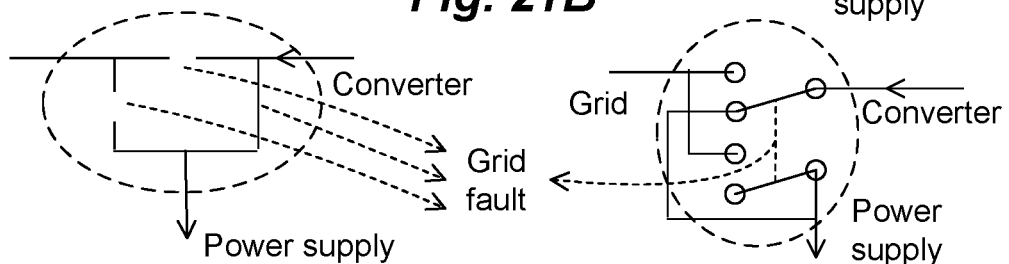

FIGS. 21A-21C illustrate a charger configuration without a grid matching circuit according to some embodiments. The charger includes a backup circuit including a first AC coupling circuit A3, with the second AC coupling circuit B3 and an AC-AC connection circuit A3B3 optional, e.g., omitted as shown.

Without a grid matching circuit, the charger is not configured to return power to the grid from the battery of the electric vehicle. Thus, the first coupling circuit A3 can include a switching circuit 940, which can be used to isolate the grid from the charger during grid faults.

The switching circuit A3 can include a first terminal coupled to the grid, a second terminal coupled to the converter unit, and a third terminal coupled to the power supply. The switching circuit is configured to connect and disconnect between the grid and the converter unit during normal grid and grid faults, respectively. The switching circuit is also configured to connect an input of the power supply to the grid and to the converter unit during normal grid and grid faults, respectively.

The switching circuit 940 can be transistor based (940-1) or relay based (940-2). Or semiconductor based (such as diad, triad, or other switching circuits). In the transistor-based switching circuit, three switching transistors can be used in a triangular configuration to perform the required switching functions. In the relay-based switching circuit, a double pole double throw relay can be used. Control signals for the switching transistors or the relay can be based on the grid status 915*.

In normal operation, the switching circuit provides a connection between the grid and the input of the converter unit to allow power to flow from the grid to the converter unit to charge the battery. Further, the switching circuit also provides a connection between the grid and the input of the power supply to provide power to the power supply to generate DC voltage to power the control and communication units. The switching circuit sets a disconnection between the input of the converter unit and the input of the power supply, to prevent power flowing from the converter to then power supply.

During grid faults, the switching circuit disconnects the grid from the input of the converter unit, to prevent power flow from the battery back to the grid. Further, the switching circuit also disconnects the grid from the input of the power supply, to terminate the supplying of power to the power supply by the grid. The switching circuit provides a connection between the input of the converter unit and the input of the power supply, to provide a backup power to the power supply so that the control and communication units can still operate during the grid faults.

FIG. 21A shows a charger configuration without a grid matching circuit. The charger includes a backup circuit including a first AC coupling circuit A3 having a switching circuit 940 to isolate the charger from the grid during a grid fault, and to connect the power supply 923 either to the grid power or to the battery power through the bidirectional converter unit 921.

The first coupling circuit is disposed between the grid and the converter unit, e.g., between the output of the grid and the input of the converter unit and provides an output to the input of the power supply.

The switching circuit is configured to provide power from the grid to the converter unit and to the power supply during normal operation of the grid, e.g., when the grid voltage is at a nominal value. The switching circuit is also configured to provide backup power to the power supply during grid faults, after disconnecting the power from the grid.

The first coupling circuit can include 3 transistors configured as switching transistors, using a grid fault signal to control the switching transistors. The first coupling circuit can include a double pole, double throw relay to perform the switching process, using a grid fault signal to control the relay.

FIGS. 22A-22C illustrate a charger configuration with a grid matching circuit according to some embodiments. The charger includes a backup circuit including a first AC coupling circuit A3, and a second AC coupling circuit B3, with the AC-AC connection circuit A3B3 optional, e.g., omitted as shown.

With a grid matching circuit, the charger is configured to return power to the grid from the battery of the electric vehicle during normal grid operation. The first coupling circuit A3-1 can include a switching circuit 940, together with a connection to the second coupling circuit B3. The switching circuit 940 can be used to isolate the grid from the charger during grid faults. Alternatively, the charger can include the switching circuit 940, and the first coupling circuit A3-2 can include a connection to the second coupling circuit B3.

In normal operation, since the charger is configured to charge the battery, e.g., power flows from the grid to the converter unit to charge the battery, the grid matching circuit is of limited use. For chargers configured to provide power to the grid, then the grid matching circuit can be used during normal operation.

During grid faults, the grid matching circuit does not operate, since the grid voltage is low, and matching the power returned from the battery to the fault voltage is not beneficial. As such, during grid faults, the grid matching circuit disconnects the grid from the input of the converter unit, to prevent power flow from the battery back to the grid.

FIG. 22A shows a charger configuration with a grid matching circuit in either configuration A3-1 or A3-2. The charger includes a backup circuit including a first AC coupling circuit A3-1 or A3-2 coupled to a grid matching circuit 915A, together with a connection line to a second coupling circuit B3 having a switching circuit. The first coupling circuit A3 is disposed between the grid 915 and the converter unit 921.

The first coupling circuit A3-1 can include a grid matching circuit 915A, which is configured to condition the returned power from the battery during normal operation of the grid. The first coupling circuit A3-2 can include just the connection point to supply backup power to the power supply.

The backup circuit includes a second coupling circuit B3, which can be a switching circuit B3. The switching circuit B3 can be an AC switching circuit, similar to the AC switching circuit in configuration 2A or 2B. The switching circuit B3 can be used with either circuit A3-1 or A3-2.

The switching circuit B3 is configured to provide power to the power supply, from the grid during normal operation and from the converter unit during grid faults.

The matching circuit can be transistor based or relay based, to switch an input of the power supply between the grid and the converter unit.

The matching circuit B3-1 can include 2 transistors configured as switching transistors, using a grid fault signal to control the switching transistors. The matching circuit B3-2 can include a single pole, double throw relay to perform the switching process, using a grid fault signal to control the relay.

FIGS. 23A-23D illustrate flow charts for forming a charger having a configuration 1B according to some embodiments. In FIG. 23A, operation 2300 connects an electric vehicle to a charger for charging a battery of the electric vehicle from a grid power. The charger includes a bidirectional AC-DC converter unit, a control unit, an optional communication unit, and a power supply coupled to the grid for supplying power to the control and communication units.

Operation 2301 supplies power from an input of the AC-DC converter unit either to an input of the power supply for supplying power to the control and communication units during a low voltage fault of the grid.

In FIG. 23B, operation 2310 forms a charger for an electric vehicle. The charger includes a bidirectional AC-DC converter unit, a control unit, an optional communication unit, and a power supply.

The charger includes a power backup circuit configured to be connected to an input point of the AC-DC converter unit to receive an AC power from the electric vehicle through the bidirectional AC-DC converter unit. The power backup circuit is configured to supply power either to an input of the power supply for supplying power to the control and communication units during a low voltage fault of the grid.

In FIG. 23C, operation 2320 forms a charger for an electric vehicle. The charger includes a bidirectional AC-DC converter unit, a control unit, an optional communication unit, a power supply.

The charger includes a power backup circuit including a first coupling circuit having a switching circuit configured for switching between a connection and a disconnection of a grid voltage with a voltage returning from the AC-DC converter unit. The switching circuit is also configured for switching an input of the power supply to be connected with the grid voltage or to bin connected with the voltage returning from the AC-DC converter unit. The switching circuit is transistor based or relay based, or semiconductor based.

In FIG. 23D, operation 2330 forms a charger for an electric vehicle. The charger includes a bidirectional converter unit. The charger includes a control unit for controlling the converter unit, The charger includes an optional communication unit for communicating with the electric vehicle. The charger includes a power supply for powering the control and communication units.

The charger includes a power backup circuit for powering the control and communication units during a grid voltage fault, such as a low voltage fault for more than a hundred of milliseconds.

The backup power circuit includes a first coupling circuit, which can include a circuit configured for matching a grid voltage with a voltage returning from the converter unit. Alternatively, the charger includes a grid matching circuit, and the first coupling circuit does not have the grid matching circuit. The matching circuit can include a circuit configured to match amplitude, phase, and waveform of a voltage generated at the converter unit from the battery with that of the grid.

The backup power circuit includes a second coupling circuit, which can include a switching circuit for switching a power input of the power supply to either the grid (during normal operation) or from the converter unit (during grid faults). A grid status, such as grid normal or grid fault signal, is used to control the switching circuit.

What is claimed is:

1. A charger configured for charging a battery of a system with power supplied from a grid, the charger comprising
   a converter unit configured to be coupled to the grid and to the battery,
      wherein the converter unit is configured to convert a voltage from the grid to a voltage suitable to charge the battery,
   a control unit configured to control the converter unit,
   a power supply comprising a first input with the first input configured to be coupled to the grid to receive power from the grid for powering the control unit during a normal operation of the grid,
   a circuit for providing back up power at least to the control unit at least during a fault of the grid,
   wherein the back up circuit is configured to use power of the battery to power the control unit at least during the fault of the grid,
   wherein the back up circuit comprises at least one of
      an input coupler circuit configured to receive power from the battery,
      an output coupler circuit configured to provide power to the control unit, or
      a conditioner circuit configured to convert a voltage received from the input coupler circuit to a voltage suitable to be provided to the output coupler circuit.

2. The charger of claim 1, wherein the system comprises an electric vehicle.

3. The charger of claim 1,
   wherein the input coupler circuit is coupled to one of
      an output of the converter unit,
      an internal point of the converter unit with a portion of the converter unit from the internal point to the output of the converter unit being bidirectional, or
      an input of the converter unit with the converter unit being bidirectional,
   wherein the output coupler circuit is coupled to one of
      an output of the power supply,
      an internal point of the power supply,
      the first input of a power supply, or
      a second input of the power supply, with the second input configured for the power supply to power the control unit during the fault of the grid.

4. The charger of claim 1,
wherein the converter unit comprises an AC-DC converter element coupled to a DC-DC converter element,
wherein the input coupler circuit is coupled to one of
an output of the converter unit,
a connection between an AC-DC converter element of the converter unit and a DC-DC converter element of the converter unit with the DC-DC converter element being bidirectional, or
an input of the converter unit with the converter unit being bidirectional,
wherein the output coupler circuit is coupled to one of
an output of the power supply,
an internal point of the power supply,
the first input of a power supply, or
a second input of the power supply, with the second input configured for the power supply to power the control unit during the fault of the grid.

5. The charger of claim 1,
wherein the power supply comprises an AC-DC converter section coupled to a DC-DC converter section,
wherein the power supply comprises a second input for coupling to a section between the AC-DC converter section and the DC-DC converter section,
wherein either the conditioner circuit or the output coupler circuit is coupled to the second input.

6. The charger of claim 1,
wherein the converter unit comprises an AC-DC converter element coupled to a DC-DC converter element,
wherein the back up circuit comprises the input coupler circuit coupled to the conditioner circuit coupled to the output coupler circuit,
wherein the input coupler circuit is coupled to an output of the DC-DC converter element or to a DC link capacitor coupled between the AC-DC converter element and the DC-DC converter element with the DC-DC converter element being bidirectional,
wherein the output coupler circuit comprising a switching circuit coupled to an output of the power supply and to a power input of the control unit with the switching circuit configured to couple the power input to the output coupler circuit during the fault of the grid and to the output of the power supply during the normal operation of the grid,
wherein the conditioner circuit comprises a DC-DC converter component configured to convert a voltage received from the output of the DC-DC converter element or from the DC link capacitor to a voltage comparable to a voltage provided by the power supply.

7. The charger of claim 1,
wherein the converter unit comprises an AC-DC converter element coupled to a DC-DC converter element,
wherein the back up circuit comprises the input coupler circuit coupled to the conditioner circuit coupled to the output coupler circuit,
wherein the input coupler circuit is coupled to an output of the DC-DC converter element or a DC link capacitor coupled between the AC-DC converter element and the DC-DC converter element with the DC-DC converter element being bidirectional,
wherein the output coupler circuit is coupled to a section between an AC-DC converter section of the power supply and a DC-DC converter section of the power supply, with the DC-DC converter section configured to receive power from the AC-DC converter section during the normal operation of the grid and to receive power from the output coupler circuit during the fault of the grid,
wherein the conditioner circuit comprises a DC-DC converter component configured to convert a voltage received from the output of the DC-DC converter element or from the DC link capacitor to a voltage comparable to a voltage provided by the AC-DC converter section.

8. The charger of claim 1,
wherein the converter unit comprises an AC-DC converter element coupled to a DC-DC converter element,
wherein the back up circuit comprises the input coupler circuit coupled to the conditioner circuit coupled to the output coupler circuit,
wherein the input coupler circuit is coupled to an output of the DC-DC converter element or a DC link capacitor coupled between the AC-DC converter element and the DC-DC converter element with the DC-DC converter element being bidirectional,
wherein the output coupler circuit comprising a switching circuit coupled to the first input of the power supply and to the grid with the switching circuit configured to couple the first input of the power supply to the output coupler circuit during the fault of the grid and to the grid during the normal operation of the grid,
wherein the conditioner circuit comprises a DC-AC converter component configured to convert a voltage received from the output of the DC-DC converter element or from the DC link capacitor to a voltage comparable to a grid voltage.

9. The charger of claim 1, wherein the converter unit is bidirectional between an input configured to be coupled to the grid and an output configured to be coupled to the battery, wherein the charger comprises a circuit configured to match a voltage returned from the battery through the bidirectional converter unit with that of the grid.

10. The charger of claim 1,
wherein the converter unit is bidirectional between an input configured to be coupled to the grid and an output configured to be coupled to the battery,
wherein the back up circuit comprises the input coupler circuit coupled to the conditioner circuit coupled to the output coupler circuit,
wherein the input coupler circuit is coupled to an input of the converter unit with the converter unit being bidirectional,
wherein the output coupler circuit comprising a switching circuit coupled to an output of the power supply and to a power input of the control unit with the switching circuit configured to couple the power input to the output coupler circuit during the fault of the grid and to the output of the power supply during the normal operation of the grid,
wherein the conditioner circuit comprises an AC-DC converter component configured to convert a voltage received from the input of the converter unit to a voltage comparable to a voltage provided by the power supply.

11. The charger of claim 1,
wherein the converter unit is bidirectional between an input configured to be coupled to the grid and an output configured to be coupled to the battery,
wherein the back up circuit comprises the input coupler circuit coupled to the conditioner circuit coupled to the output coupler circuit, wherein the input coupler circuit is coupled to an input of the converter unit with the converter unit being bidirectional, wherein the output coupler circuit is coupled to a second input of the power supply, with the power supply configured to receive power from the output coupler circuit during the fault of the grid, wherein the conditioner circuit comprises an AC-DC converter component configured to convert a voltage received from the input of the converter unit to a voltage suitable to be provided to the output coupler circuit.

12. The charger of claim 1, wherein the converter unit is bidirectional between an input configured to be coupled to the grid and an output configured to be coupled to the battery, wherein the back up circuit comprises the input coupler circuit, wherein the input coupler circuit is configured to be coupled to the grid, wherein the input coupler circuit is coupled to the input of the converter unit and the first input of the power supply, wherein the input coupler circuit is configured to couple the grid with the input of the converter unit and with the first input of the power supply during the normal operation of the grid, wherein the input coupler circuit is configured to couple the input of the converter unit with the first input of the power supply during the fault of the grid.

13. The charger of claim 1, wherein the converter unit is bidirectional between an input configured to be coupled to the grid and an output configured to be coupled to the battery, wherein the back up circuit comprises the input coupler circuit coupled to the output coupler circuit, wherein the input coupler circuit is configured to be coupled to the grid, wherein the input coupler circuit is coupled to the input of the converter unit and the output coupler circuit, wherein the input coupler circuit is configured to couple the converter unit with the grid during the normal operation of the grid, wherein the input coupler circuit is configured to couple the converter unit with the output coupler circuit during the fault of the grid, wherein the output coupler circuit is configured to be coupled to the grid, wherein the output coupler circuit is coupled to the first input of the power supply and the input coupler circuit, wherein the output coupler circuit is configured to couple the power supply with the grid during the normal operation of the grid, wherein the output coupler circuit is configured to couple the power supply with the converter unit during the fault of the grid.

* * * * *